(12) United States Patent
Patil et al.

(10) Patent No.: US 11,449,297 B2
(45) Date of Patent: Sep. 20, 2022

(54) IMAGE DISPLAY APPARATUS

(71) Applicant: LG ELECTRONICS INC., Seoul (KR)

(72) Inventors: Kiran M Patil, Bengaluru (IN); Vijayasarathy Muniyasamy, Bengaluru (IN); Jayanth Reddy, Bengaluru (IN); Chamok Nath Choudhury, Bengaluru (IN)

(73) Assignee: LG ELECTRONICS INC., Seoul (KR)

( * ) Notice: Subject to any disclaimer, the term of this patent is extended or adjusted under 35 U.S.C. 154(b) by 170 days.

(21) Appl. No.: 15/476,574

(22) Filed: Mar. 31, 2017

(65) Prior Publication Data

US 2017/0286047 A1  Oct. 5, 2017

(30) Foreign Application Priority Data

Apr. 1, 2016  (KR) .......................... 10-2016-0040289

(51) Int. Cl.
| | |
|---|---|
| *G06F 3/14* | (2006.01) |
| *H04N 21/45* | (2011.01) |
| *G06F 9/451* | (2018.01) |
| *H04N 21/422* | (2011.01) |
| *H04N 21/41* | (2011.01) |
| *G06F 3/0346* | (2013.01) |
| *H04N 21/436* | (2011.01) |
| *G06F 3/04842* | (2022.01) |
| *G06F 3/04845* | (2022.01) |

(52) U.S. Cl.
CPC .......... *G06F 3/1454* (2013.01); *G06F 3/0346* (2013.01); *G06F 9/452* (2018.02); *H04N 21/4122* (2013.01); *H04N 21/41265* (2020.08); *H04N 21/42204* (2013.01); *H04N 21/43615* (2013.01); *H04N 21/4524* (2013.01); *G06F 3/04842* (2013.01); *G06F 3/04845* (2013.01); *G09G 2340/12* (2013.01)

(58) Field of Classification Search
CPC ........................ G06F 3/04886; H04N 21/4122
See application file for complete search history.

(56) References Cited

U.S. PATENT DOCUMENTS

| | | | |
|---|---|---|---|
| 2008/0209487 A1* | 8/2008 | Osann .............. | H04N 21/42204 725/109 |
| 2008/0240683 A1* | 10/2008 | Yamagata ............. | G06F 16/986 386/283 |
| 2011/0296308 A1* | 12/2011 | Yi ........................... | G06F 21/52 715/733 |
| 2012/0088548 A1 | 4/2012 | Yun et al. | |
| 2012/0262494 A1* | 10/2012 | Choi ..................... | G06F 3/0481 345/672 |

(Continued)

*Primary Examiner* — Matthew Ell
*Assistant Examiner* — David Tan
(74) *Attorney, Agent, or Firm* — Birch, Stewart, Kolasch & Birch, LLP

(57) ABSTRACT

An image display apparatus including a display; a first interface configured to exchange data with at least first and second external devices; and a controller configured to when a first mirroring image is received from the first external device, display the first mirroring image on the display, and when a second mirroring image is received from the second external device, display the second mirroring image on the display.

12 Claims, 72 Drawing Sheets

(56) References Cited

U.S. PATENT DOCUMENTS

| | | | |
|---|---|---|---|
| 2012/0266093 A1* | 10/2012 | Park | G06F 3/0486 |
| | | | 715/769 |
| 2012/0309464 A1* | 12/2012 | Lim | H04M 1/72522 |
| | | | 455/566 |
| 2013/0057764 A1* | 3/2013 | Choi | H04N 21/43615 |
| | | | 348/563 |
| 2013/0065521 A1* | 3/2013 | Jang | G06K 7/10237 |
| | | | 455/41.1 |
| 2013/0141331 A1* | 6/2013 | Shiu | G09G 5/003 |
| | | | 345/158 |
| 2013/0210488 A1 | 8/2013 | Lee et al. | |
| 2013/0326397 A1 | 12/2013 | Kim et al. | |
| 2014/0009394 A1* | 1/2014 | Lee | G09G 5/14 |
| | | | 345/157 |
| 2014/0032635 A1 | 1/2014 | Pimmel et al. | |
| 2014/0358990 A1* | 12/2014 | Huang | H04W 4/60 |
| | | | 709/203 |
| 2014/0361954 A1* | 12/2014 | Epstein | G06F 3/1454 |
| | | | 345/2.3 |
| 2015/0135238 A1* | 5/2015 | Wickenkamp | H04N 21/4122 |
| | | | 725/80 |
| 2015/0212659 A1* | 7/2015 | Roberts | G06F 21/31 |
| | | | 715/747 |
| 2016/0062552 A1* | 3/2016 | Jeong | G06F 3/0488 |
| | | | 715/788 |
| 2016/0202852 A1* | 7/2016 | Park | G06F 3/04886 |
| | | | 715/781 |
| 2016/0360287 A1* | 12/2016 | Van | G06Q 50/01 |

* cited by examiner

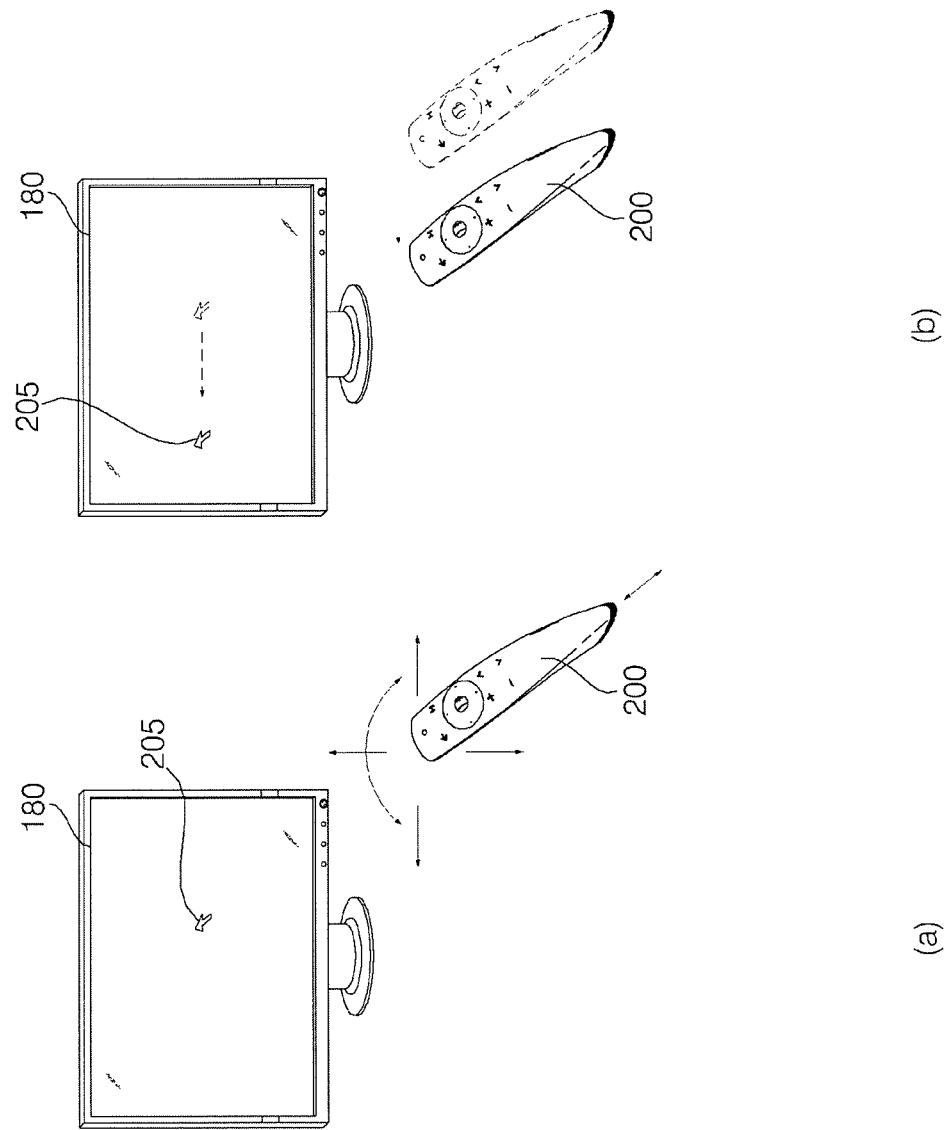

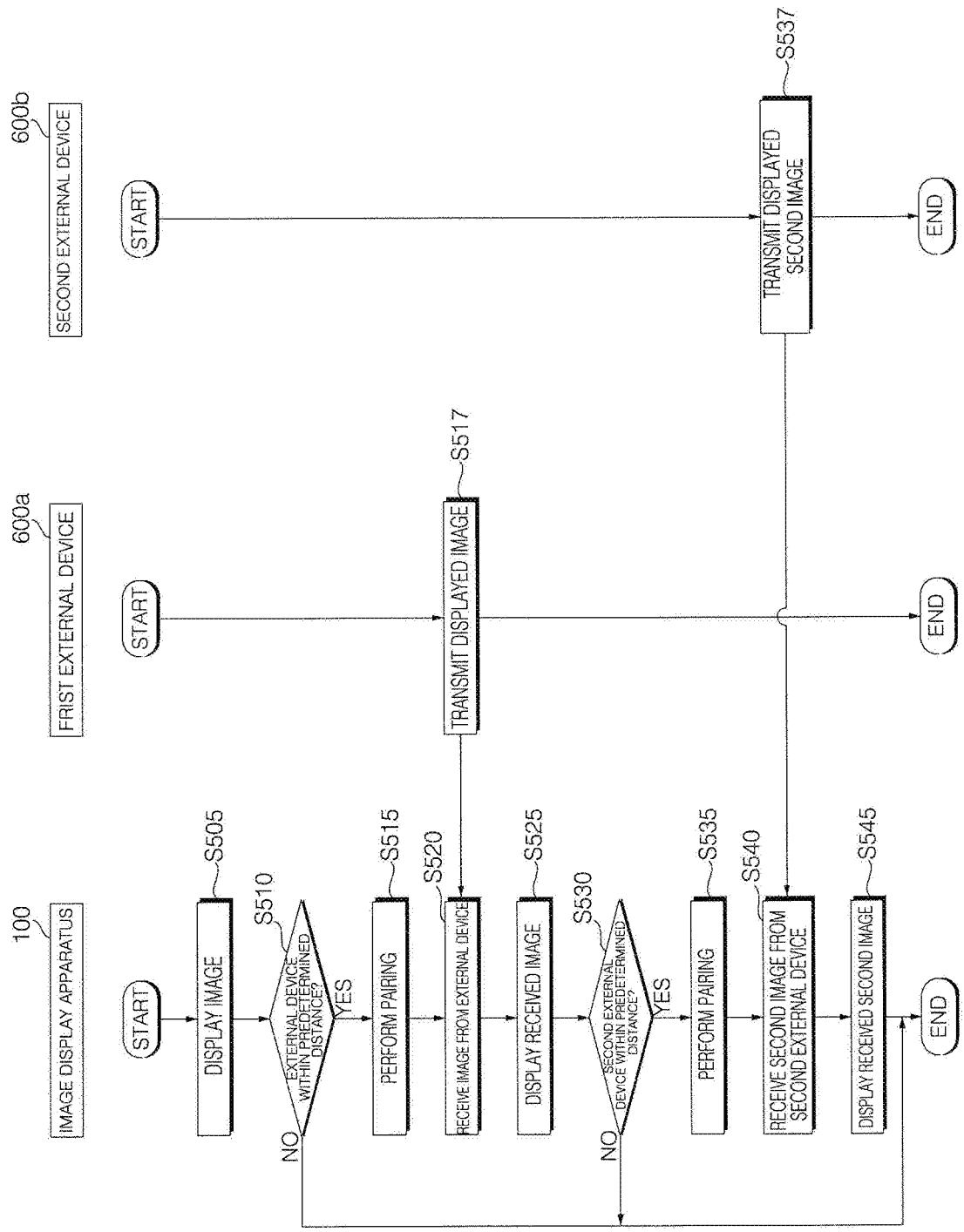

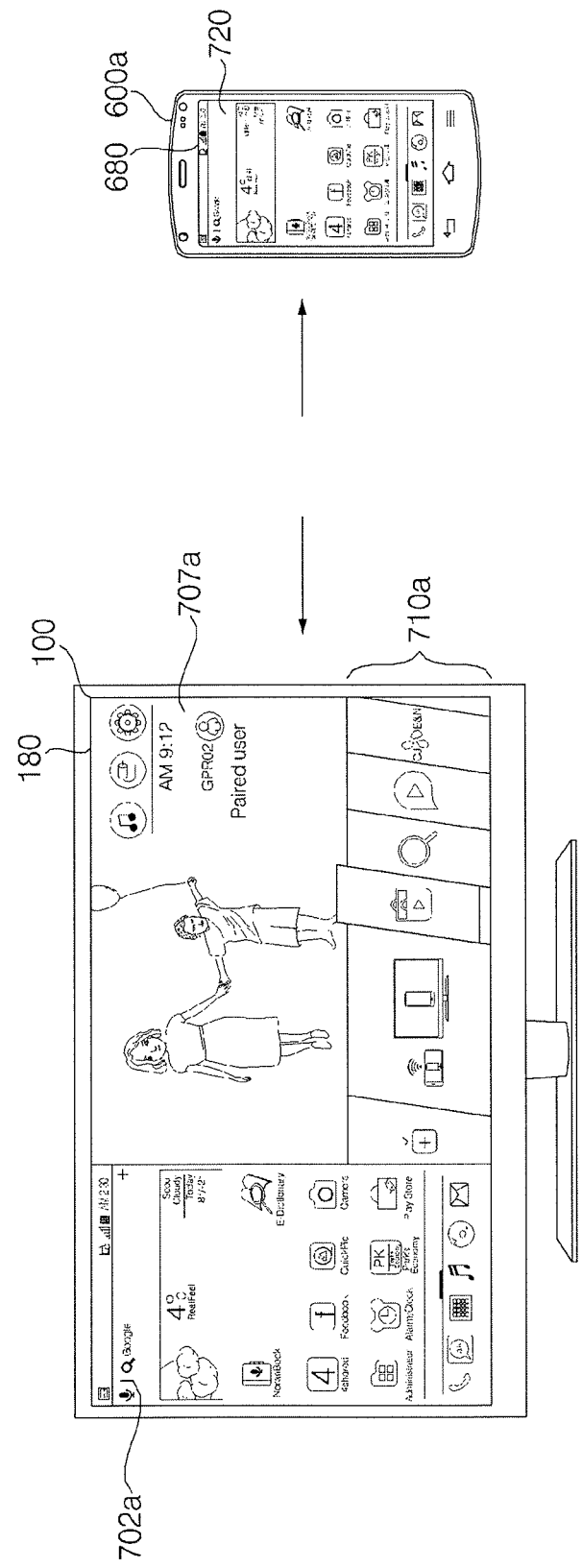

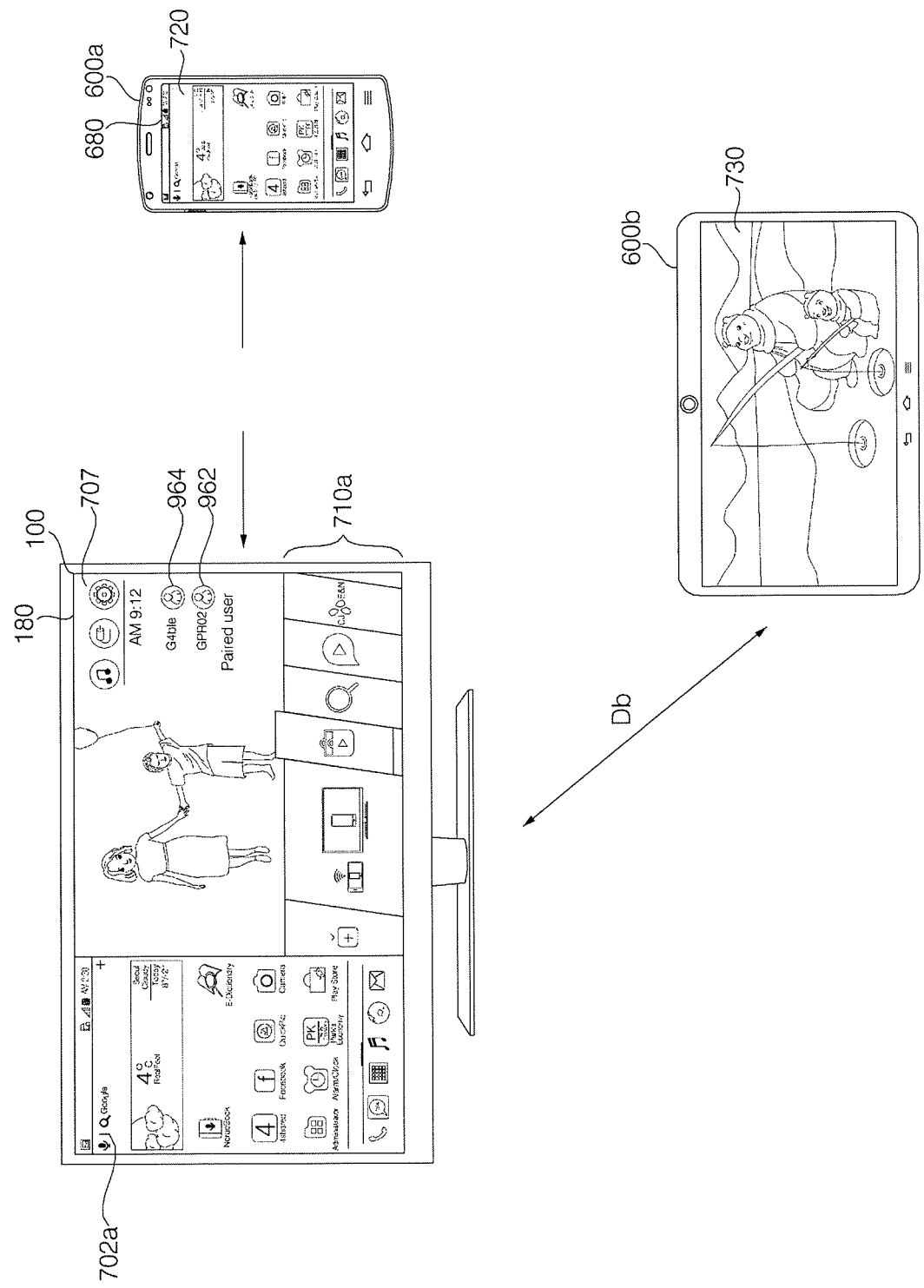

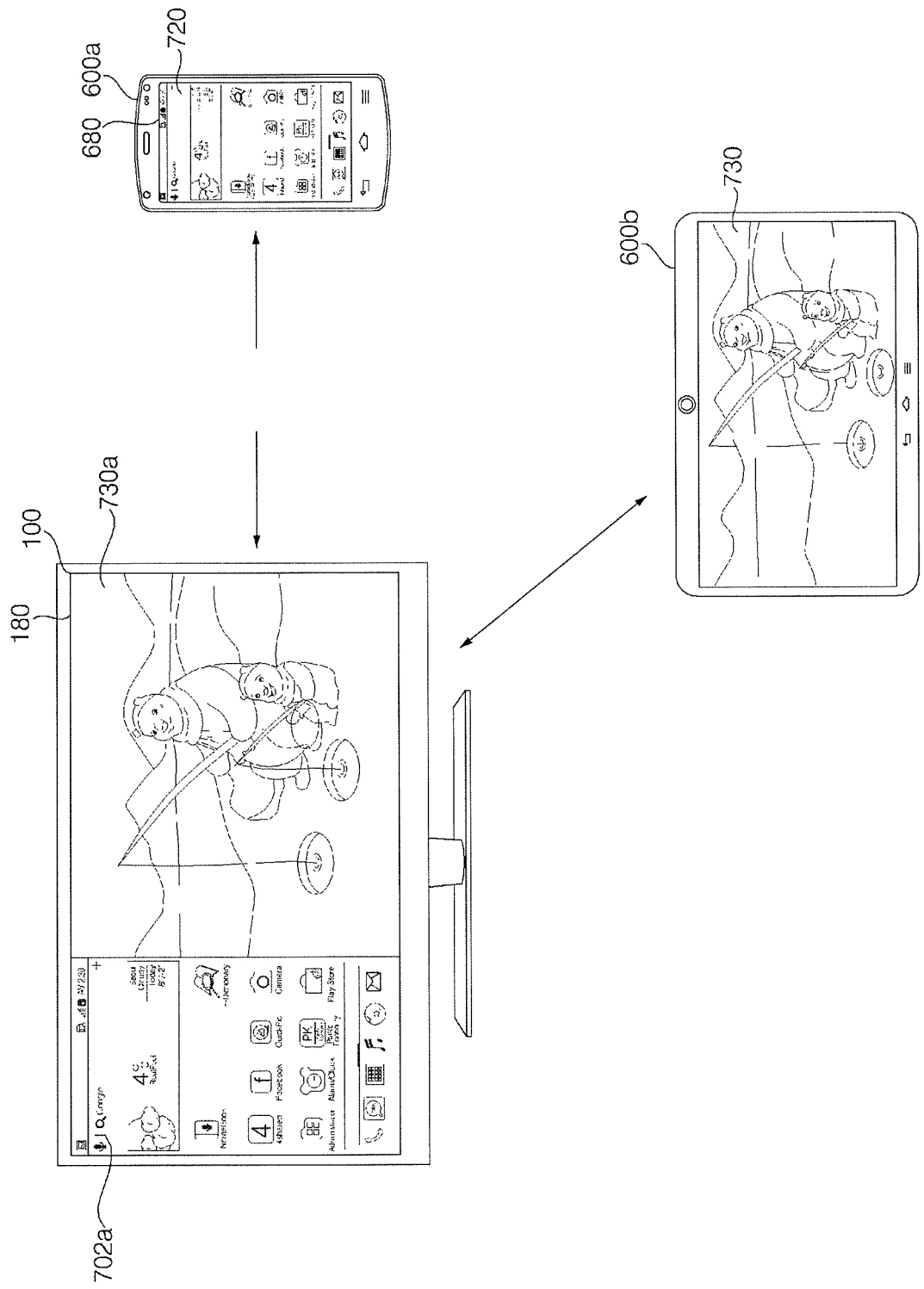

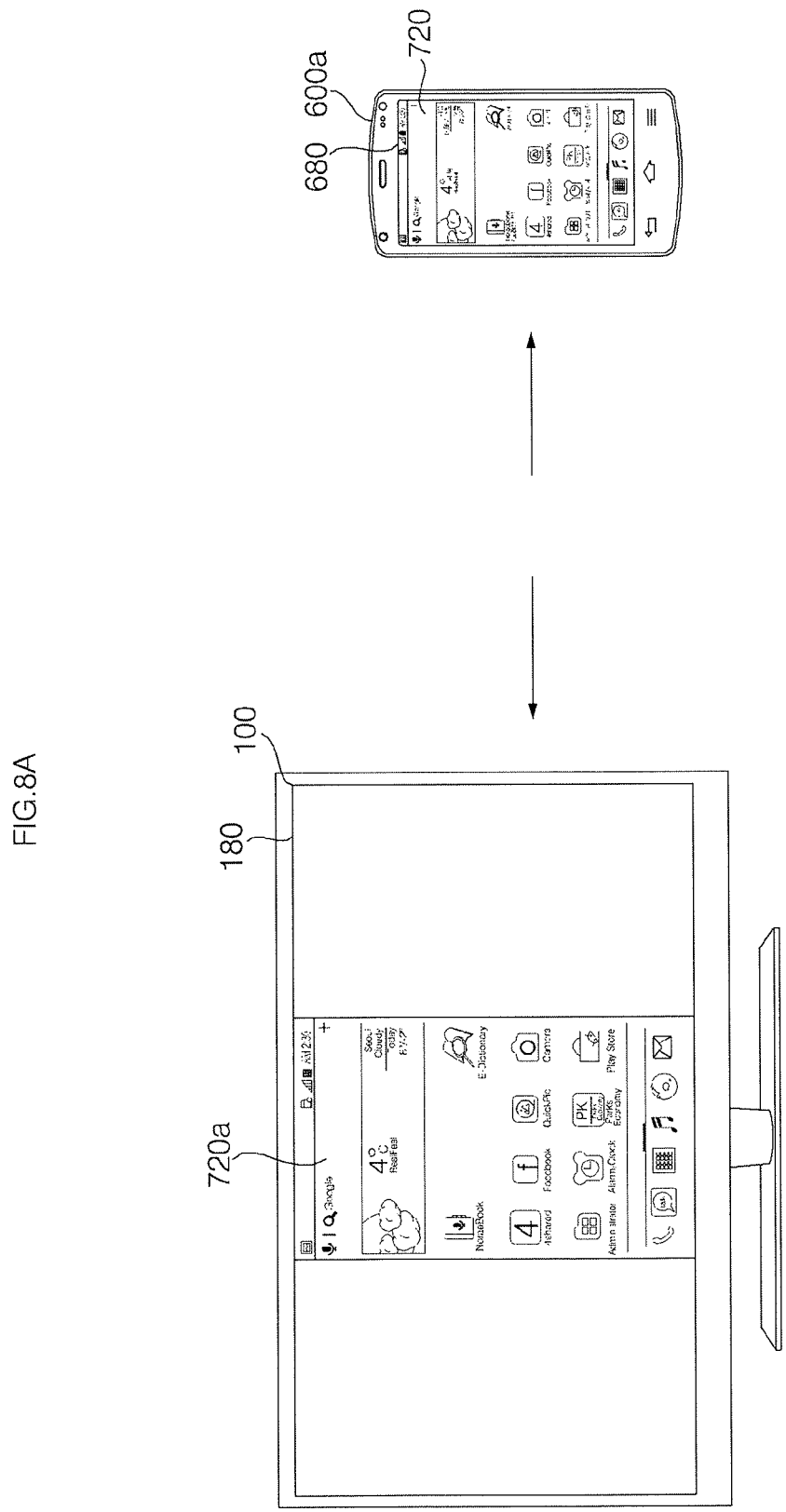

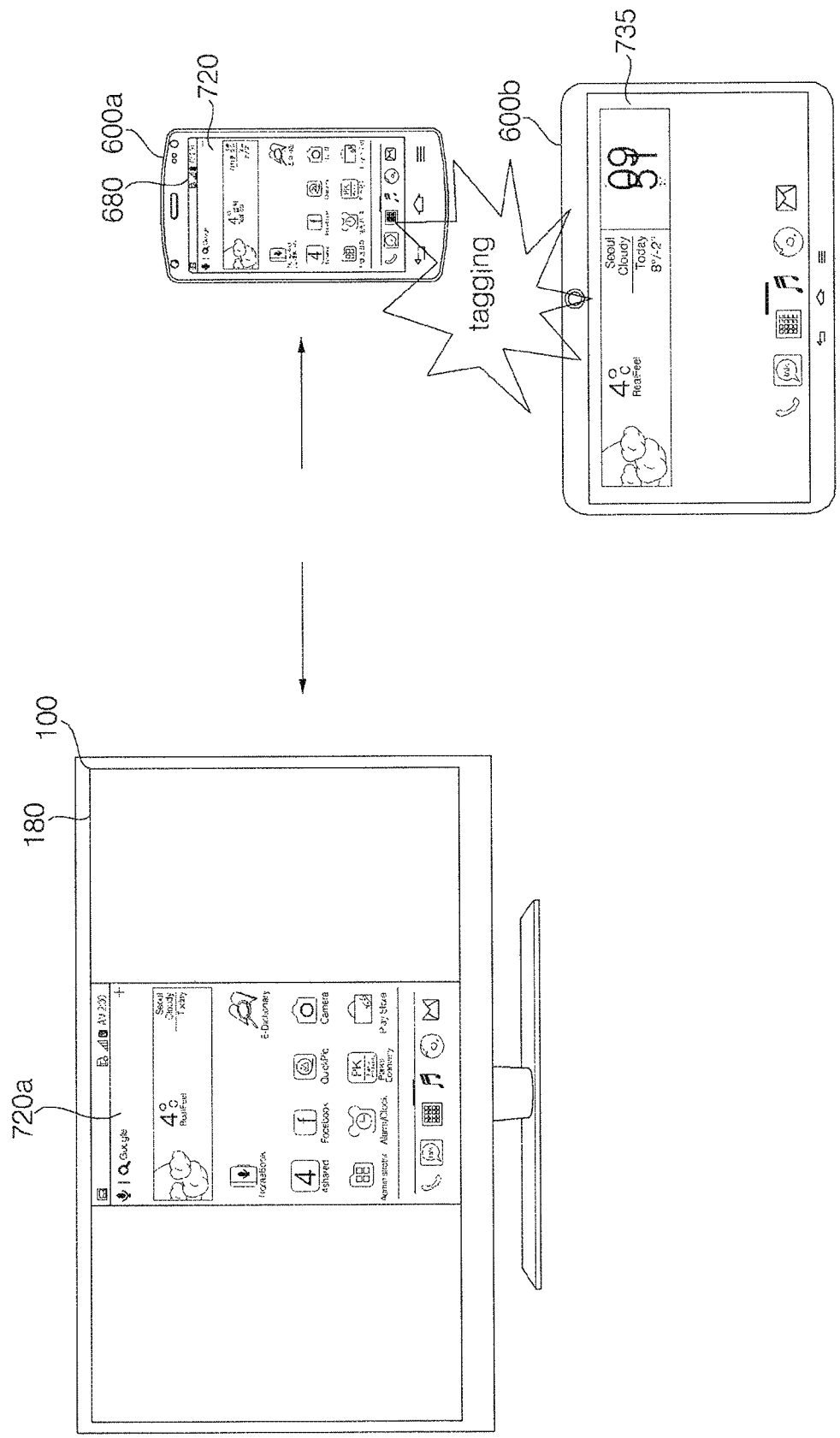

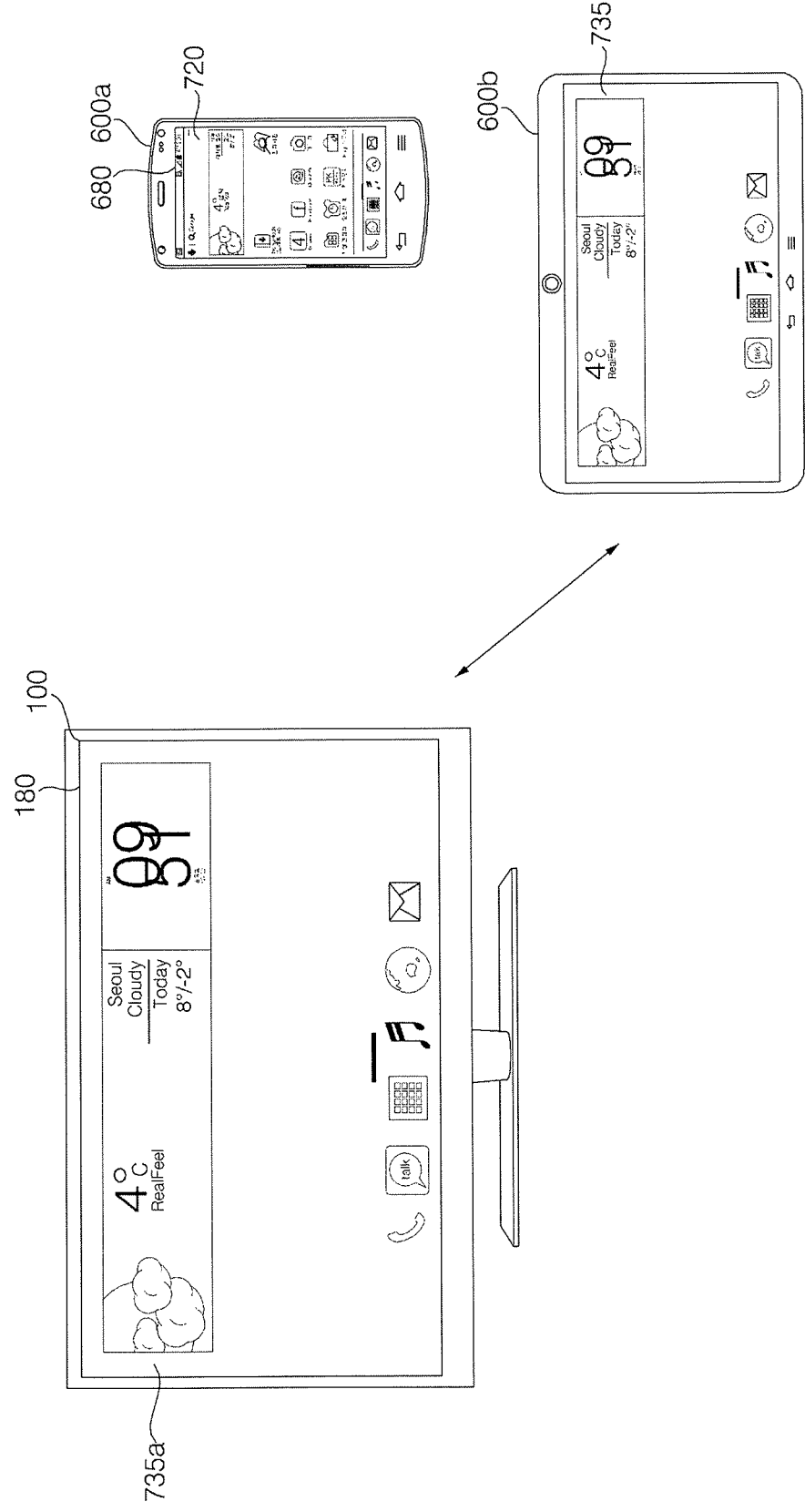

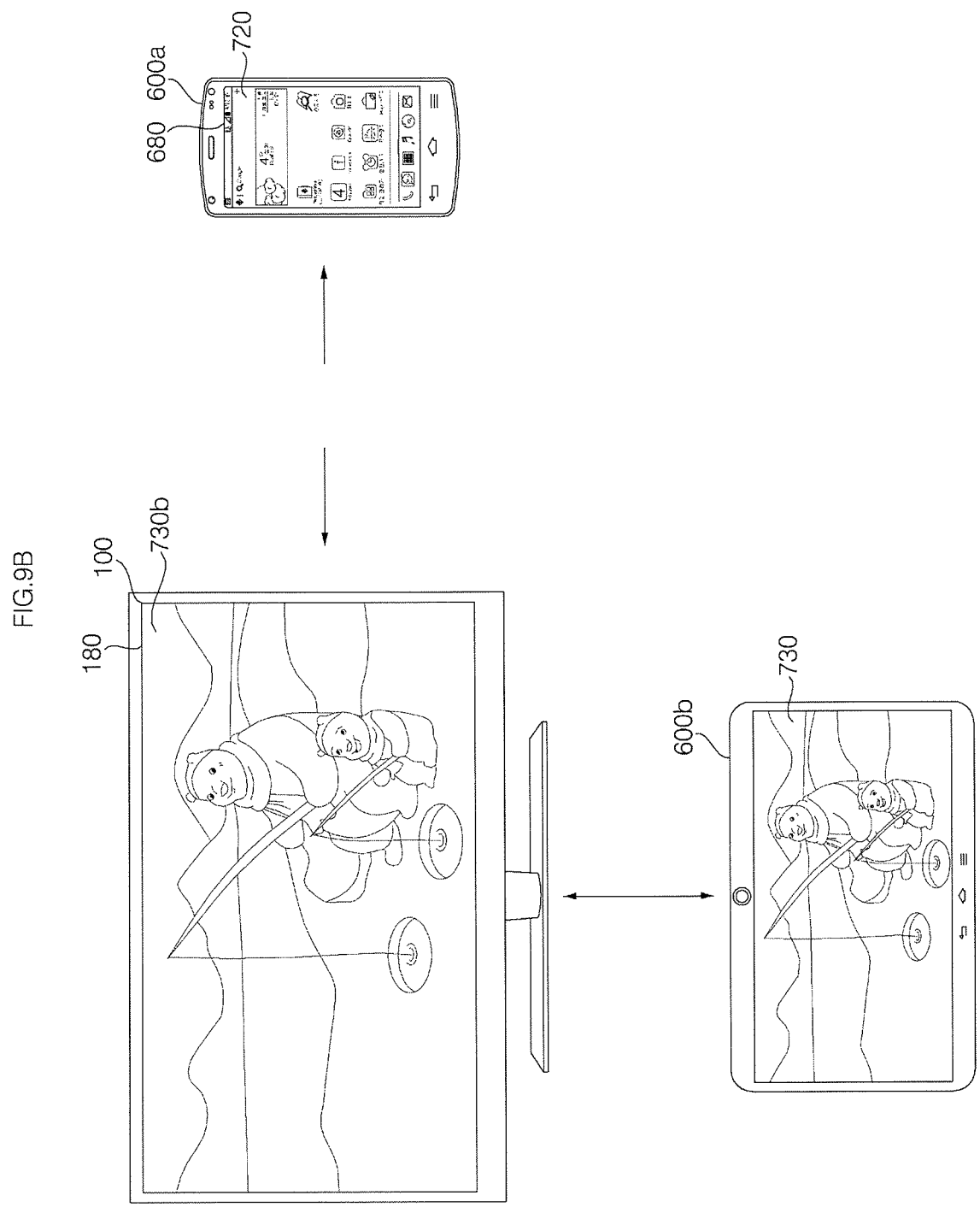

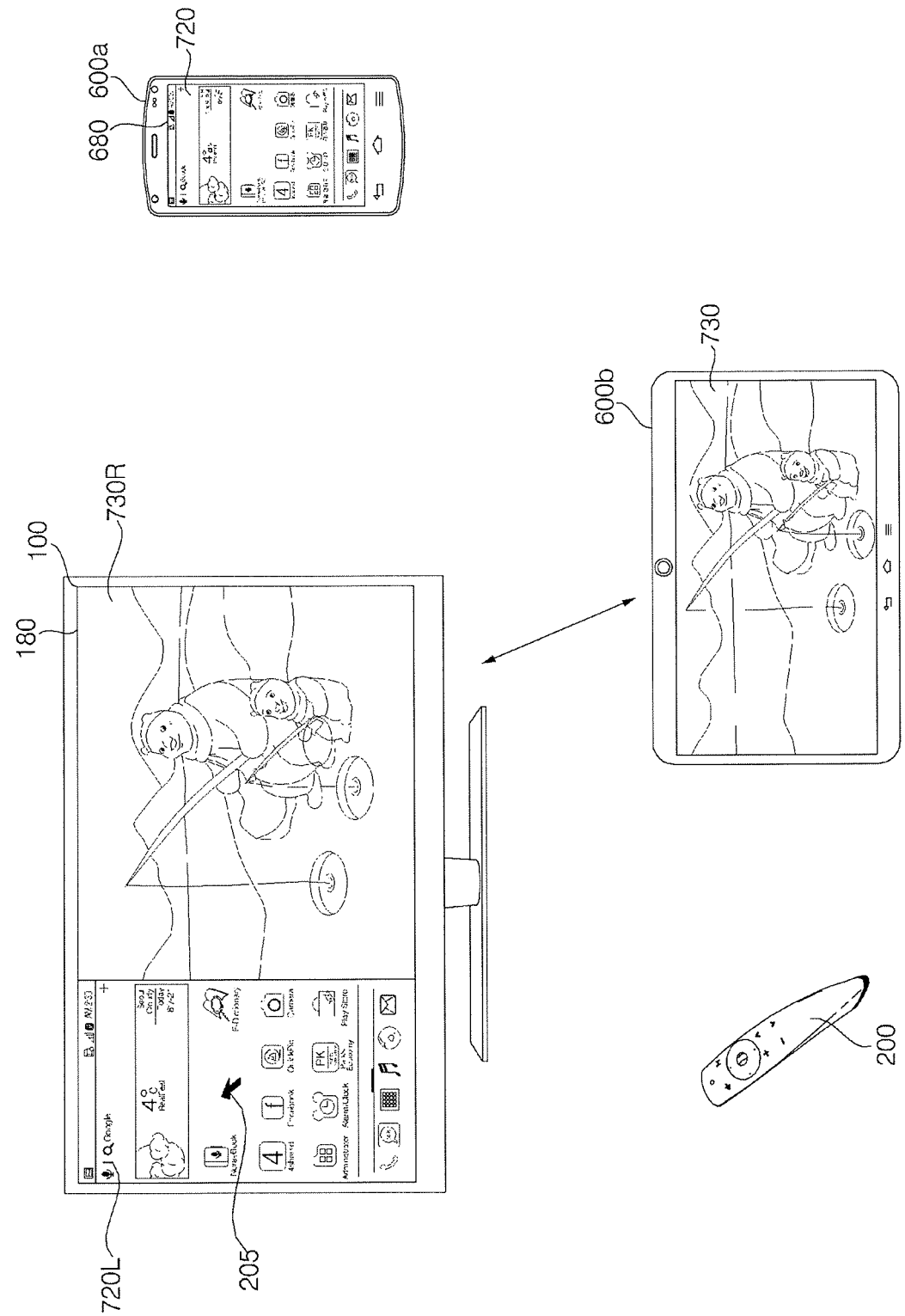

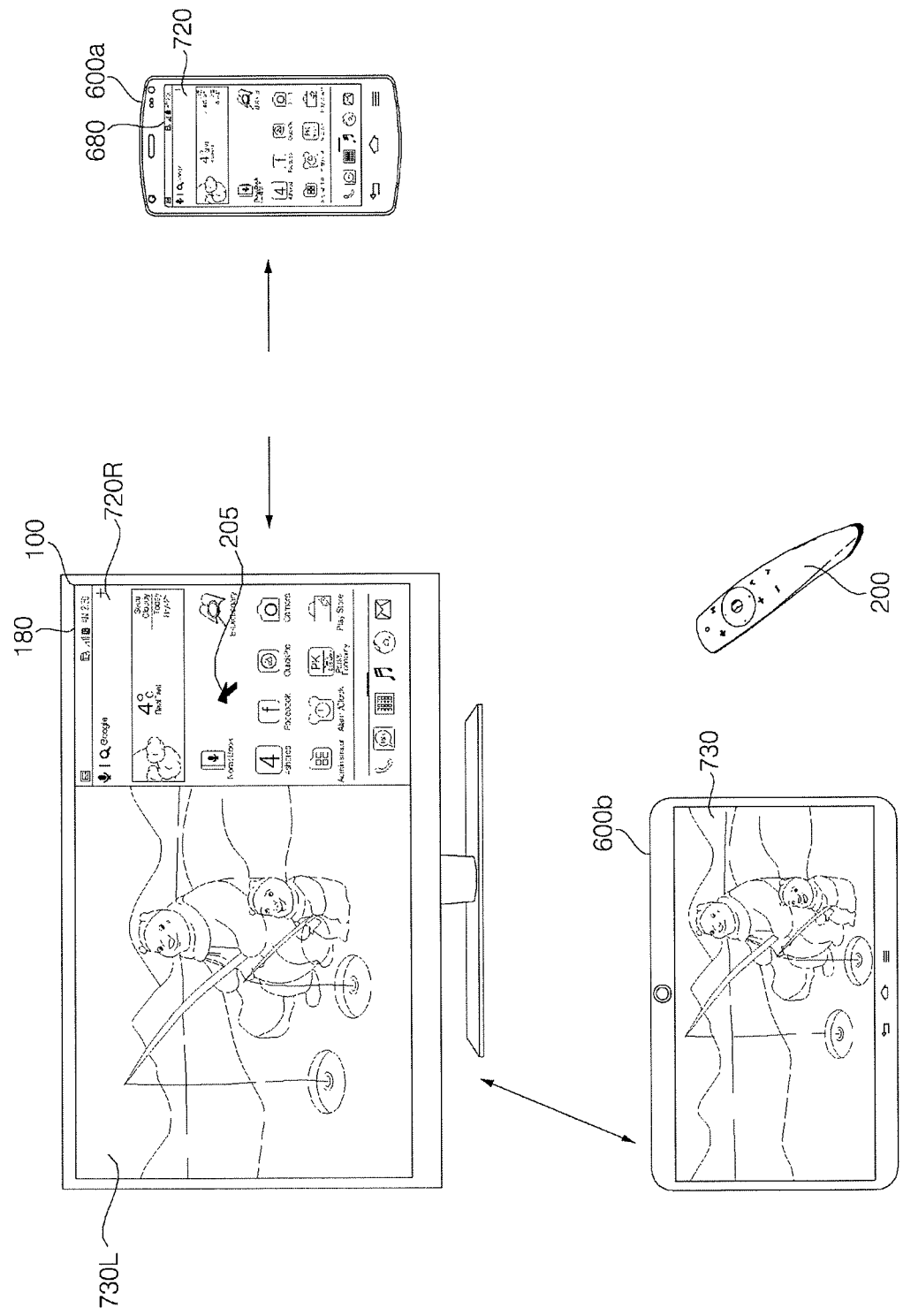

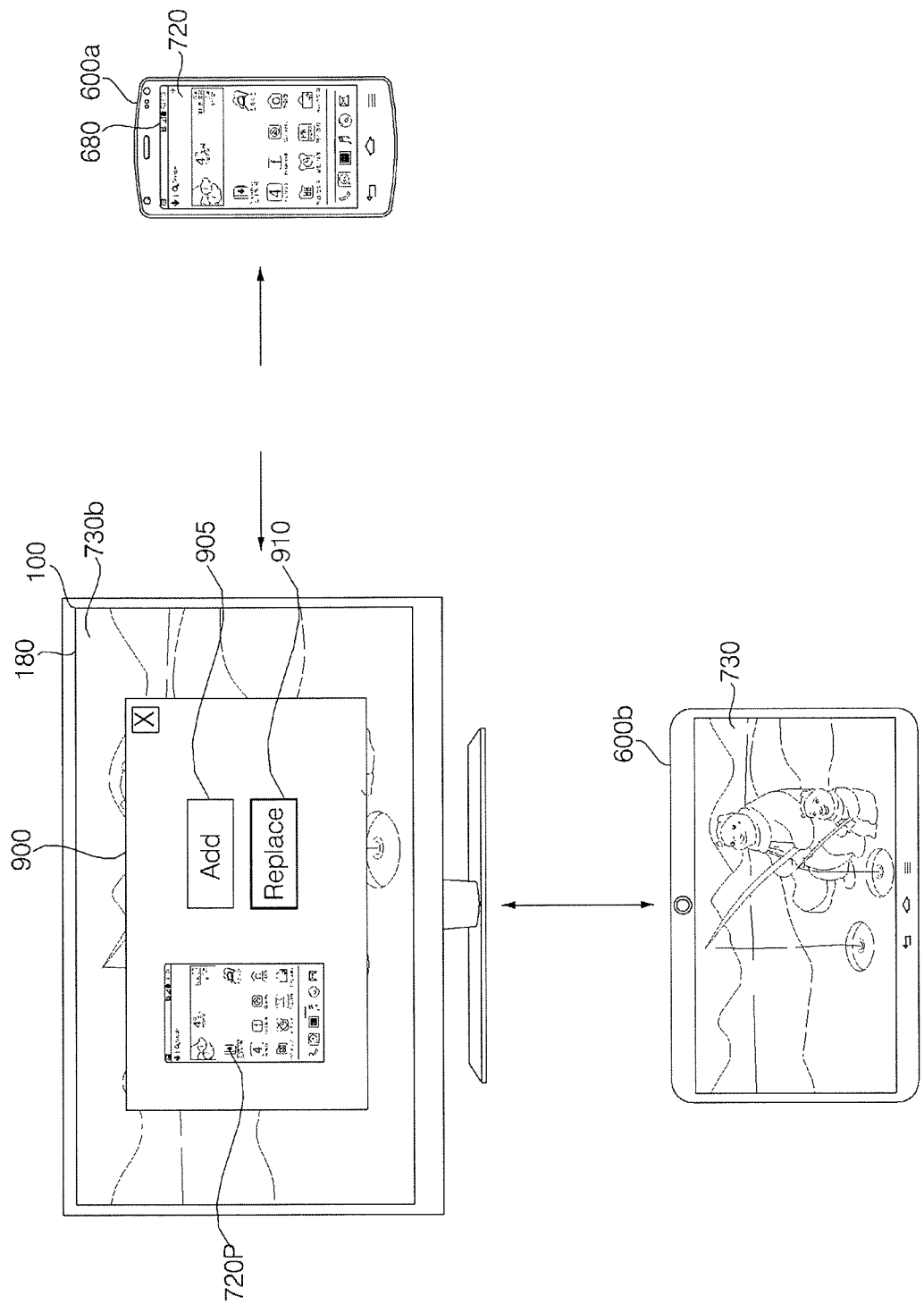

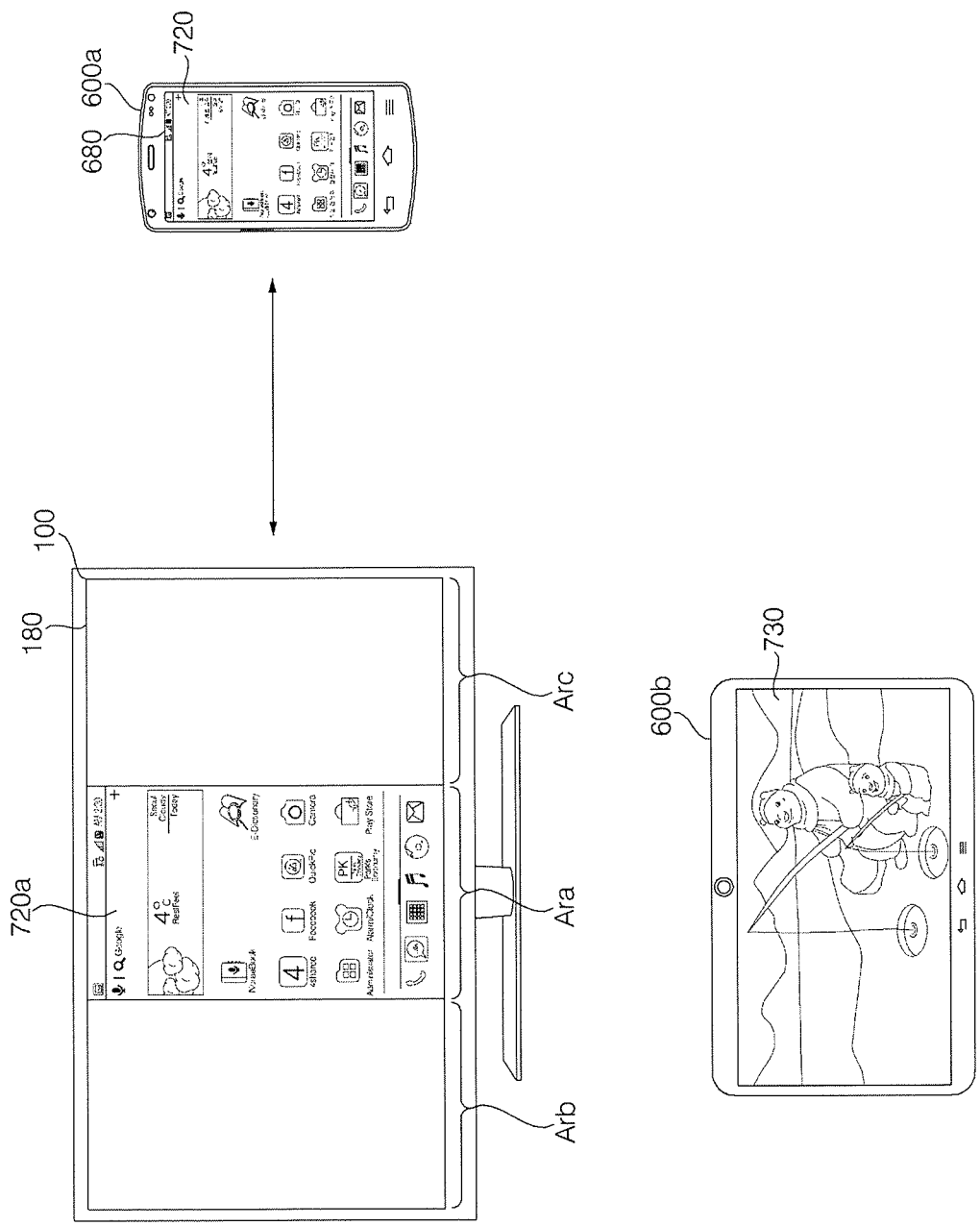

FIG. 13G
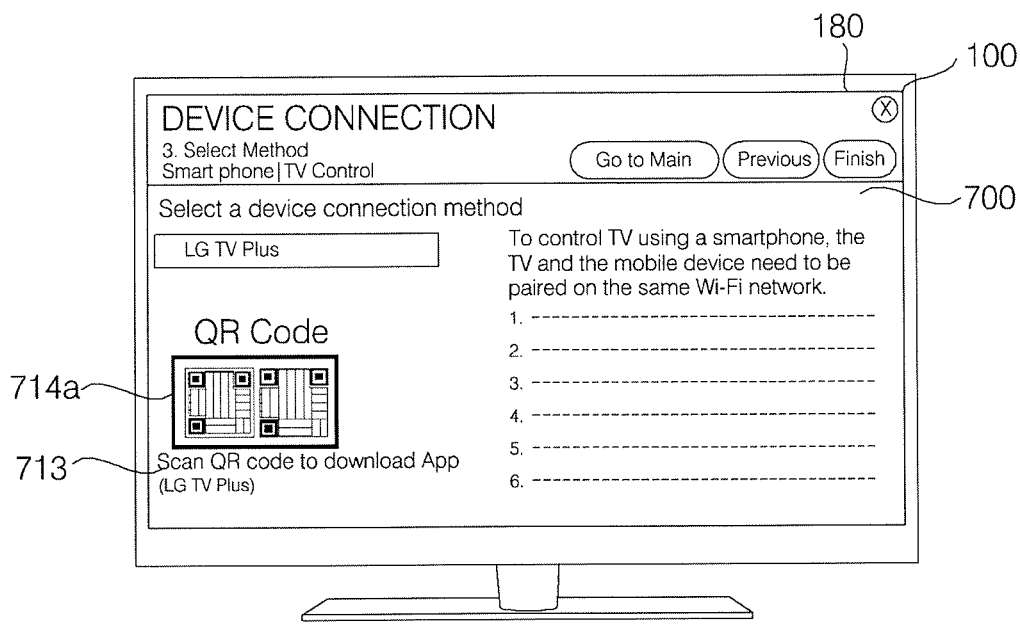
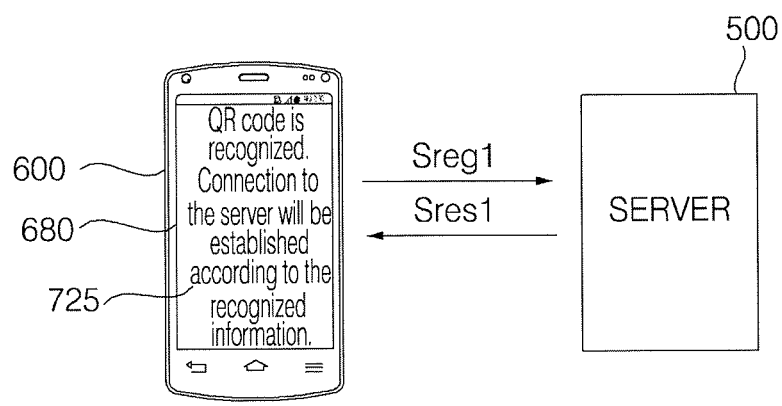

FIG. 13H
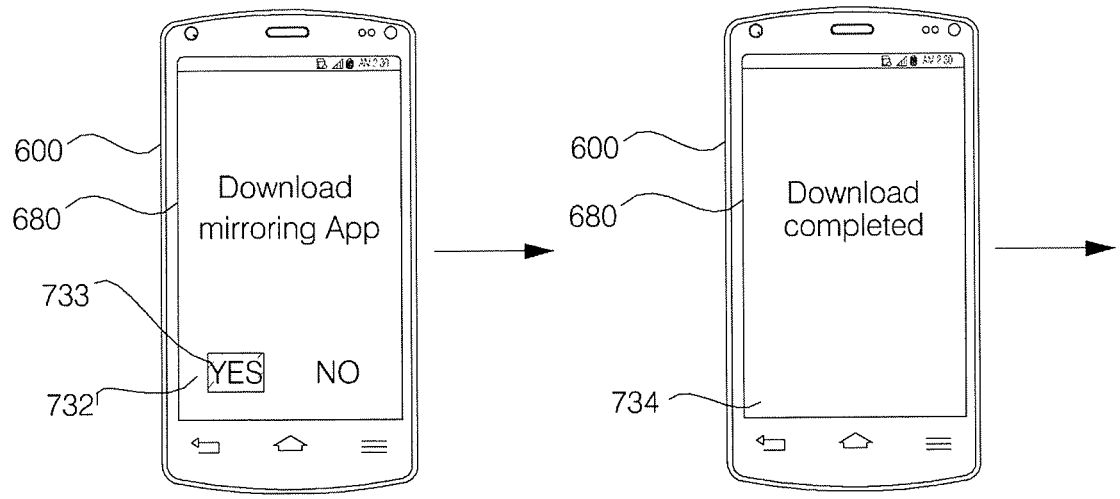
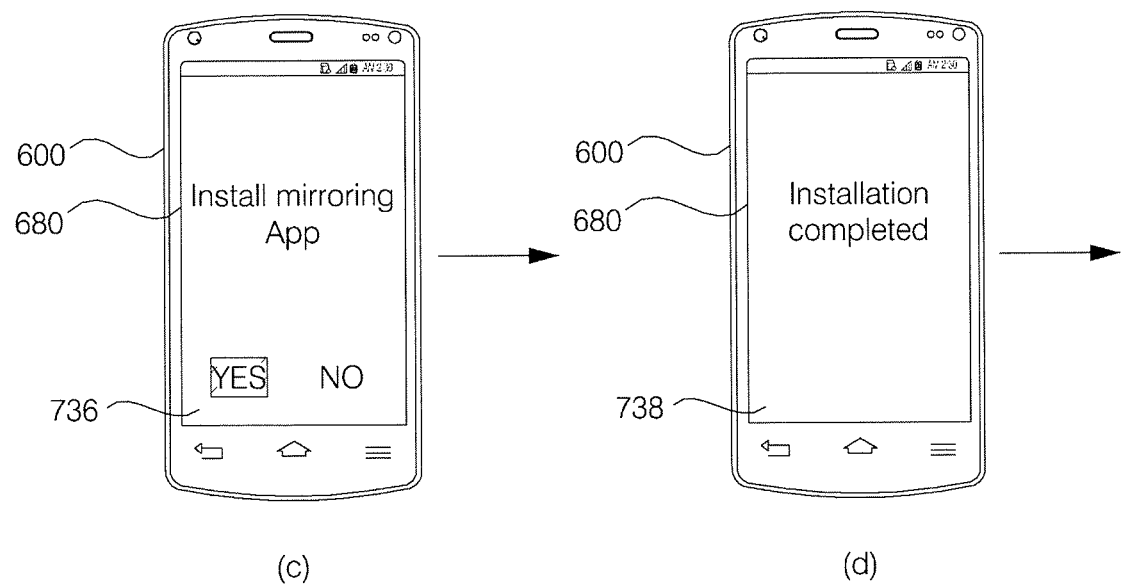

FIG. 17E
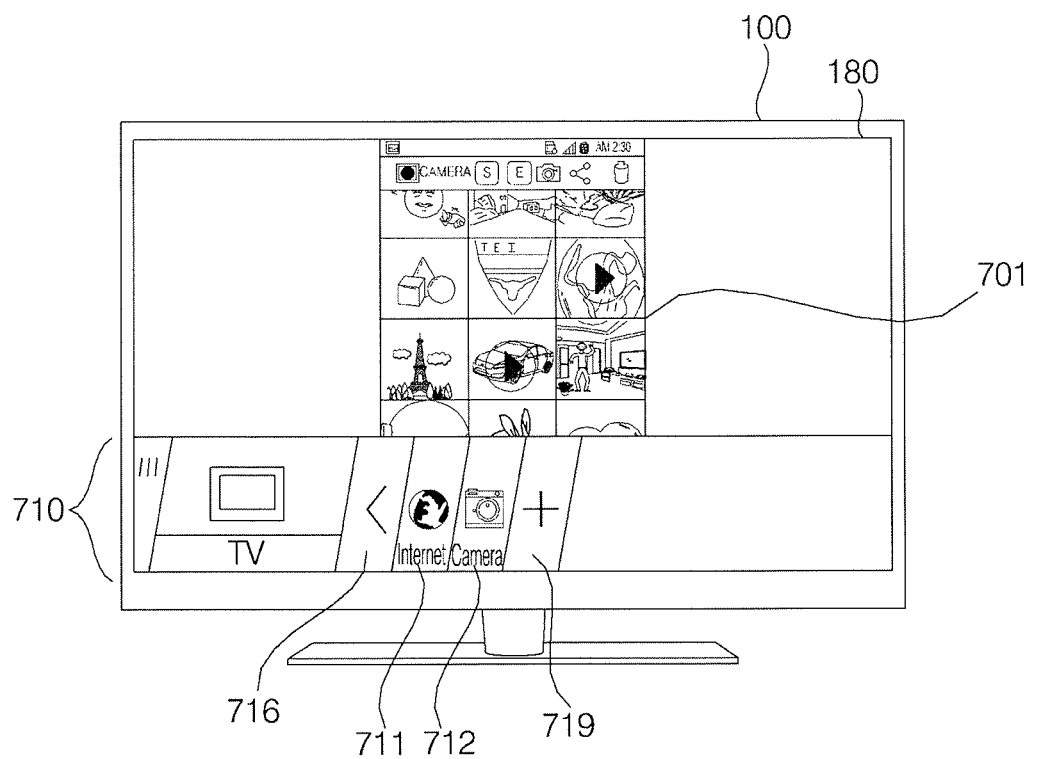
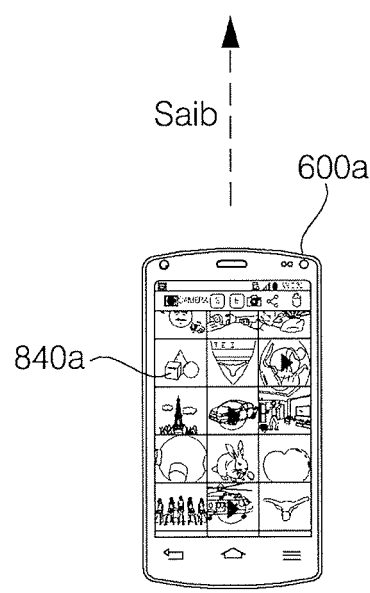

IMAGE DISPLAY APPARATUS

CROSS-REFERENCE TO RELATED APPLICATION

This application claims the priority benefit of Korean Patent Application No. 10-2016-0040289, filed on Apr. 1, 2016 in the Korean Intellectual Property Office, the disclosure of which is incorporated herein by reference.

BACKGROUND OF THE INVENTION

1. Field of the Invention

The present invention relates to an image display apparatus and, more particularly, to an image display apparatus capable of displaying various mirroring images between the image display apparatus and external devices.

2. Description of the Related Art

An image display apparatus provides images viewable by a user. The user can watch a broadcast program through the image display apparatus. The image display apparatus provides a broadcast program selected by the user among broadcast signals transmitted from broadcast stations, and displays broadcast images on the display. Currently, the broadcasting technology is transitioning from analog broadcasting to digital broadcasting around the world.

Digital broadcasting refers to broadcasting for transmitting digital images and voice signals. Compared to analog broadcasting, digital broadcasting is robust to external noises and thus suffers lower data loss. Further, digital broadcasting is advantageous in terms of error correction, and provides high definition and clear images. In contrast with analog broadcasting, digital broadcasting enables bidirectional services.

SUMMARY OF THE INVENTION

Therefore, the present invention has been made in view of the above problems, and it is an object of the present invention to provide an image display apparatus capable of displaying various mirroring images between the image display apparatus and external devices.

Another object of the present invention is to provide an image display apparatus capable of facilitating mirroring between the mobile terminal and the image display apparatus.

In accordance with one aspect, the present invention provides an image display apparatus including a display, an interface unit to exchange data with at least one external device, and a controller to perform a control operation to display, when a first mirroring image is received from a first external device, the first mirroring image and to display, when a second mirroring image is received from a second external device, the second mirroring image.

In accordance with another aspect, the present invention provides an image display apparatus including a display, an interface unit to exchange data with at least one external device, and a controller to perform a control operation to display, when a second mirroring image is received from a second external device with a first mirroring image from a first external device displayed, an object indicating whether or not to add or substitute the second mirroring image.

BRIEF DESCRIPTION OF THE DRAWINGS

The above and other objects, features and other advantages of the present invention will be more clearly understood from the following detailed description taken in conjunction with the accompanying drawings, in which:

FIG. 4A illustrates a method for controlling the remote control device of FIG. 2.

FIG. 6 is a flowchart illustrating operation of an image display apparatus and external device according to an embodiment of the present invention;

FIGS. 7A to 11F illustrate the operation method of FIG. 6;

FIGS. 17A to 17H illustrate the operation method of FIG. 16.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

As used herein, the suffixes "module" and "unit" are added to simply facilitate preparation of this specification and are not intended to suggest special meanings or functions. Therefore, the suffixes "module" and "unit" may be used interchangeably.

Figure 1:
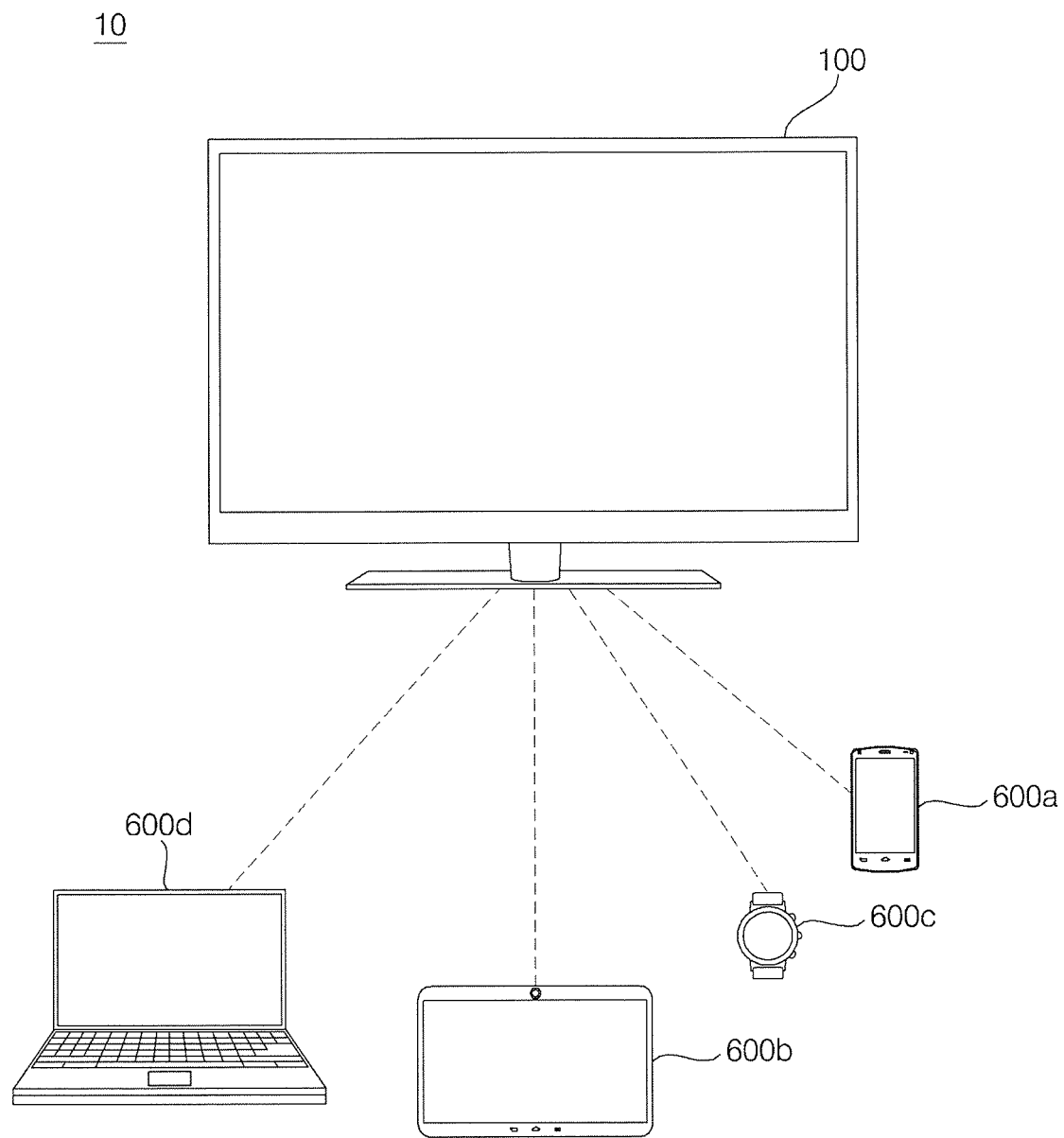
FIG. 1 illustrates an image display system for mirroring according to an embodiment of the present invention.

FIG. 1 illustrates an image display system for mirroring according to an embodiment of the present invention. Referring to FIG. 1, an image display system 10 for mirroring may include an image display apparatus 100, a server, and external devices including a mobile terminal 600*a*, a tablet 600*b*, a wearable device 600*c*, and a laptop computer 600*d*.

The image display apparatus 100 and at least one of the external devices can perform mirroring. Specifically, the image display apparatus 100 and at least one of the mobile terminal 600*a*, tablet 600*b*, wearable device 600*c* and laptop computer 600*d* can perform mirroring.

Figure 2:
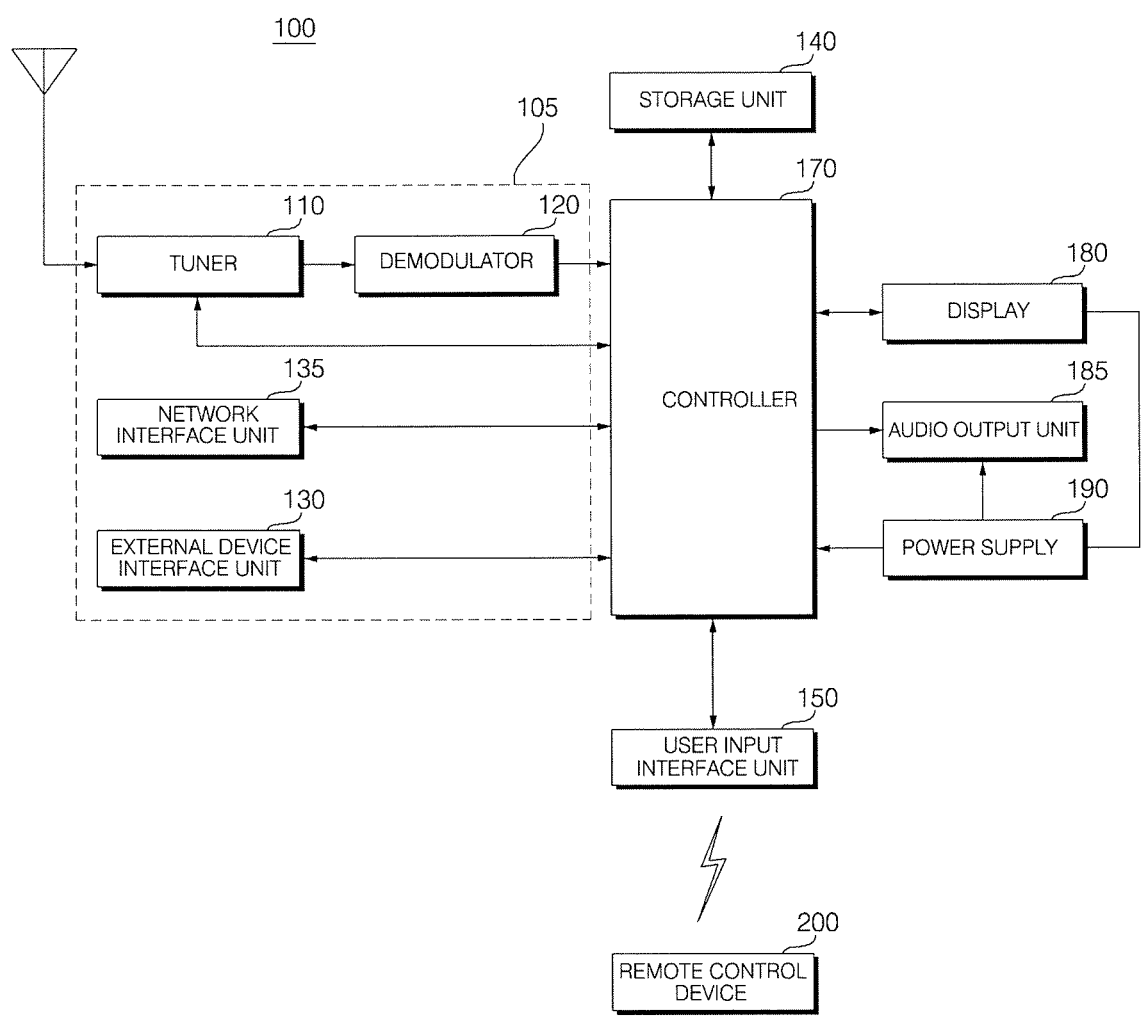
FIG. 2 is an internal block diagram illustrating the image display apparatus of FIG. 1.

Further, the image display apparatus 100 can display a received mirroring image on a display 180. According to an embodiment of the present invention as shown in FIG. 2, the image display apparatus 100 may include a display 180, an interface unit 130 or 135 to exchange data with at least one external device, and a controller 170 to perform a control operation to display a first mirroring image when the first mirroring image is received from a first external device and to display a second mirroring image when the second mirroring image is received from a second external device. Thereby, various mirroring images can be displayed between the image display apparatus 100 and the external devices.

Further, when the first external device is located within a predetermined distance, the controller 170 performs pairing with the first external device, and performs a control operation to display an object indicating the first paired external device when the pairing is completed. Thereby, the first paired external device can be easily checked. When a first mirroring image is received from a first external device with a first image displayed, the first image and the first mirroring image are displayed together. Thereby, the image which is being viewed and the mirroring image can be checked together.

When a second mirroring image is received from a second external device with the first mirroring image displayed, the first mirroring image and the second mirroring image are controlled to be displayed together. Thereby, the first and second mirroring images can be checked together. Further, when the second mirroring image is received from the second external device with the first mirroring image displayed, an object indicating whether or not to add or substitute the second mirroring image may be displayed. Thereby, a method to display the mirroring image can be selected, and accordingly user convenience is enhanced.

When the second mirroring image is received from the second external device with the first mirroring image displayed, a preview image for the second mirroring image can be displayed. Thereby, the preview image may be referenced in selecting a method to display the second mirroring image, and accordingly user convenience is enhanced.

In addition, a pointer is controlled to be displayed on a display 180 based on a pointing signal of a remote control device, a display location of the second mirroring image is determined based on the location of the pointer, and the second mirroring image is displayed at the determined display location. Thereby, the mirroring image can be disposed in an area desired by the user, and thus user convenience is enhanced.

According to another embodiment of the present invention, an image display apparatus 100 includes a display 180, an interface unit 130 or 135 to exchange data with at least one external device, and a controller 170 to perform a control operation to display, when a second mirroring image is received from a second external device with a first mirroring image from a first external device displayed, an object indicating whether or not to add or substitute the second mirroring image. Thereby, a method to display the second mirroring image may be selected, and thus user convenience can be enhanced.

If pairing with the mobile terminal 600a is performed while an image is being displayed on the display 180, the controller 170 of the image display apparatus 100 can perform a control operation to display an object indicating the paired mobile terminal 600a in the image. Thereby, completion of the pairing can be easily recognized while the displayed image is viewed.

If pairing with the mobile terminal 600a is performed while a broadcast image based on a broadcast signal received from a broadcast receiver 105 is being displayed, the controller 170 of the image display apparatus 100 can perform a control operation to display an object indicating the paired mobile terminal 600a.

To perform pairing, the image display apparatus 100 can wirelessly transmit a pairing signal, and the mobile terminal 600a can transmit a pairing response signal in response to the pairing signal. Thereby, pairing can be performed and the mobile terminal 600a and the image display apparatus 100 can be connected to each other.

Herein, the pairing signal and the pairing response signal may be Bluetooth low energy (BLE) signals. In particular, the image display apparatus 100 may periodically transmit a BLE pairing signal. In addition to the pairing signal, the image display apparatus 100 may further transmit device information including the device ID of the image display apparatus.

If the object indicating the paired mobile terminal 600a is selected, the controller 170 of the image display apparatus 100 can perform a control operation to display an application list related to the paired mobile terminal 600a. When a first application item is selected in the application list related to the paired mobile terminal 600a, the controller 170 can send a request for a screen window related to the first application to the mobile terminal 600a, and perform a control operation to display an image for execution of the first application on the display based on information received from the mobile terminal 600a.

That is, when the first application item is selected in the application list related to the paired mobile terminal 600a, the controller 170 can perform a control operation to implement mirroring. The communication scheme for pairing may be different from the communication scheme for mirroring.

To improve data transfer rate in performing mirroring, if the source of moving images reproduced in the mobile terminal 600a is a coded video signal, the mobile terminal 600a can transmit the coded video signal to the image display apparatus 100 without decoding and reproducing the coded video signal, and the image display apparatus 100 can decode the coded video signal and reproduce and display the decoded video signal.

If the mobile terminal 600a approaches the image display apparatus 100 within a predetermined distance allowing pairing, the controller 170 of the image display apparatus 100 can perform pairing. The controller 170 can perform a control operation to transmit a pairing signal. If the mobile terminal 600a approaches within a predetermined distance enabling pairing, the controller 170 cancan receive a pairing response signal from the mobile terminal 600a, and perform pairing based on the pairing response signal.

As described above, the image display apparatus 100 can transmit a pairing signal, and the mobile terminal 600a can transmit a pairing response signal. Alternatively, the mobile terminal 600a can transmit a pairing signal, and the image display apparatus 100 can transmit a pairing response signal. A more detailed description will be given of various operation methods for the image display apparatus 100 and external devices, with reference to FIG. 6.

Next, FIG. 2 is an internal block diagram illustrating the image display apparatus 100 of FIG. 1. Referring to FIG. 2, the image display apparatus 100 according to an embodiment may include a broadcast receiver 105, an external device interface unit 130, a storage unit 140, a user input interface unit 150, a sensor unit, a controller 170, a display 180, and an audio output unit 185.

The broadcast receiver 105 may include a tuner 110, a demodulator 120, a network interface unit 130, and an external device interface unit 135. In contrast with the example of the figure, the broadcast receiver 105 may include only the tuner 110, the demodulator 120, and the external device interface unit 135. That is, the network interface unit 130 may not be included.

The tuner 110 selects a channel selected by a user from among radio frequency (RF) broadcast signals received through an antenna or an RF broadcast signal corresponding to all pre-stored channels. In addition, the tuner 110 converts the selected RF broadcast signal into a middle-frequency signal, a base band image, or a voice signal. For example, if the selected RF broadcast signal is a digital broadcast signal, the signal is converted into a digital IF (DIF) signal. If the selected RF broadcast signal is an analog broadcast signal, the signal is converted into a baseband image or a voice signal (CVBS/SIF). That is, the tuner 110 can process a digital broadcast signal or an analog broadcast signal. The analog baseband image or voice signal (CVBS/SIF) output from the tuner 110 may be directly input to the controller 170.

In this embodiment, the tuner 110 can sequentially select an RF broadcast signal for all stored broadcast channels from among RF broadcast signals received through the antenna through the channel memorization function, and convert the same into a middle-frequency signal, baseband image, or voice signal.

To receive broadcast signals of a plurality of channels, a plurality of tuners 110 may be provided. Alternatively, a single tuner to receive a plurality of channels simultaneously may be provided. The demodulator 120 receives and demodulates the DIF signal converted by the tuner.

After performing demodulation and channel decoding, the demodulator 120 may output a stream signal (TS). Herein, the stream signal may be a signal obtained by multiplexing an image signal, voice signal or data signal. The stream signal output from the demodulator 120 can be input to the controller 170. After performing demultiplexing and image/voice signal processing, the controller 170 outputs an image to the display 180 and voice to the audio output unit 185.

The external device interface unit 130 can transmit or receive data to or from a connected external device, e.g., a set-top box. Thus, the external device interface unit 130 may include an A/V input/output unit. The external device interface unit 130 may be connected to external devices such as a DVD (digital versatile disk), a Blu-ray, a gaming device, a camera, a camcorder, a computer (laptop), and a set-top box in a wired/wireless manner, and perform input/output operations with external devices.

The A/V input/output unit can receive image and voice signals input from an external device. A wireless communication unit can perform short-range wireless communication with other electronic devices. The external device interface unit 130 can exchange data with a neighboring mobile terminal 600 via the wireless communication unit. In particular, in the mirroring mode, the external device interface unit 130 can receive device information, information about an executed application and an application image from the mobile terminal 600.

The network interface unit 135 provides an interface for connection with a wired/wireless network including the Internet. For example, the network interface unit 135 can receive content or data provided by a content provider or a network operator over a network. The network interface unit 135 may include a wireless communication unit.

The storage unit 140 can store programs for processing and control of signals in the controller 170, and also store a signal-processed image, voice signal or data signal. The storage unit 140 can function to temporarily store an image signal, a voice signal or a data signal input through the external device interface unit 130. In addition, the storage unit 140 can store information about a predetermined broadcast channel through the channel memorization function such as a channel map.

While it is illustrated in FIG. 2 that the storage unit 140 is provided separately from the controller 170, embodiments of the present invention are not limited thereto. The storage unit 140 can be provided in the controller 170.

In addition, the user input interface unit 150 can transmit a signal input by the user to the controller 170 or transmit a signal from the controller 170 to the user. For example, the user input interface unit 150 can transmit/receive user input signals such as power on/off, channel selection, and screen window setting to/from the remote control device 200, deliver, to the controller 170, user input signals input through local keys such as a power key, a channel key, a volume key, or a setting key, deliver, to the controller 170, user input signals input through a sensor unit configured to sense gesture of the user, or transmit a signal from the controller 170 to the sensor unit.

The controller 170 can demultiplex streams input through the tuner 110, demodulator 120, network interface unit 135 or external device interface unit 130, or process demultiplexed signals. Thereby, the controller 170 can generate an output signal for outputting an image or voice.

An image signal image-processed by the controller 170 can be input to the display 180 and an image corresponding to the image signal can be displayed. In addition, the image signal which is image-processed by the controller 170 can be input to an external output device through the external device interface unit 130.

A voice signal processed by the controller 170 can be output to the audio output unit 185 in the form of sound. In addition, the voice signal processed by the controller 170 can be input to an external output device through the external device interface unit 130.

In addition, the controller 170 may include a demultiplexer and an image processor, which will be described with reference to FIG. 3 later. Additionally, the controller 170 can control overall operation of the image display apparatus 100. For example, the controller 170 can control the tuner 110 to tune in RF broadcasting corresponding to a channel selected by the user or a pre-stored channel.

The controller 170 can also control the image display apparatus 100 according to a user command input through the user input interface unit 150 or an internal program. Further, the controller 170 can control the display 180 to display an image. Herein, the image displayed on the display 180 may be a still image, a moving image, a 2D image, or a 3D image.

In addition, the controller 170 can perform a control operation to display the predetermined 2D object in an image displayed on the display 180. For example, the object may be at least one of an accessed web page (a newspaper, a magazine, etc.), an EPG (electronic program guide), various menus, a widget, an icon, a still image, a moving image and a text.

The controller 170 can recognize the location of the user based on an image captured by a capture unit. For example, the controller 170 can recognize the distance between the user and the image display apparatus 100 (i.e., a z-axis coordinate). Additionally, the controller 170 can recognize an x-axis coordinate and y-axis coordinate corresponding to the location of the user in the display 180.

The display 180 generates drive signals by converting an image signal, data signal, OSD signal, and control signal processed by the controller 170 or an image signal, data signal and control signal received from the external device interface unit 130. The display 180 may be a PDP, A LCD display, OLED display, a flexible display, or a 3D display. The 3D display 180 may also be divided into a non-glasses type and a glasses type. The display 180 may be configured by a touchscreen to be used not only as an output device but also as an input device.

The audio output unit 185 receives a voice signal processed by the controller 170 and outputs voice. In addition, the capture unit captures an image of the user and may be implemented using one camera. However, embodiments of the present invention are not limited thereto. The capture unit may be implemented using a plurality of cameras. The capture unit may also be buried in the upper portion of the display 180 of the image display apparatus or may be separately disposed. Image information captured by the capture unit can be input to the controller 170.

Further, the controller 170 can sense gesture of the user based on an image captured by the capture unit, a sensed signal from the sensor unit, or a combination thereof. In addition, the power supply 190 supplies power to overall parts of the image display apparatus 100. In particular, the power supply 190 can supply power to the controller 170, which may be implemented in the form of system on chip (SOC), the display 180 for display of images, and the audio output unit 185 for outputting audio signals. Specifically, the power supply 190 may include a converter to convert alternating current (AC) power into direct current (DC) power and a DC-DC converter to change the level of the DC power.

The remote control device 200 transmits a user input to the user input interface unit 150. Thus, the remote control device 200 may employ Bluetooth, radio frequency (RF) communication, infrared (IR) communication, untra-wide-band (UWB), or ZigBee. In addition, the remote control device 200 can receive an image signal, a voice signal or a data signal from the user input interface unit 150, and display or output the same.

The image display apparatus 100 may be a fixed or mobile digital broadcast receiver capable of receiving digital broadcast services. The block diagram of the image display apparatus 100 shown in FIG. 2 is simply illustrative. Constituents of the block diagram may be integrated, added or omitted according to the specification of the image display apparatus 100 which is implemented in reality. That is, two or more constituents may be combined into one constituent, or one constituent may be subdivided into two or more constituents, when necessary. In addition, the function performed in each block is simply illustrative, and it should be noted that specific operations or devices of the blocks do not limit the scope of the present invention.

Figure 3:
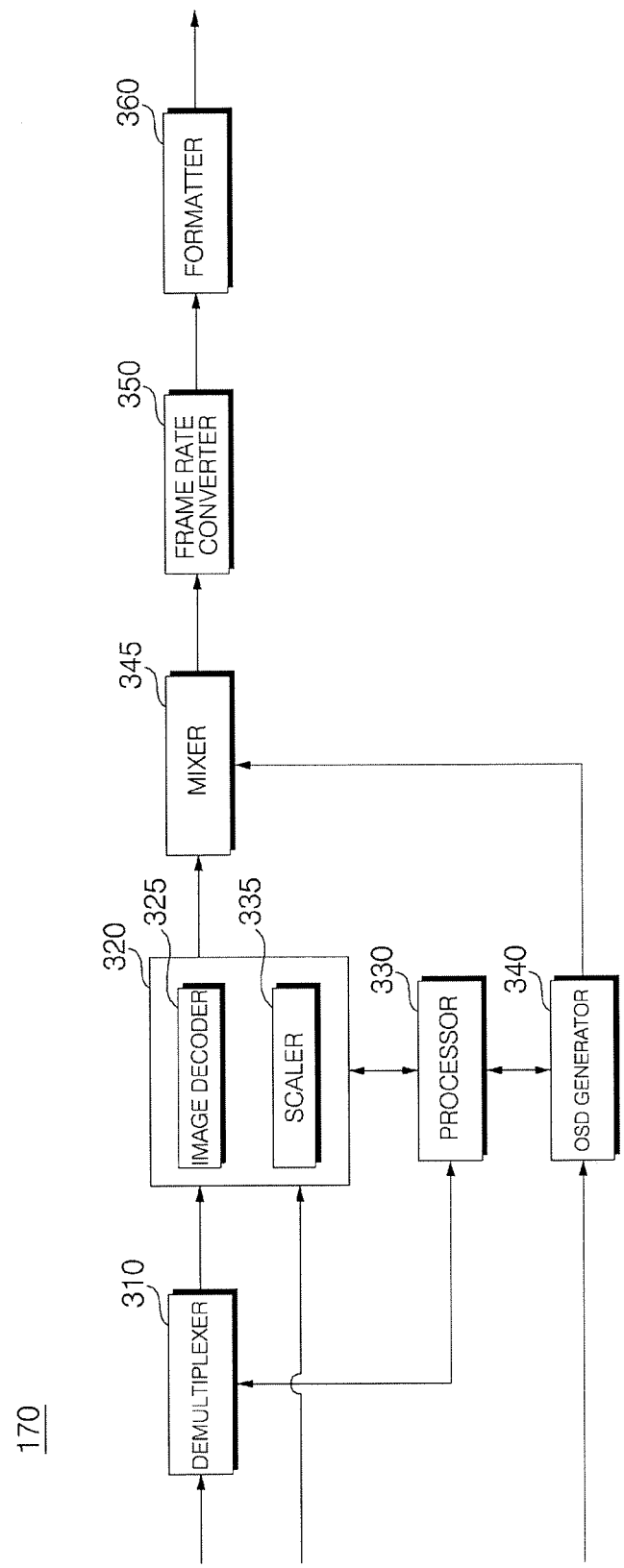
FIG. 3 is an internal block diagram illustrating the controller of FIG. 2.

Next, FIG. 3 is an internal block diagram illustrating the controller of FIG. 2. Referring to FIG. 3, the controller 170 according to an embodiment of the present invention may include a demultiplexer 310, an image processor 320, a processor 330, an OSD generator 340, a mixer 345, a frame rate converter 350, and a formatter 360.

The demultiplexer 310 demultiplexer an input stream. For example, when MPEG-2 TS is input, the demultiplexer 310 can demultiplex the same to separate the stream into an image signal, a voice signal and a data signal. Herein, the stream signal input to the demultiplexer 310 may be a stream signal output from the tuner 110, the demodulator 120 or the external device interface unit 130.

The image processor 320 can perform image processing on a demultiplexed image signal. Thus, the image processor 320 may include an image decoder 325 and a scaler 335. The image decoder 325 decodes the demultiplexed image signal, and the scaler 335 scales the resolution of the decoded image signal such that the image signal can be output through the display 180.

The image decoder 325 may include decoders of various standards. For example, the image decoder 325 may include an MPEG-2, an H.264 decoder, a 3D image decoder for color images and depth images, and a decoder for multi-viewpoint images. The processor 330 can control overall operation of the image display apparatus 100 or the controller 170. For example, the processor 330 can control the tuner 110 to tune in RF broadcasting corresponding to a channel selected by the user or a pre-stored channel.

In addition, the processor 330 can control the image display apparatus 100 according to a user command input through the user input interface unit 150 or an internal program. The processor 330 can control data transmission with the network interface unit 135 or the external device interface unit 130. In addition, the processor 330 can control operations of the demultiplexer 310, image processor 320 and OSD generator 340 in the controller 170.

The OSD generator 340 generates an OSD signal automatically or according to user input. For example, the OSD generator 340 can generate a signal for display of various kinds of information in the form of graphic images or texts on the screen of the display 180 based on a user input signal. The generated OSD signal may include various data including the user interface screen window of the image display apparatus 100, various menu screen windows, widget, and icons. The generated OSD signal may also include a 2D object or a 3D object.

The OSD generator 340 can generate a pointer which can be displayed on the display, based on a pointing signal input from the remote control device 200. In particular, the pointer can be generated by a pointing signal processor, and the OSD generator 340 may include the pointing signal generator. Of course, it is possible to provide the pointing signal processor separately from the OSD generator 340.

The mixer 345 can mix the OSD signal generated by the OSD generator 340 with an image signal processed and decoded by the image processor 320. The mixed image signal is provided to the frame rate converter 350. The frame rate converter (FRC) 350 can convert the frame rate of an input image. The FRC 350 can output the frame rate without performing separate frame rate conversion.

The formatter 360 can arrange a left image frame and right image frame of a 3D image produced through frame rate conversion. The formatter 360 can output a synchronization signal Vsync to open the left eye glass or right eye glass of a 3D view apparatus.

The formatter 360 can change the format of an input image signal to a format in which the corresponding image can be displayed on the display. The formatter 360 can change the format of a 3D image signal. For example, the formatter 360 can change the format of the 3D image signal to one of various 3D formats including a side-by-side format, a top/down format, a frame sequential format, an interlaced format, and a checker box format.

The formatter 360 can convert a 2D image signal into a 3D image signal. For example, the formatter 360 can detect an edge or a selectable object in a 2D image signal, and separate and generate the object according to the detected edge of the selectable object as a 3D image signal. In this instance, the generated 3D image signal can be separated into a left image signal L and a right image signal R to be aligned.

In addition, a 3D processor for 3-dimensional effect signal processing may be further disposed after the formatter 360. The 3D processor can perform processing such as adjustment of brightness, tint and color of an image signal to improve the 3D effect. For example, signal processing of making parts at a close distance clear and making parts at a far distance blurred can be performed. Such function of the 3D processor can be integrated into the formatter 360 or the image processor 320.

An audio processor in the controller 170 can process a demultiplexed voice signal. Thus, the audio processor may include various decoders. The audio processor in the controller 170 can perform processing such as adjustment of bass, treble, and volume.

The data processor in the controller 170 can perform data processing on a demultiplexed data signal. For example, if the demultiplexed data signal is a coded data signal, the data processor can decode the data signal. The coded data signal may be electronic program guide information including broadcast information such as a start time and end time of a broadcast program broadcast on each channel.

The block diagram of the controller 170 shown in FIG. 3 is simply illustrative. Constituents of the block diagram may be integrated, added or omitted according to the specification of the controller 170 which is implemented in reality. In particular, the frame rate converter 350 and the formatter 360 can not be provided in the controller 170. Instead, they may be provided individually or provided as one separate module.

Next FIG. 4A illustrates a method for controlling the remote control device of FIG. 2. As shown in FIG. 4A(a), a pointer 205 corresponding to the remote control device 200 can be displayed on the display 180. The user can move the remote control device 200 up and down, left and right (FIG. 4A(b)), or back and forth (FIG. 4A(c)) or rotate the same. The pointer 205 displayed on the display 180 of the image display apparatus corresponds to movement of the remote control device 200. As shown in the figure, since the pointer 205 moves according to movement of the remote control device 200 in the 3D space, the remote control device 200 can be referred to as a spatial remote control or a 3D pointing device.

FIG. 4A(b) illustrates when the pointer 205 displayed on the display 180 moves to the left when the user moves the remote control device 200 to the left. Information about movement of the remote control device 200 sensed through a sensor of the remote control device 200 is transmitted to the image display apparatus. The image display apparatus can calculate coordinates of the pointer 205 based on the information about the movement of the remote control device 200. The image display apparatus can display the pointer 205 such that the pointer 205 corresponds to the calculated coordinates.

FIG. 4A(c) illustrates when the user moves the controller 170 away from display 180 while pressing down a specific button in the remote control device. In this instance, a selected area on the display 180 corresponding to the pointer 205 can be zoomed in and displayed with the size thereof increased. Further, when the user moves the remote control device 200 closer to the display 180, the selected area can be zoomed out and displayed with the size thereof reduced. Alternatively, the selected area can be zoomed out when the remote control device 200 moves away from the display 180, and can be zoomed in when the remote control device 200 moves closer to the display 180.

Vertical and lateral movement of the remote control device 200 may not be recognized while the specific button in the remote control device 200 is pressed down. That is, when the remote control device 200 approaches or moves away from the display 180, vertical and lateral movements thereof may not be recognized, but only back-and-forth movement thereof may be recognized. If the specific button in the remote control device 200 is not pressed down, the pointer 205 only moves according to vertical and lateral movements of the remote control device 200. The speed and direction of movement of the pointer 205 can correspond to the speed and direction of movement of the remote control device 200.

Figure 4B:
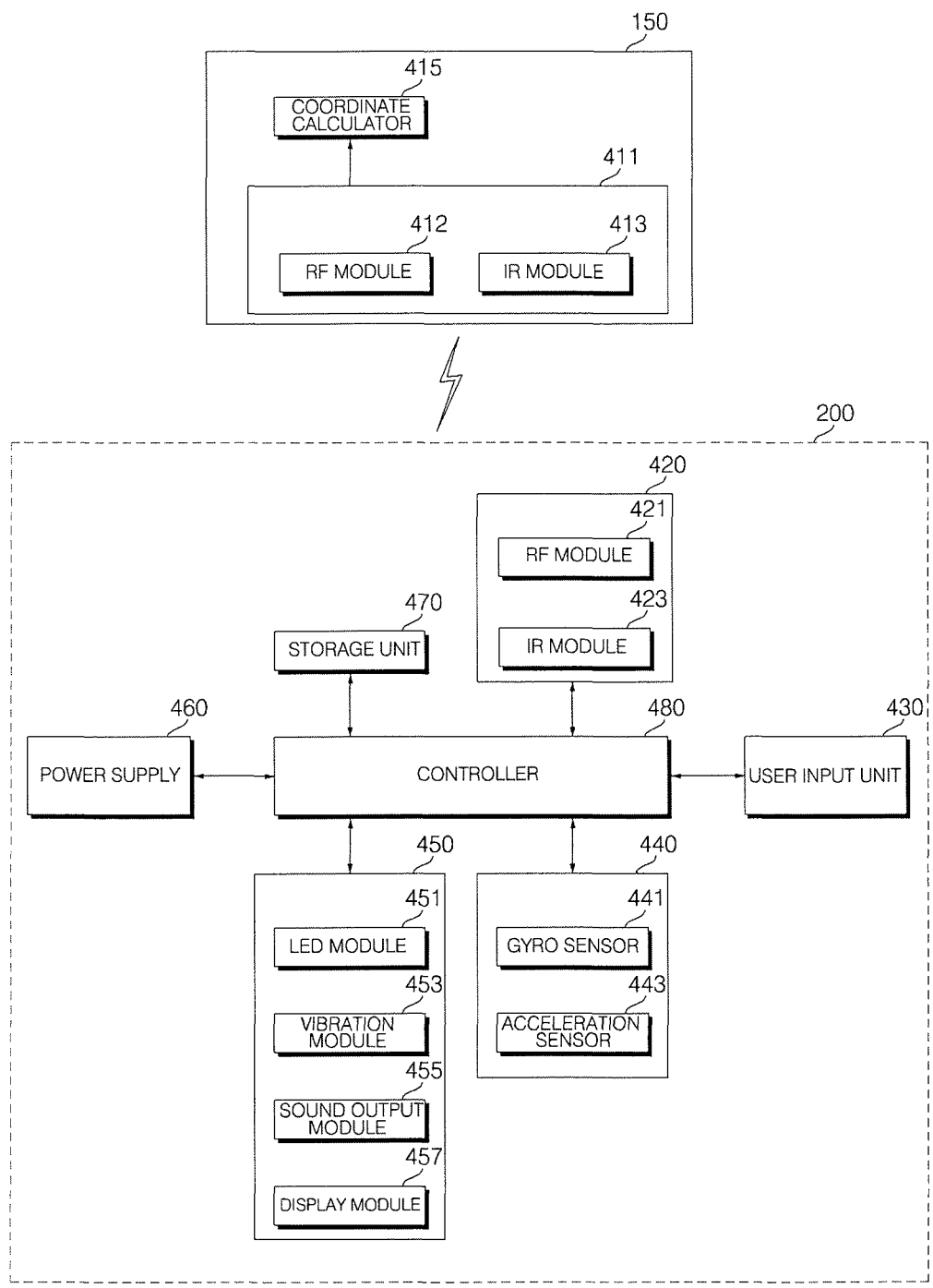
FIG. 4B is an internal block diagram illustrating the remote control device of FIG. 2.

FIG. 4B is an internal block diagram illustrating the remote control device of FIG. 2. Referring to FIG. 4B, the remote control device 200 may include a wireless communication unit 425, a user input unit 430, a sensor unit 440, an output unit 450, a power supply 460, a storage unit 470, and a controller 480. The wireless communication unit 425 transmits and receives signals to and from one of the image display apparatuses according to embodiments of the present invention described above. Hereinafter, one image display apparatus 100 according to an embodiment of the present invention will be described.

In this embodiment, the remote control device 200 can include an RF module 421 capable of transmitting and receiving signals to and from the image display apparatus 100 according to an RF communication standard. The remote control device 200 can further include an IR module 423 capable of transmitting and receiving signals to and from the image display apparatus 100 according to an IR communication standard.

In this embodiment, the remote control device 200 transmits a signal including information about movement of the remote control device 200 to the image display apparatus 100 via the RF module 421. In addition, the remote control device 200 can receive a signal from the image display apparatus 100 via the RF module 421. When necessary, the remote control device 200 can transmit commands related to power on/off, channel change, and volume change to the image display apparatus 100 via the IR module 423.

The user input unit 430 may include a keypad, a button, a touchpad, or a touchscreen. The user can input a command related to the display apparatus 100 with the remote control device 200 by manipulating the user input unit 430. If the user input unit 430 includes a hard key button, the user can input a command related to the image display apparatus 100 with the remote control device 200 by pressing the hard key button. If the user input unit 430 includes a touchscreen, the user can input a command related to the image display apparatus 100 with the remote control device 200 by touching a soft key on the touchscreen. The user input unit 430 can include various kinds of input means such as a scroll key and a jog key which are manipulatable by the user, but it should be noted that this embodiment does not limit the scope of the present invention.

The sensor unit 440 may include a gyro sensor 441 or an acceleration sensor 443. The gyro sensor 441 can sense information about movement of the remote control device 200. For example, the gyro sensor 441 can sense information about movement of the remote control device 200 with respect to the X, Y and Z axes. The acceleration sensor 443 can sense information about the movement speed of the remote control device 200. The sensor unit 440 may further include a distance measurement sensor to sense a distance to the display 180.

The output unit 450 can output an image signal or voice signal corresponding to manipulation of the user input unit 430 or a signal transmitted from the image display apparatus 100. The user can recognize, via the output unit 450, whether the user input unit 430 is manipulated or the image display apparatus 100 is controlled. For example, the output unit 450 may include an LED module 451 configured to be turned on when signals are transmitted to and received from the image display apparatus 100 via the wireless communication unit 425, a vibration module 453 configured to generate vibration, a sound output module 455 configured to output sound, or a display module 457 configured to output an image.

The power supply 460 supplies power to the remote control device 200. If the remote control device 200 does not move for a predetermined time, the power supply 460 can stop supplying power to save power. The power supply 460 can resume supply of power when the predetermined key provided to the remote control device 200 is manipulated.

The storage unit 470 can store various kinds of programs and application data necessary for control or operation of the remote control device 200. When the remote control device 200 wirelessly transmits and receives signals to and from the image display apparatus 100 via the RF module 421, the remote control device 200 and the image display apparatus 100 can transmit and receive signals in a predetermined frequency band. The controller 480 of the remote control device 200 can store, in the storage unit 470, information about, for example, a frequency band enabling wireless transmission and reception of signals to and from the image display apparatus 100 which is paired with the remote control device 200, and reference the same.

Further, the controller 480 controls overall operation related to control of the remote control device 200. The controller 480 can transmit, via the wireless communication unit 425, a signal corresponding to manipulation of a predetermined key in the user input unit 430 or a signal corresponding to movement of the remote control device 200 sensed by the sensor unit 440 to the image display apparatus 100.

The user input interface unit 150 of the image display apparatus 100 may include a wireless communication unit 151 capable of wirelessly transmitting and receiving signals to and from the remote control device and a coordinate calculator 415 capable of calculating coordinates of the pointer corresponding to operation of the remote control device 200.

The user input interface unit 150 can wirelessly transmit and receive signals to and from the remote control device 200 via an RF module 412. In addition, the user input interface unit 150 can receive, via an IR module 413, a signal transmitted from the remote control device 200 according to an IR communication standard. The coordinate calculator 415 can calculate coordinates (x, y) of the pointer 205 to be displayed on the display 180, by correcting the unstable position of a hand or an error in a signal corresponding to operation of the remote control device 200 which is received via the wireless communication unit 151.

The transmitted signal of the remote control device 200 input to the image display apparatus 100 via the user input interface unit 150 is transmitted to the controller 170 of the image display apparatus 100. The controller 170 can determine information about an operation of the remote control device 200 or manipulation of a key from the signal transmitted from the remote control device 200, and can control the image display apparatus 100 according to the information.

As another example, the remote control device 200 can calculate coordinates of the pointer corresponding to movement thereof and output the same to the user input interface unit 150 of the image display apparatus 100. In this instance, the user input interface unit 150 of the image display apparatus 100 can transmit, to the controller 170, information about the received coordinates of the pointer without separately correcting the unstable position of the hand or error. As another example, in contrast with the example of the figure, the coordinate calculator 415 can be provided in the controller 170 rather than in the user input interface unit 150.

Figure 5:
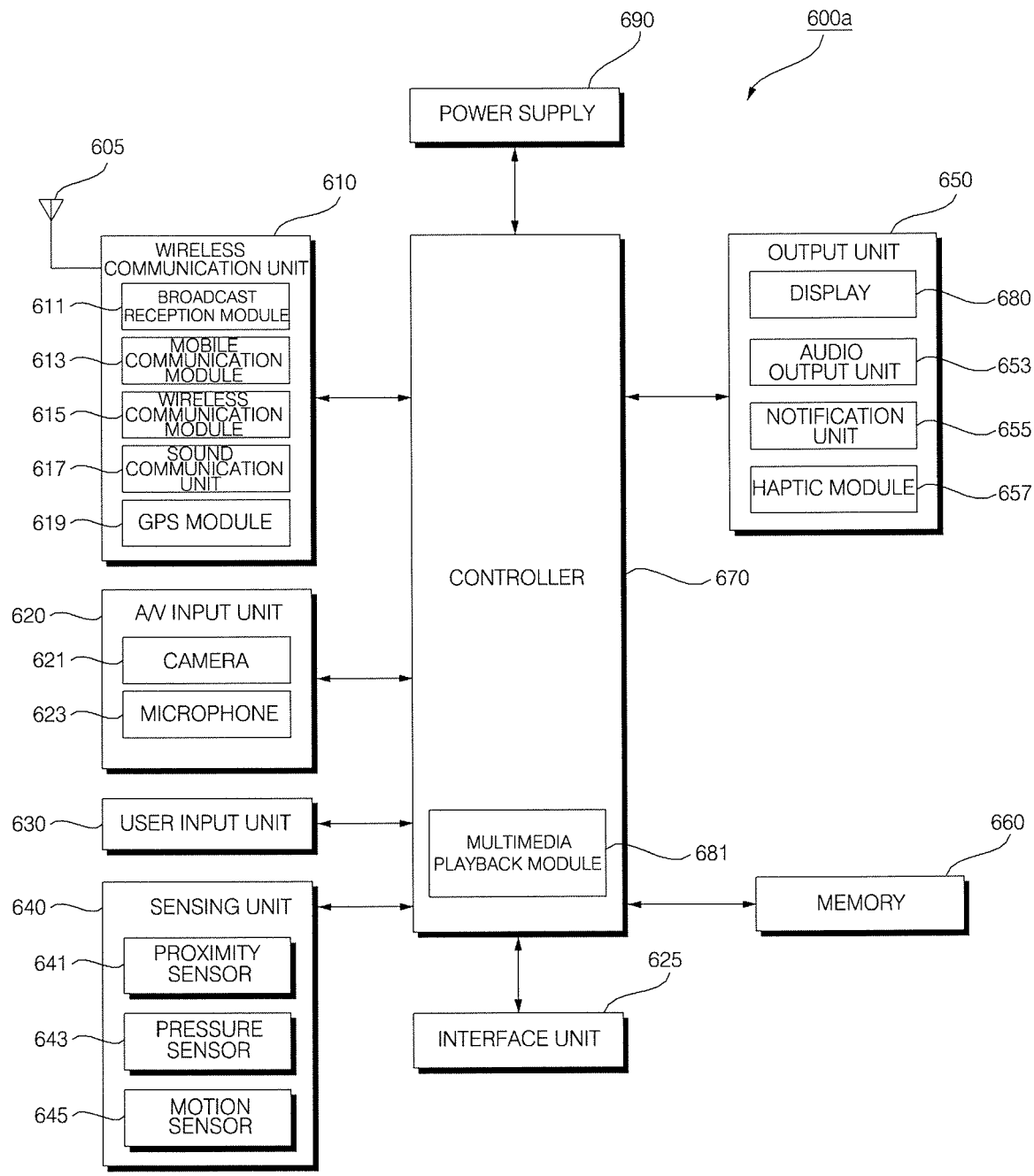
FIG. 5 is an internal block diagram illustrating the mobile terminal of FIG. 1.

FIG. 5 is an internal block diagram illustrating the mobile terminal of FIG. 1. Referring to FIG. 5, the mobile terminal 600 may include a wireless communication unit 610, an audio/video (AN) input unit 620, a user input unit 630, a sensing unit 640, and an output unit 650, a memory 660, an interface unit 625, a controller 670 and a power supply 690.

The wireless communication unit 610 may include a broadcast reception module 611, a mobile communication module 613, a wireless Internet module 615, a sound communication unit 617, and a GPS module 619. The broadcast reception module 611 can receive at least one of a broadcast signal and broadcast-related information from an external broadcast management server over a broadcast channel. Herein, the broadcast channel may include a satellite channel and a terrestrial channel. The broadcast signal and/or broadcast-related information received through the broadcaster reception module 611 can be stored in the memory 660.

The mobile communication module 613 transmits and receives a radio signal to and from at least one of a base station, an external terminal and a server over a mobile communication network. Herein, the wireless signal may include a voice call signal, a video call signal, or various kinds of data according to transmission and reception of a text/multimedia message.

The wireless Internet module 615, which refers to a module for wireless Internet access, may be installed inside or outside the mobile terminal 600. For example, the wireless Internet module 615 can perform Wi-Fi-based wireless communication or Wi-Fi Direct-based wireless communication.

The sound communication unit 617 can perform sound communication. In the sound communication mode, the sound communication unit 617 may add data of predetermined information to audio data which is to be output and output sound. In addition, in the sound communication mode, the sound communication unit 617 can extract data of predetermined information from received sound. Available short-range communication technologies may include Bluetooth, RFID (radio frequency identification), IrDA (Infrared Data Association), UWB (Ultra Wideband) and ZigBee.

The GPS module 619 can receive location information from a plurality of GPS satellites. The A/V input unit 620 is used for input of an audio signal or a video signal and may include a camera 621 and a microphone 623. The user input unit 630 generates key input data input by the user to control operation of a terminal of the user. Thus, the user input unit 630 may include a keypad, a dome switch, and a touchpad (resistive touchpad/capacitive touchpad). In particular, the touchpad may form a layered architecture together with the display 180, thereby realizing a touchscreen.

The sensing unit 640 can generate a sensing signal for controlling operation of the mobile terminal 600 by sensing the current state of the mobile terminal 600, for example by sensing whether the mobile terminal 600 in the open or closed position, where the mobile terminal 600 is located, and whether the user contacts the mobile terminal 600. The sensing unit 640 may include a haptic sensor 641, a pressure sensor 643 and a motion sensor 645. The motion sensor 645 may employ an acceleration sensor, a gyro sensor, a gravity sensor and the like to sense movement or location of the mobile terminal. In particular, the gyro sensor, which is used to measure an angular speed, may sense orientation (angle) of the mobile terminal with respect to a reference direction.

The output unit 650 may include a display 680, an audio output unit 653, a notification unit 655, and a haptic module 657. The display 680 outputs and displays information processed by the mobile terminal 600. As described above, if the display 680 forms a layered architecture with the touchpad to implement a touchscreen, the display 680 may be used not only as an output device but also as an input device for input of information according to a touch from the user.

The audio output unit 653 outputs audio data received from the wireless communication unit 610 or stored in the memory 660. The audio output unit 653 may include a speaker and a buzzer. The notification unit 655 outputs a signal for reporting occurrence of an event in the mobile terminal 600. For example, the notification unit 655 can output a signal in the form of vibration.

The haptic module 657 generates various haptic effects which can be felt by the user. A typical example of the haptic effects generated by the haptic module 657 is vibration. The memory 660 can store a program for processing and control of the controller 670, and functions to temporarily store input data or output data (e.g., a phonebook, a message, a still image, a moving image, etc.). The interface unit 625 serves as an interface for all devices connected to the mobile terminal 600. The interface unit 625 can serve to receive data or power from external devices and transfer the same to the internal constituents of the mobile terminal 600 and to transmit data from the mobile terminal 600 to external devices.

The controller 670 typically controls operations of the aforementioned respective elements, thereby controlling overall operation of the mobile terminal. For example, the controller 670 can perform control or processing related to voice communication, data communication, video communication, and the like. The controller 670 may also include a multimedia playback module 681 to reproduce multimedia. The multimedia playback module 681 may be provided in the controller 670 as hardware or may be configured separately from the controller 670.

The power supply 690 supplies power necessary for operations of the respective constituents according to control of the controller 670 when external power or internal power is applied thereto. The block diagram of the mobile terminal 600 shown in FIG. 5 is simply illustrative. The respective constituents of the block diagram may be integrated, added or omitted according to the specification of the mobile terminal 600 which is implemented in reality. That is, two or more constituents may be combined into one constituent, or one constituent may be subdivided into two or more constituents, when necessary. In addition, the function performed in each block is simply illustrative, and it should be noted that specified operations or devices of the blocks do not limit the scope of the present invention.

Next, FIG. 6 is a flowchart illustrating operation of an image display apparatus and external device according to an embodiment of the present invention, and FIGS. 7A to 11F illustrate the operation method of FIG. 6. Referring to FIG. 6, the controller 170 of the image display apparatus 100 performs a control operation to display a predetermined image (S505). Herein, the predetermined image may be a broadcast image or external input image.

Next, the controller 170 of the image display apparatus 100 can determine whether a first external device is within a predetermined distance (S510). If the first external device is within the predetermined distance (Yes in S510), the controller 170 of the image display apparatus 100 can control pairing to be performed (S515). For example, the controller 170 of the image display apparatus 100 can periodically transmit a Bluetooth low energy (BLE)-based pairing signal via the interface unit 130 or 135.

If the first external device is located within the predetermined distance, the first external device can receive a pairing signal and transmit a pairing response signal in response. Thereby, the controller 170 of the image display apparatus 100 can determine whether the first external device is within the predetermined distance, based on whether or not the pairing response signal is received.

Upon receiving the pairing response signal, the controller 170 of the image display apparatus 100 can perform a control operation based on the pairing response signal to automatically perform pairing with the first external device. When paring between the first external device 600a and the image display apparatus 100 is completed, the first external device 600a can transmit, to the image display apparatus 100, an image that is being displayed as a first mirroring image (S517).

Thereby, the controller 170 of the image display apparatus 100 can receive the first mirroring image from the first external device via the interface unit 130 or 135 (S520), and perform a control operation to display the first mirroring image (S525). For example, the controller 170 of the image display apparatus 100 can perform a control operation to scale the first mirroring image received and display the first mirroring image with a larger size and higher resolution. Thereby, the first mirroring image can be directly checked through the display 180 of the image display apparatus 100.

As another example, the controller 170 of the image display apparatus 100 can perform a control operation to change brightness or image quality of the first mirroring image received and to display the first mirroring image with the changed brightness or image quality.

Next, the controller 170 of the image display apparatus 100 can determine whether a second external device is within a predetermined distance (S530). If the second external device is within the predetermined distance (Yes in S530), the controller 170 of the image display apparatus 100 can control pairing to be performed (S535). For example, the controller 170 of the image display apparatus 100 can periodically transmit a Bluetooth low energy (BLE)-based pairing signal via the interface unit 130 or 135.

If the second external device is located within the predetermined distance, the second external device can receive a pairing signal and transmit a pairing response signal in response. Thereby, the controller 170 of the image display apparatus 100 can determine whether the second external device is within the predetermined distance, based on whether or not the pairing response signal is received.

Upon receiving the pairing response signal, the controller 170 of the image display apparatus 100 can perform a control operation based on the pairing response signal to automatically perform pairing with the second external device. When paring between the second external device 600a and the image display apparatus 100 is completed, the second external device 600a can transmit, to the image display apparatus 100, an image that is being displayed as a second mirroring image (S537).

Thereby, the controller 170 of the image display apparatus 100 can receive the second mirroring image from the second external device via the interface unit 130 or 135 (S540), and perform a control operation to display the second mirroring image (S545). For example, the controller 170 of the image display apparatus 100 can perform a control operation to scale the second mirroring image received and display the second mirroring image with a larger size and higher resolution. Thereby, the second mirroring image may be directly checked through the display 180 of the image display apparatus 100.

As another example, the controller 170 of the image display apparatus 100 can perform a control operation to change brightness or image quality of the second mirroring image received and to display the first mirroring image with the changed brightness or image quality.

Figure 7A:
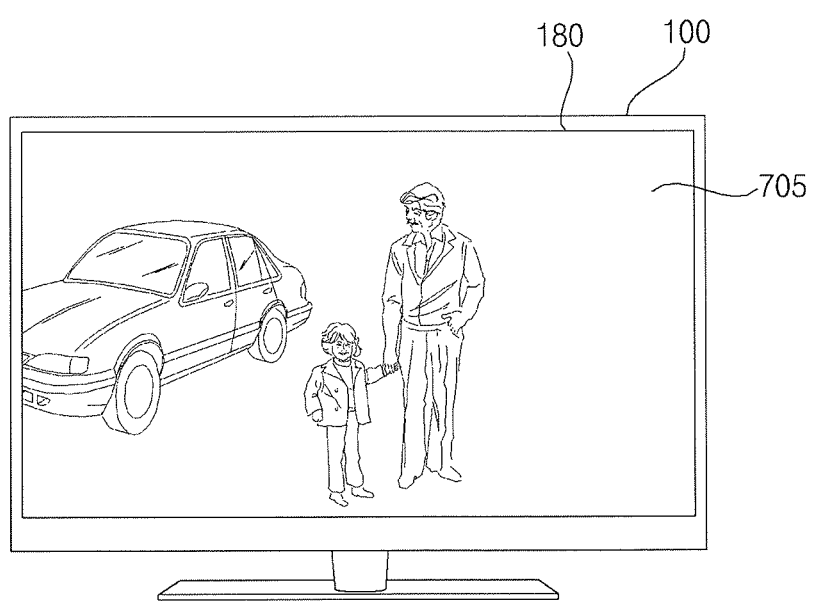
Figure 7B:
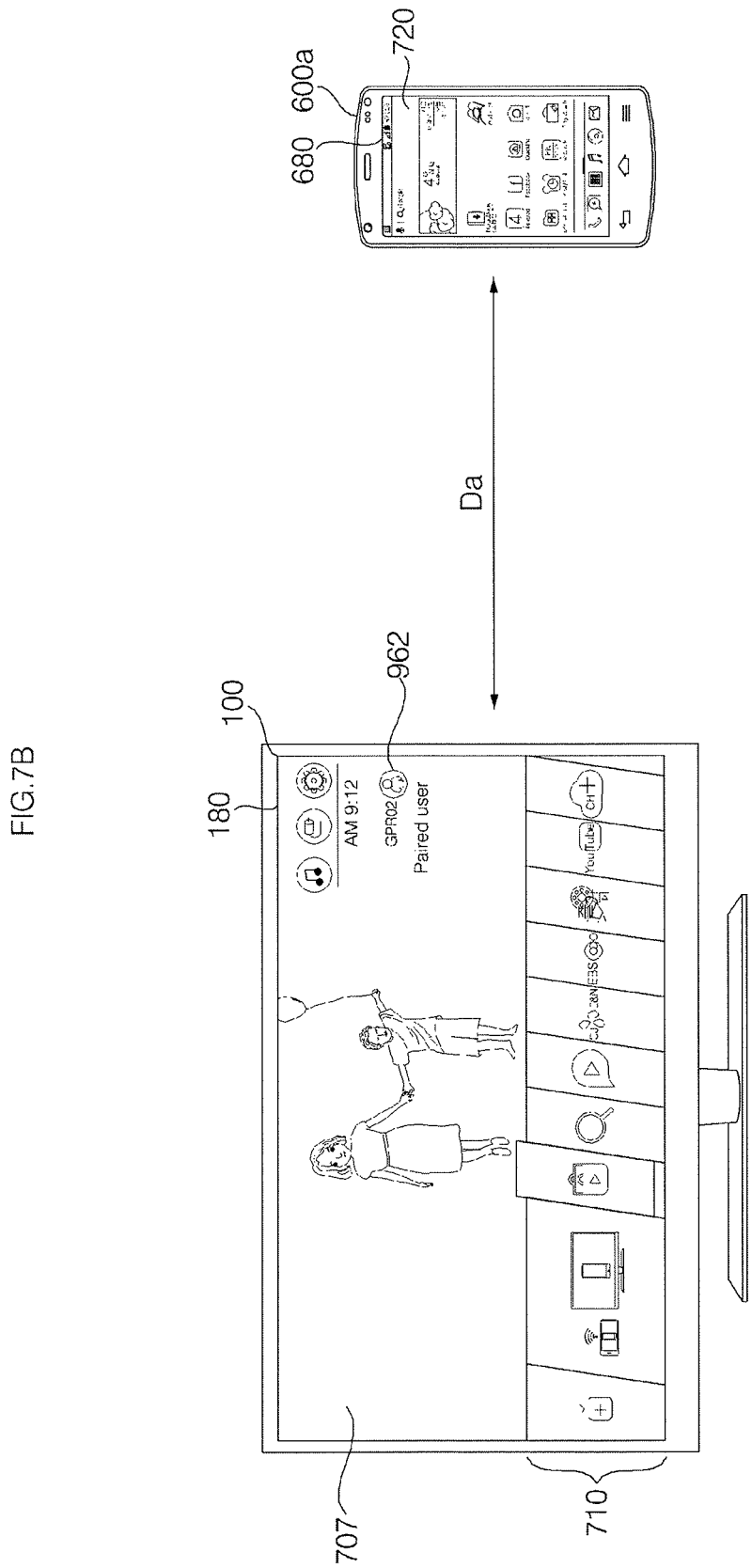

FIG. 7A illustrates displaying a predetermined image 705 on the display 180 of the image display apparatus 100, and FIG. 7B illustrates when the mobile terminal 600a which is a first external device is within a predetermined distance from the image display apparatus 100, and thus pairing is performed therebetween. Thereby, the mobile terminal 600a and the image display apparatus 100 can remain connected to each other.

When the mobile terminal 600a and the image display apparatus 100 are wirelessly connected to each other, the controller 170 of the image display apparatus 100 can perform a control operation to display an object 962 indicating a paired mobile terminal on the display 180, as shown in FIG. 7B.

In particular, the controller 170 of the image display apparatus 100 can perform a control operation to display the object 962 indicating the paired mobile terminal on a displayed image 707 on the display 180. Thereby, the user of the mobile terminal or another user who is viewing the image 707 of the image display apparatus 100 can be allowed to recognize that the mobile terminal 600a is connected and paired with the image display apparatus 100. When a first mirroring image is received from a first external device with a first image displayed, the controller 170 of the image display apparatus 100 can perform a control operation to display the first image and the first mirroring image together. An application list 710 is also displayed.

FIG. 7C illustrates displaying a first mirroring image 702a and a displayed image 707a together when an image 720 is displayed on the mobile terminal 600a which is a first external device. In this instance, the user can check the first mirroring image while viewing the displayed image.

When a second mirroring image is received from a second external device with the first mirroring image displayed, the controller 170 of the image display apparatus 100 can perform a control operation to display the first mirroring image and the second mirroring image together. An application list 710a can also be displayed.

Next, FIG. 7D illustrates when the tablet 600b displaying an image 730 and which is a second external device is paired and connected with the image display apparatus 100 while a first mirroring image 702a from the mobile terminal 600a which is a first external device is displayed. An object 964 can also be displayed indicating the paired tablet 600b.

As shown in FIG. 7E, the controller 170 of the image display apparatus 100 can perform a control operation to receive a second mirroring image corresponding to an image 730 displayed on the tablet 600b with the first mirroring image 702a from the mobile terminal 600a, which is the first external device, displayed, and to display the second mirroring image 730a along with the first mirroring image 702a. Thereby, a displayed image and a mirroring image from an external device can be checked simultaneously.

When a third mirroring image is received from a third external device with the first mirroring image and the second mirroring image displayed, the controller 170 of the image display apparatus 100 can perform a control operation to display the first to third mirroring images together.

Figure 7F:
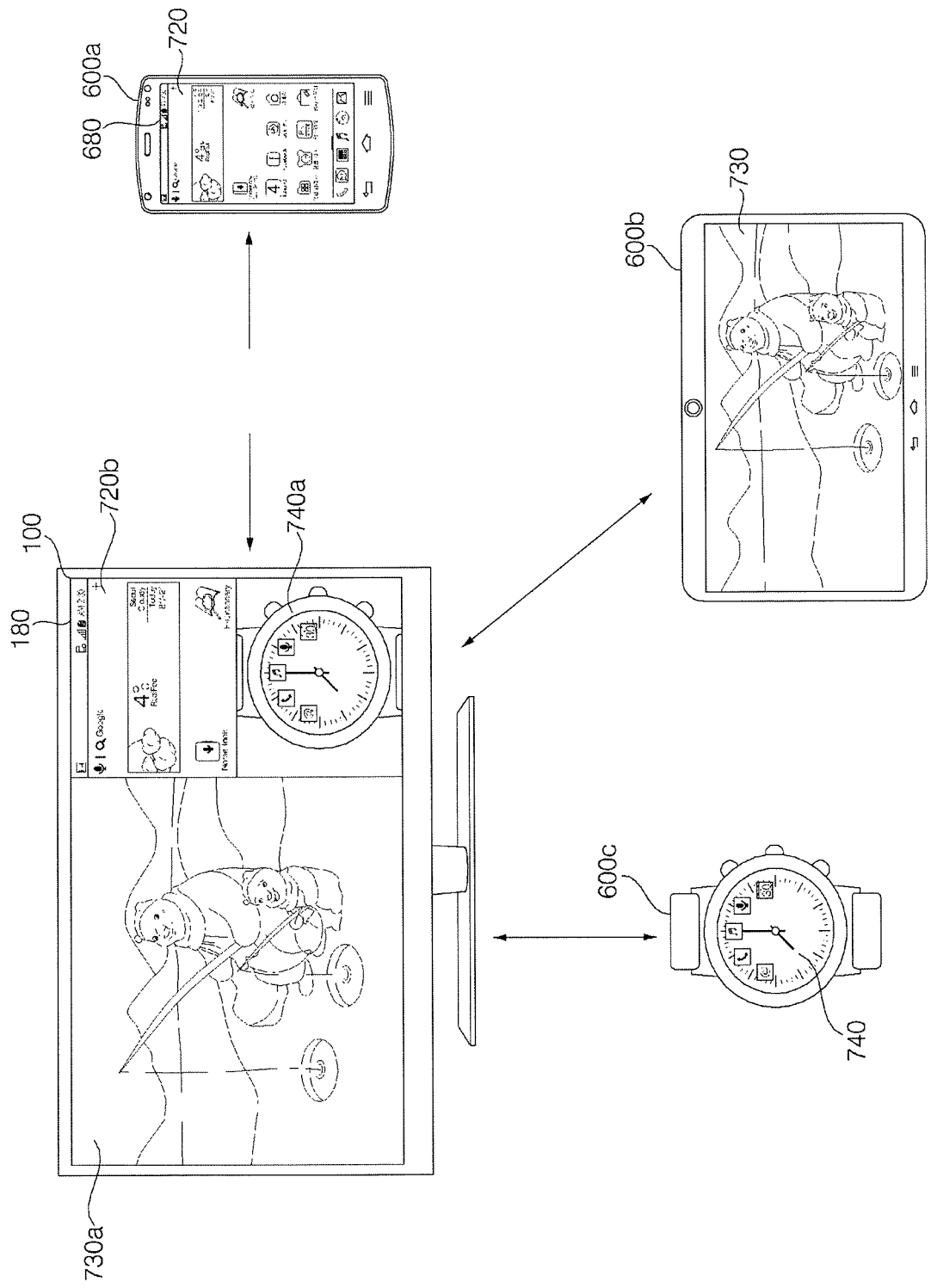

As shown in FIG. 7F, the controller 170 of the image display apparatus 100 can receive a third mirroring image corresponding to an image 740 displayed on the wearable device 600c, which is a third external device while the first mirroring image 702a from the mobile terminal 600a, which is the first external device, and the second mirroring image 730a from the tablet 600b, which is the second external device are displayed. Then, the controller 170 can perform a control operation to display the third mirroring image 740a along with the first and second mirroring images 720b and 730a. Herein, the list one of the size and display location of the first and second mirroring images 720b and 730a may be different from the example of FIG. 7E, namely the size or display location thereof before the third mirroring image is displayed.

FIG. 8A illustrates displaying, on the image display apparatus 100, only the first mirroring image 720a from the mobile terminal 600a, which is from the first mirroring image 720 of the first external device. When receiving the first mirroring image 720 from the first external device, the controller 170 of the image display apparatus 100 can control a control operation to display only the first mirroring image 720a in place of the previously displayed image, as shown in FIG. 8A.

When tagging is performed on the mobile terminal 600a which is the first external device and the tablet 600b which is the second external device, as shown in FIG. 8B, priority in performing connection or mirroring with the image display apparatus 100 can be switched from the mobile terminal 600a which is the first external device to the tablet 600b which is the second external device.

Thereby, connection between the image display apparatus 100 and the mobile terminal 600a which is the first external device can be terminated, and the image display apparatus 100 can establish wireless connection with the tablet 600b which is the second external device, as shown in FIG. 8C. Thereby, the controller 170 of the image display apparatus 100 can perform a control operation to receive the second mirroring image 735 from the tablet 600b which is the second external device and to display only the second mirroring image 735a in place of the first mirroring image 720a that was previously displayed, as shown in FIG. 8C.

Figure 9A:
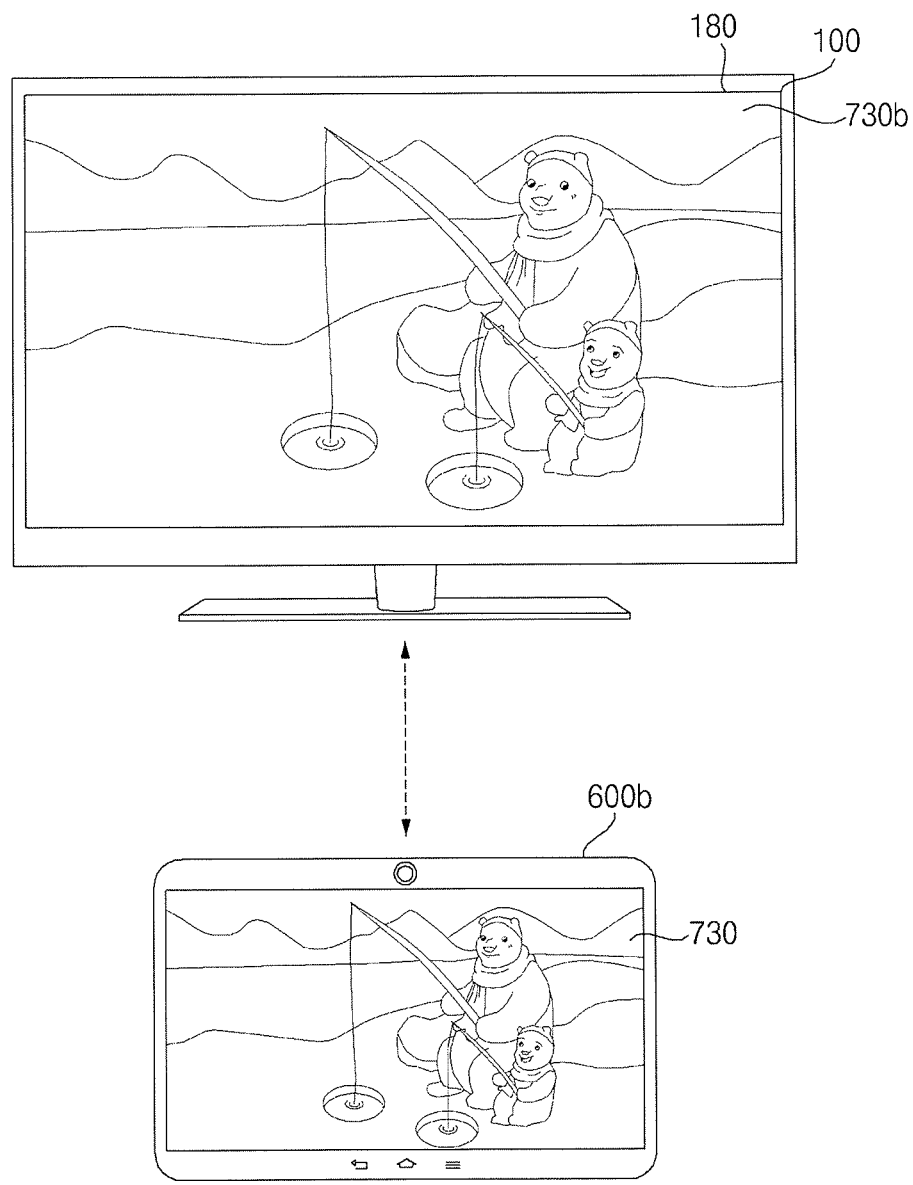

FIG. 9A illustrates displaying, on the image display apparatus 100, only the first mirroring image 730b from the tablet 600b which is the first external device, and FIG. 9B illustrates when the mobile terminal 600a which is the second external device is paired and wirelessly connected with the image display apparatus 100, while the first mirroring image 730b from the tablet 600b which is the first external device is displayed.

In this instance, the image display apparatus 100 can receive a second mirroring image 720 from the mobile terminal 600a which is the second external device. When the second mirroring image 720 is received from the second external device with the first mirroring image 730b displayed, the controller 170 of the image display apparatus 100 can perform a control operation to display an object 900 indicating whether or not to add or substitute the second mirroring image 720, as shown in FIG. 9C.

Figure 9C:
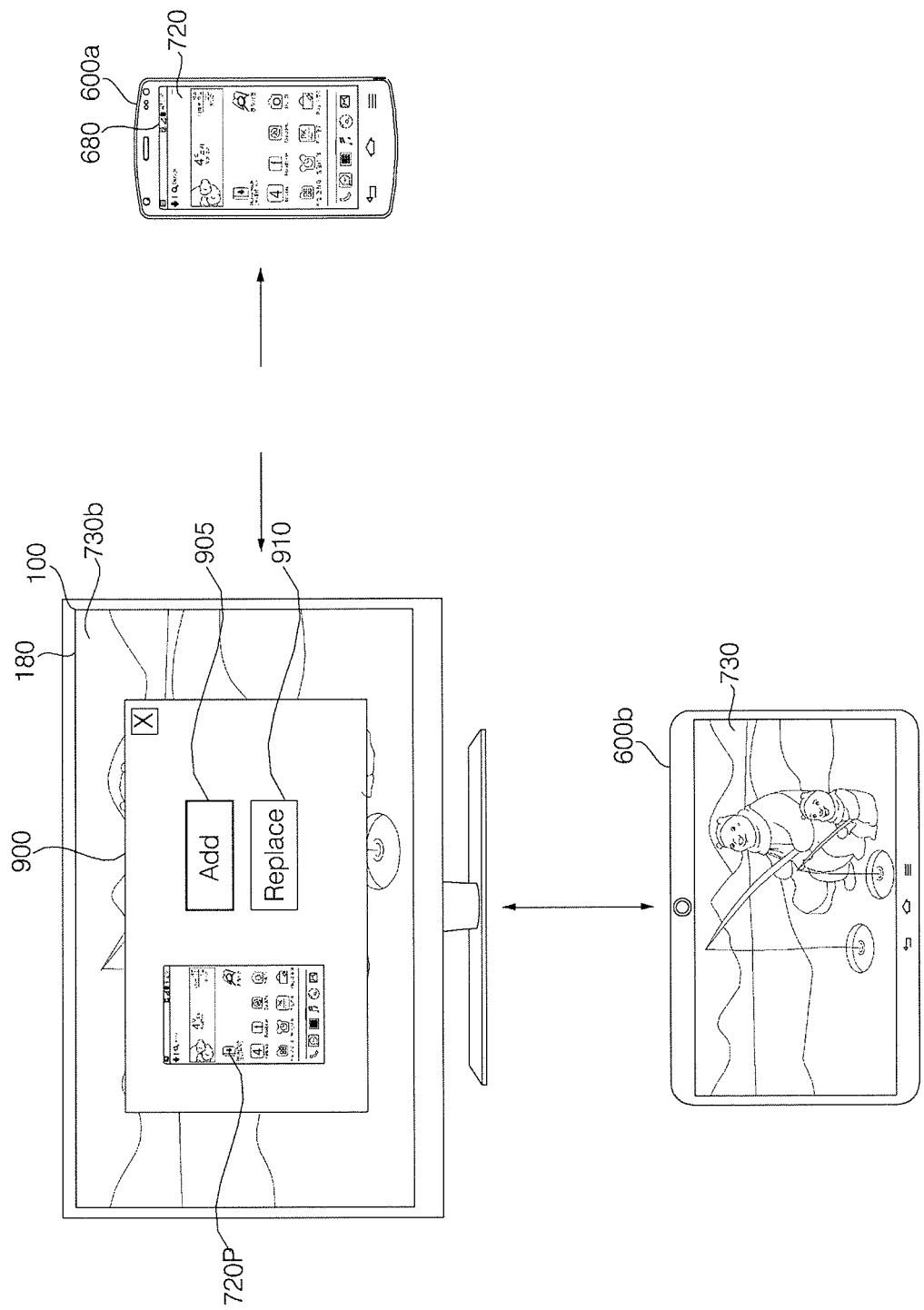

When the second mirroring image is received from the second external device with the first mirroring image 730b displayed, the controller 170 of the image display apparatus 100 can perform a control operation to display a preview image 720p for the second mirroring image 720, as shown in FIG. 9C.

When the second mirroring image is received from the second external device with the first mirroring image displayed, the controller 170 of the image display apparatus 100 can perform a control operation to display the object 900 indicating whether or not to add or substitute the second mirroring image along with the preview image 720*p*. The object 900 indicating whether or not to add or substitute the second mirroring image may include an Add item 905 and Replace item 910.

When the Add item 905 in the object 900 of the second mirroring image is selected, the controller 170 of the image display apparatus 100 can perform a control operation to display the first mirroring image 730R and the second mirroring image 720L together, as shown in FIG. 9D. Alternatively, when the Add item 905 in the object 900 of the second mirroring image is selected, the controller 170 of the image display apparatus 100 can perform a control operation to display a first mirroring image 730L and a second mirroring image 720R together, as shown in FIG. 9E.

The controller 170 of the image display apparatus 100 can perform a control operation to display a pointer 205 on the display 180, based on a pointing signal of the remote control device 200, as shown in FIGS. 9D and 9E. In additionally displaying a second mirroring image, the controller 170 of the image display apparatus 100 can determine the display location of the second mirroring image based on the location of the pointer 205 and perform a control operation to display the second mirroring image at the determined display location.

That is, when the pointer 205 is located on the left side, the controller 170 of the image display apparatus 100 can perform a control operation to display the second mirroring image 720L on the left side as shown in FIG. 9D. When the pointer 205 is located on the right side, the controller 170 of the image display apparatus 100 can perform a control operation to display the second mirroring image 720R on the right side as shown in FIG. 9E.

The controller 170 of the image display apparatus 100 can perform a control operation to display a pointer on the display 180, based on the pointing signal of the remote control device 200, and perform a control operation to change the size of at least one of the first mirroring image and the second mirroring image, based on a drag input of the pointer. That is, the controller 170 of the image display apparatus 100 can perform a control operation to change the size of at least one of the first mirroring image and second mirroring image shown in FIG. 9D or 9E, based on a drag input of the pointer.

When the Replace item 910 of the second mirroring image in the object 900 is selected as shown in FIG. 9F, the controller 170 of the image display apparatus 100 can perform a control operation to display the second mirroring image 720*a* in place of the first mirroring image 730*b*, as shown in FIG. 9G.

Figure 10A:
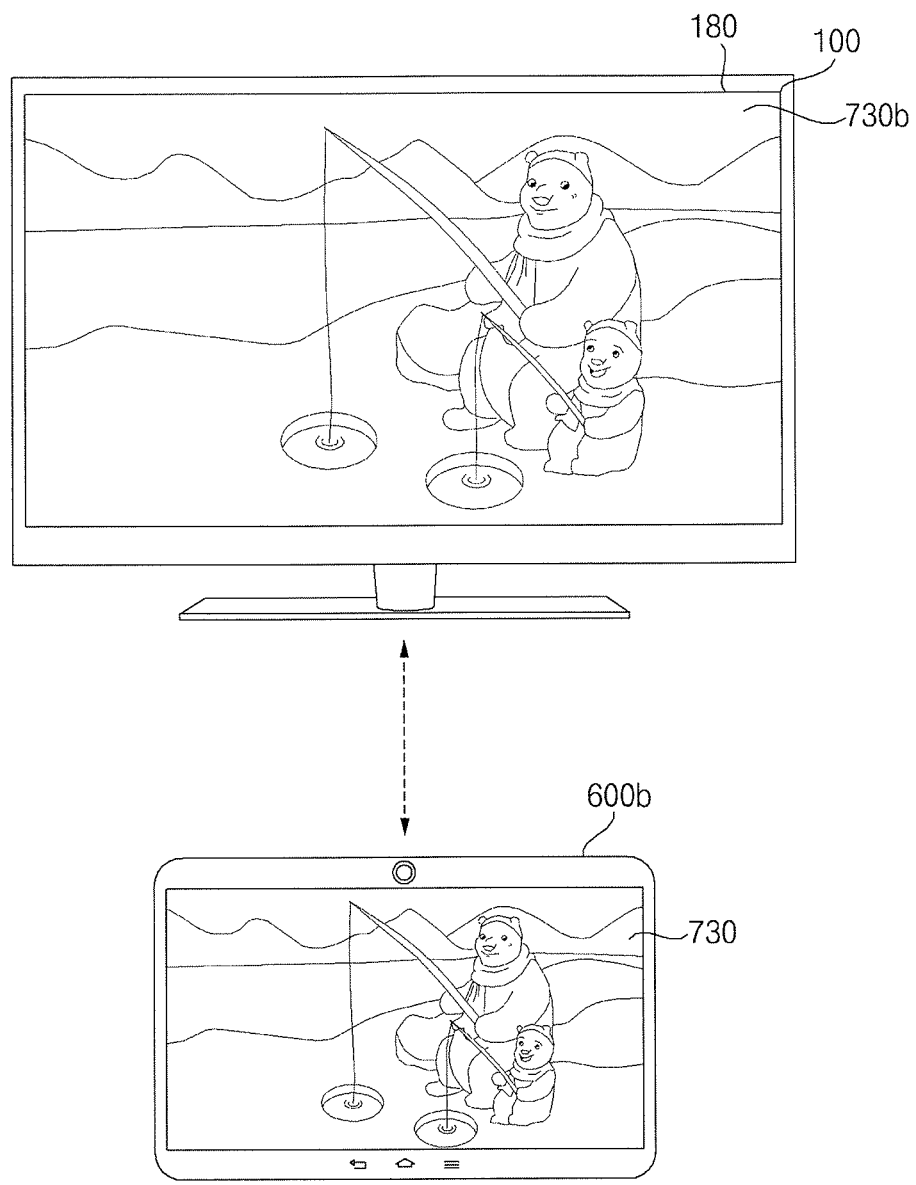
Figure 10B:
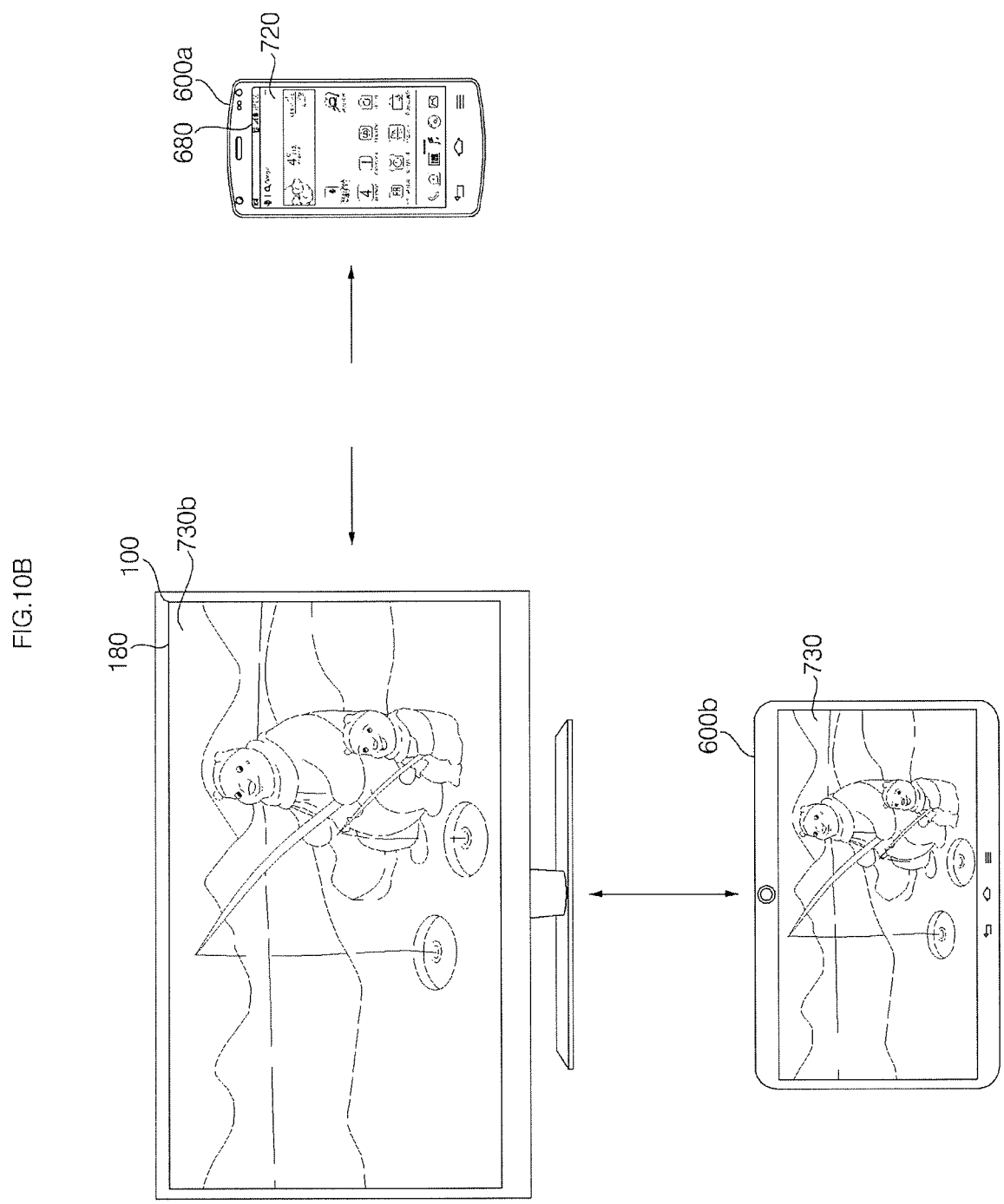

Next, FIG. 10A illustrates displaying, on the image display apparatus 100, only the first mirroring image 730*b* from the tablet 600*b* which is the first external device. In addition, FIG. 10B illustrates when the mobile terminal 600*a* which is the second external device is paired and wirelessly connected with the image display apparatus 100, while the first mirroring image 730*b* from the tablet 600*b* which is the first external device is displayed. In this instance, the image display apparatus 100 can receive a second mirroring image 720 from the mobile terminal 600*a* which is the second external device.

Figure 10C:
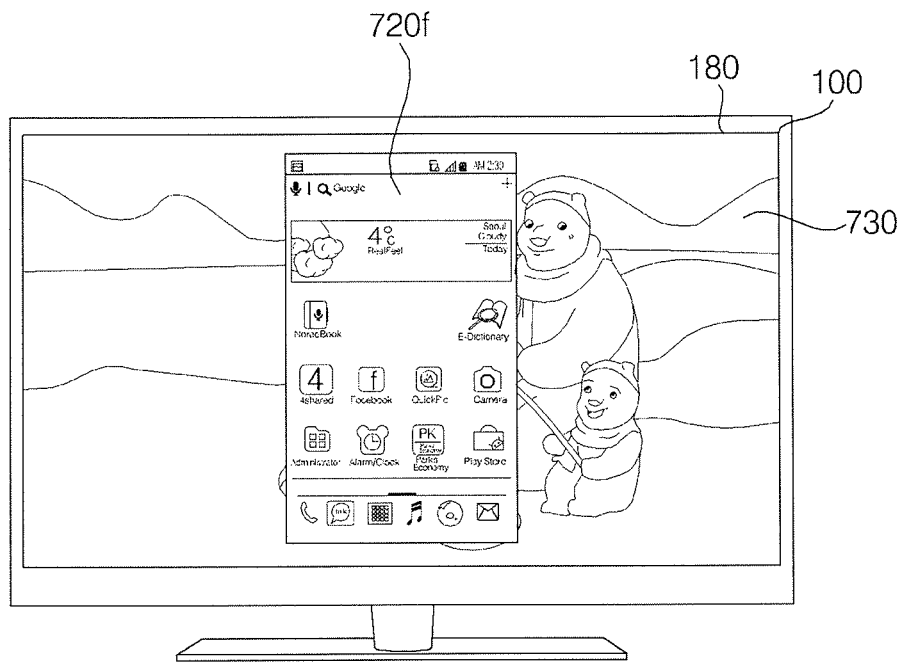
Figure 10D:
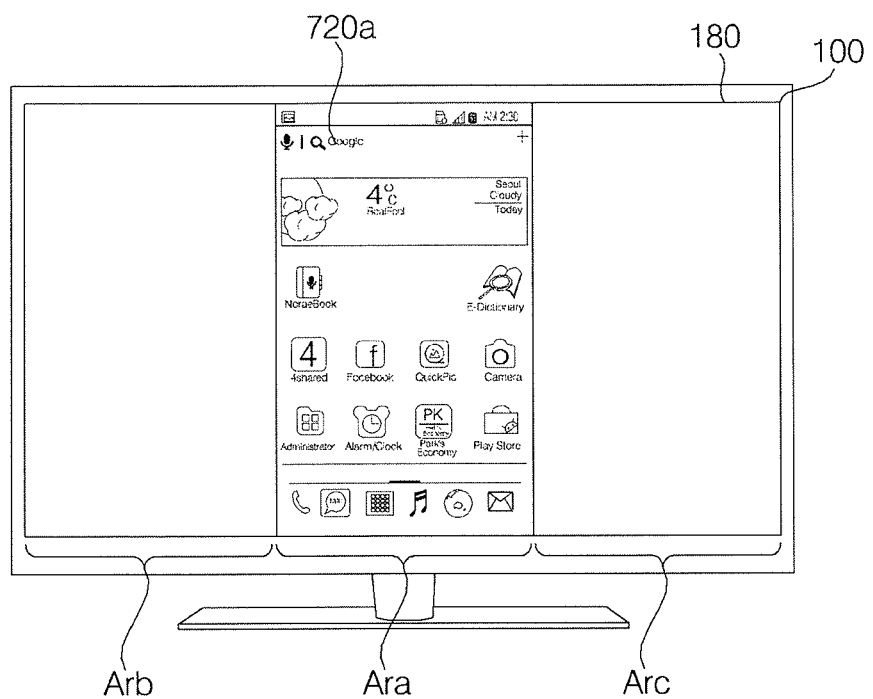

When the second mirroring image 720 is received from the second external device with the first mirroring image 730*b* displayed, the controller 170 of the image display apparatus 100 can perform a control operation to display the second mirroring image 720*f* on the first mirroring image 730 in an overlaying manner, as shown in FIG. 10C. Then, after a predetermined time, the controller 170 of the image display apparatus 100 can perform a control operation such that the first mirroring image 730 disappears and only the second mirroring image 720*a* is displayed, as shown in FIG. 10D. The second mirroring image 720*a* of FIG. 10D may be lager than the second mirroring image 720*f* of FIG. 10C. Thereby, the second mirroring image may be mainly recognized.

Similar to the cases of FIGS. 10A to 10D, when the first mirroring image is received from the first external device with the first image displayed, the controller 170 of the image display apparatus 100 can perform a control operation to display the first mirroring image on the first image in an overlaying manner.

Figure 11A:
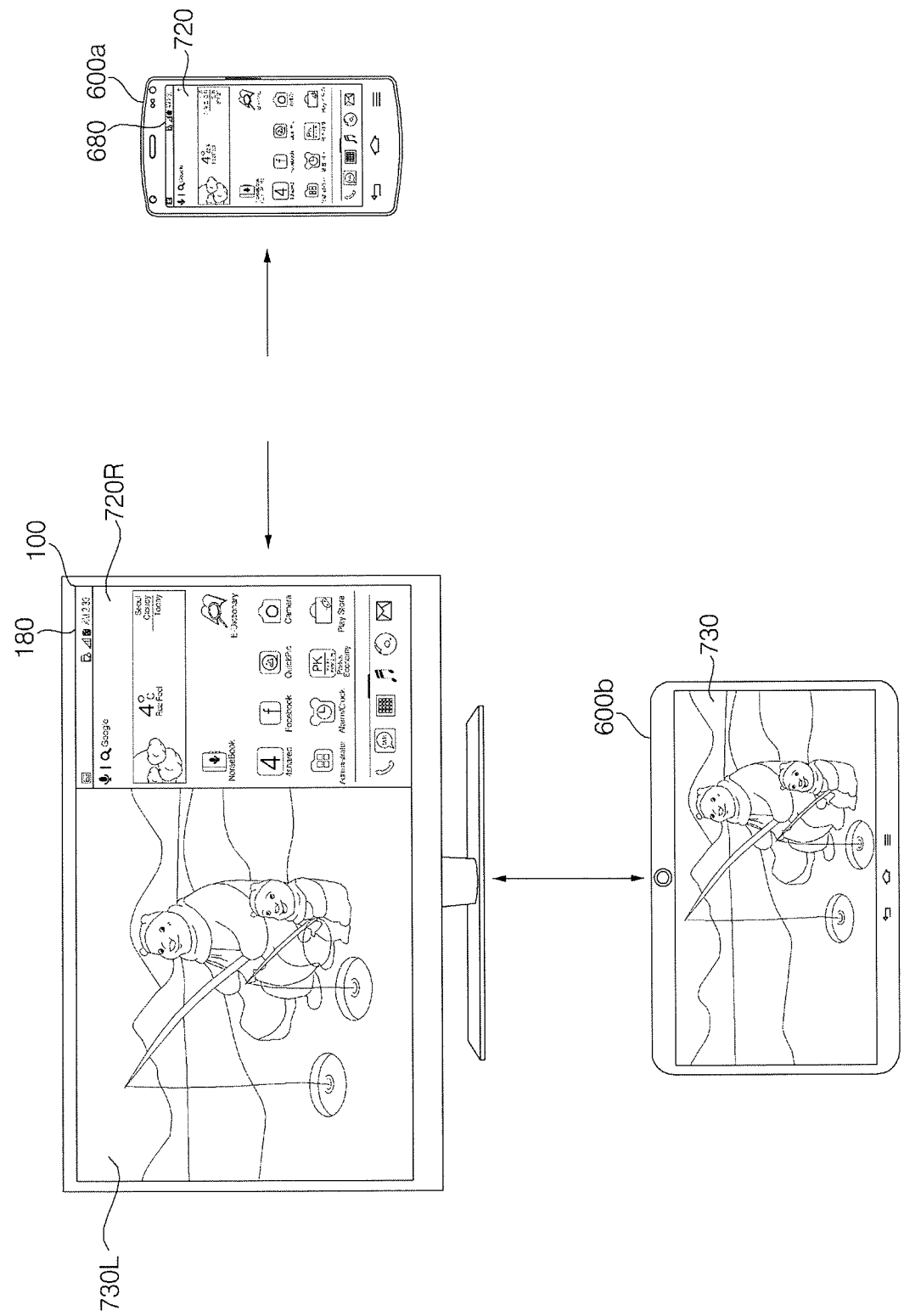

Next, FIGS. 11A to 11F illustrate displaying a third mirroring image as an additional image or an alternative image according to connection of the third external device with two mirroring images displayed. In particular, FIG. 11A illustrates displaying both the first mirroring image 730L from the tablet 600*b* which is the first external device and the second mirroring image 720R from the mobile terminal 600*a* which is the second external device.

Figure 11B:
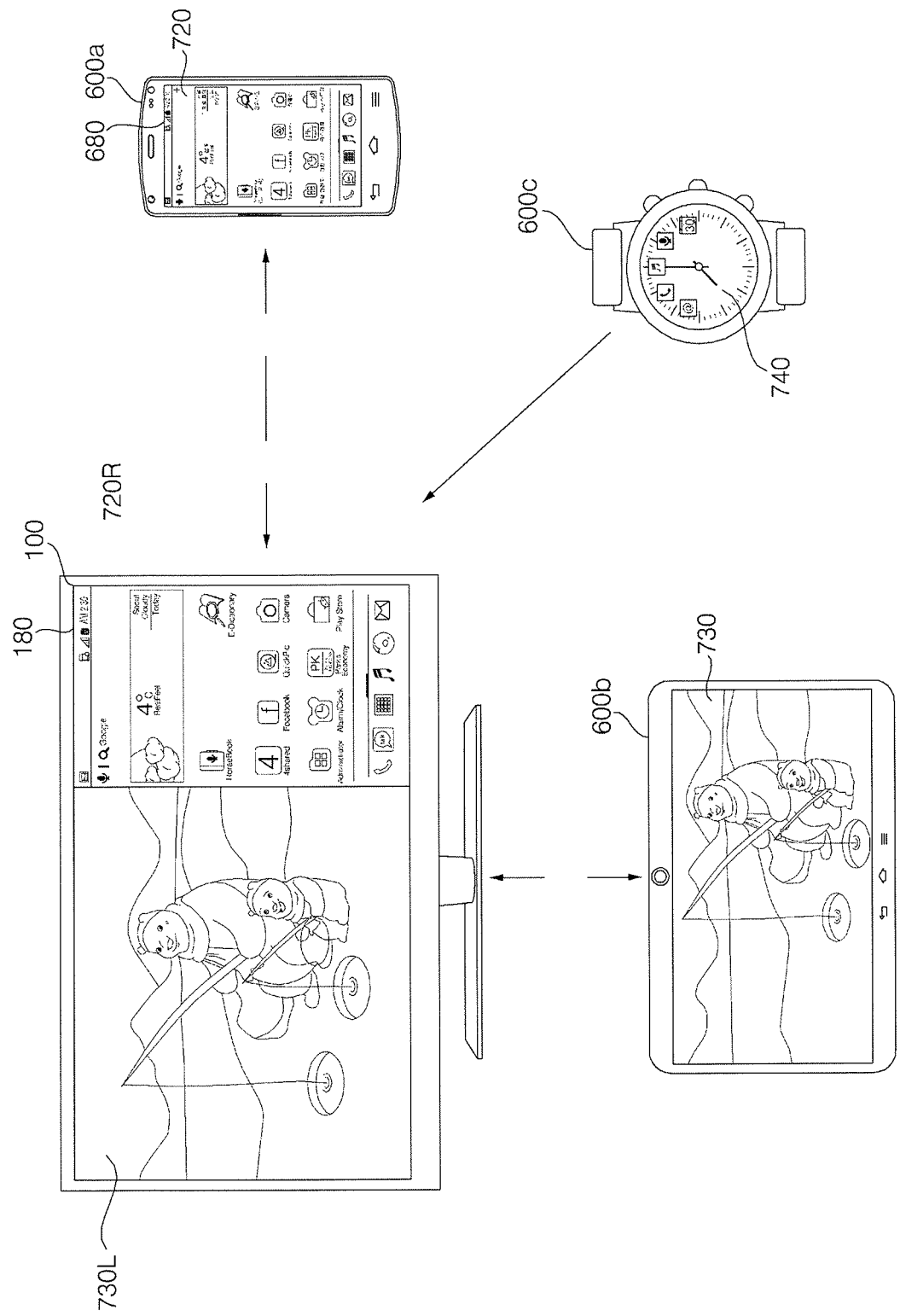
Figure 11C:
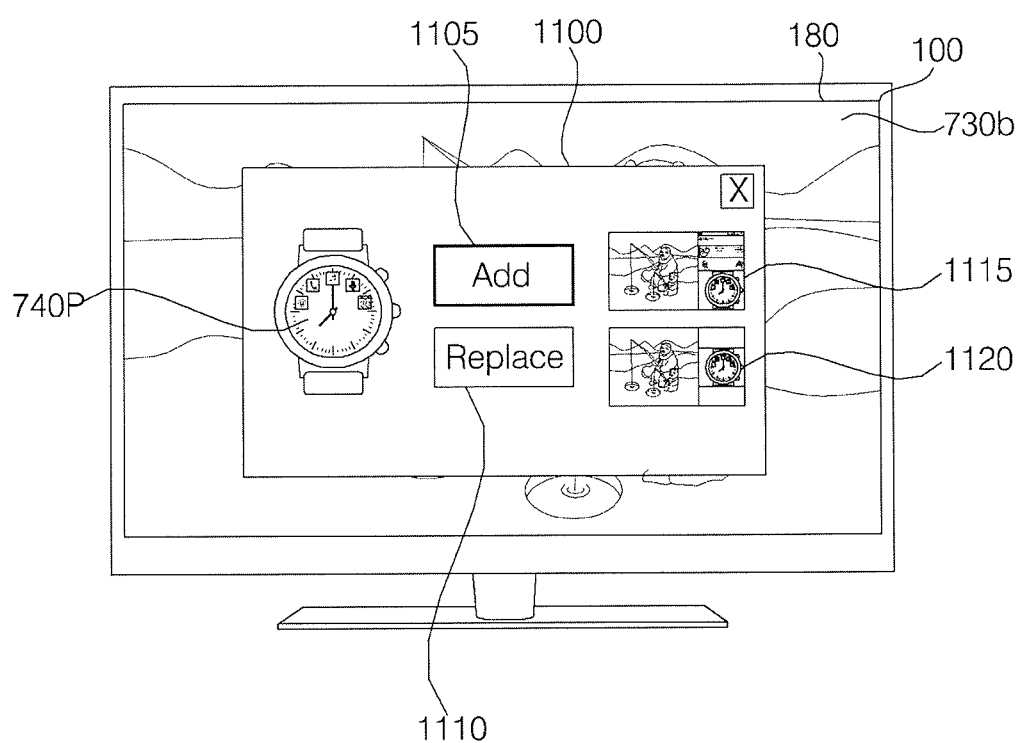

When the wearable device 600*c* which is a third external device is additionally connected as shown in FIG. 11B, the controller 170 of the image display apparatus 100 can perform a control operation to display an object 1100 indicating whether or not to add or substitute a third mirroring image, as shown in FIG. 11C. When the wearable device 600*c* is additionally connected as a third external device, as shown in FIG. 11B, the controller 170 of the image display apparatus 100 can perform a control operation to display a preview image 740P of the third mirroring image 740, as shown in FIG. 11C.

Figure 11D:
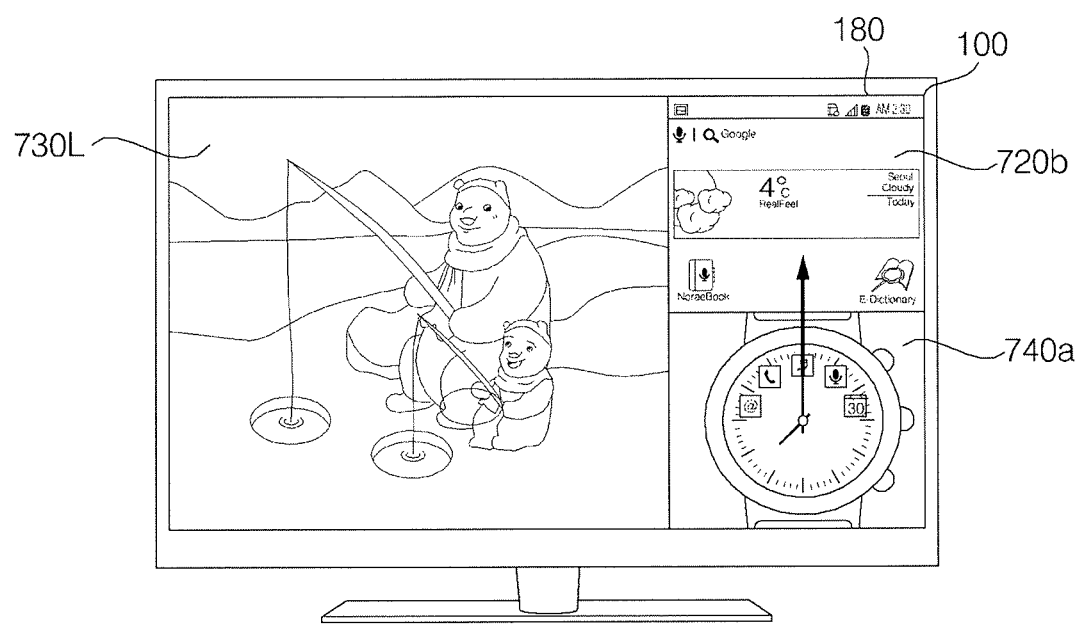

When the wearable device 600*c* is additionally connected as the third external device, as shown in FIG. 11B, the controller 170 of the image display apparatus 100 can perform a control operation to display preview images 1115 and 1120 including first to third mirroring images in performing additional display, as shown in FIG. 11C. When an Add item 1105 is selected, the controller 170 of the image display apparatus 100 can perform a control operation to display first to third mirroring images 730L, 720*b* and 740*a* arranged as shown in FIG. 11D.

The controller 170 of the image display apparatus 100 can select one of the preview images 1115 and 1120 based on the pointer 205 of the remote control device. For example, when the first preview image 1115 is selected, the controller 170 of the image display apparatus 100 can perform a control operation to display the first to third mirroring images 730L, 720*b* and 740*a* arranged as shown in FIG. 11D.

Figure 11E:
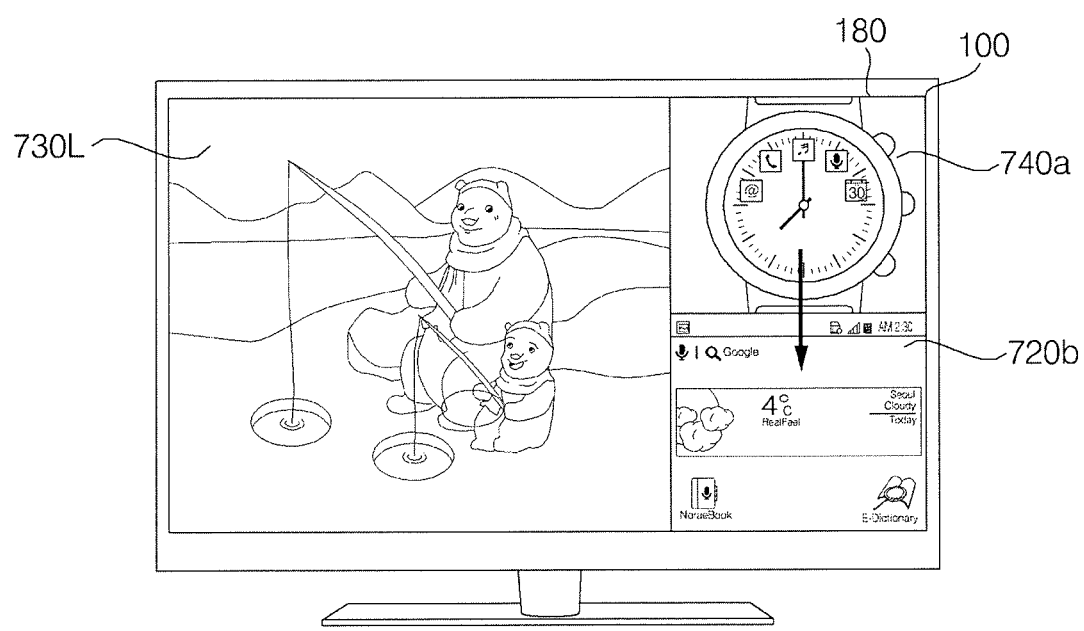
Figure 11F:
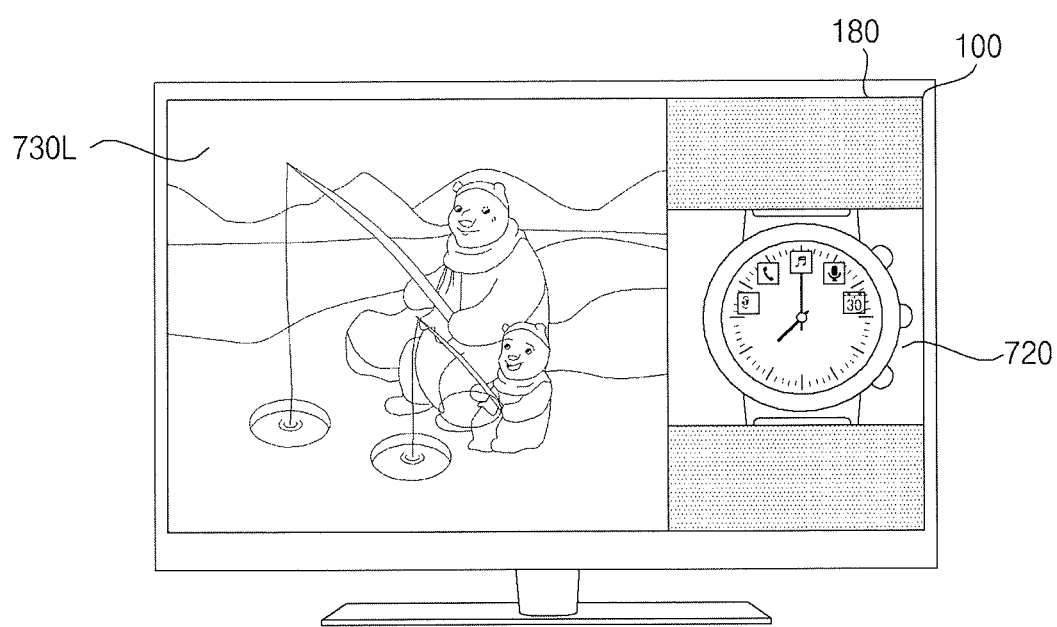

As another example, when the second preview image 1120 is selected, the controller 170 of the image display apparatus 100 can perform a control operation to display the first to third mirroring images 730L, 720*b* and 740*a* arranged as shown in FIG. 11E. When the Replace item 1110 is selected in FIG. 11C, the controller 170 of the image display apparatus 100 can perform a control operation to display the first and third mirroring images 730L and 720 arranged as shown in FIG. 11F.

Hereinafter, a description will be given of operations of an image display apparatus and mobile terminal for mirroring. In particular, FIG. 12 is a flowchart illustrating operation of an image display apparatus and mobile terminal according to another embodiment of the present invention, and FIGS. 13A to 15T illustrate the operation method of FIG. 12.

Figure 12:
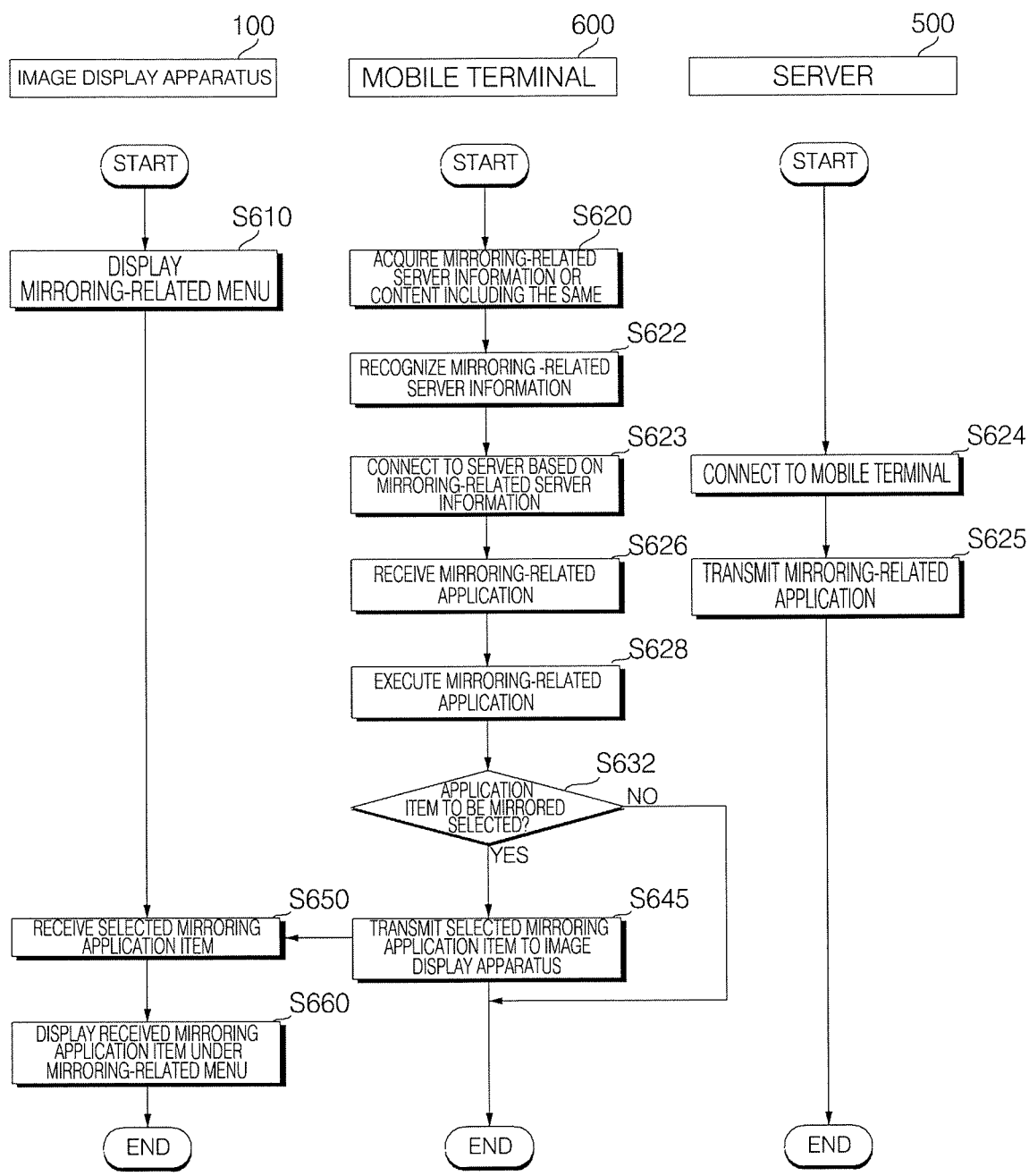
FIG. 12 is a flowchart illustrating operation of an image display apparatus and mobile terminal according to another embodiment of the present invention.

Referring to FIG. 12, the controller 170 of the image display apparatus 100 can perform a control operation based on user input to display mirroring-related server information or content related to the server information (S610). For example, when an input is provided through a specific key of the remote control device 200, the controller 170 of the image display apparatus 100 can perform a control operation to display a mirroring-related menu including content related to mirroring-related server information or content related to the server information.

For example, the content related to the server information may include a code image including the server information. More specifically, the content may include a QR code image including the server information. As another example, the content related to the server information can be output as predetermined sound.

Next, the controller 670 of the mobile terminal 600 can acquire the mirroring-related server information or the content related to the server information displayed on the image display apparatus 100 (S620). Then, the controller 670 of the mobile terminal 600 can recognize the mirroring-related server information (S622).

For example, the mobile terminal 600 can capture a code image displayed on the image display apparatus 100 through the camera 621 of the mobile terminal 600. Then, the controller 670 of the mobile terminal 600 can extract server information from the captured code image and recognize the extracted server information. As another example, the mobile terminal 600 can extract server information from sound received through the microphone 623 and recognize the extracted server information.

Next, the controller 670 of the mobile terminal 600 can control the mobile terminal 600 to be connected to the corresponding server 500 based on the recognized mirroring-related server information (S623). The server 500 can be connected with the mobile terminal 600 in response (S624). For example, the server 500 can be a server operated by the manufacturer of the image display apparatus 100. The server 500 may be a server corresponding to mirroring-related server information installed when the image display apparatus 100 was manufactured.

The user of the mobile terminal 600 can easily access the server 500 through the content related to the mirroring-related server information or content related to the server information displayed on the image display apparatus 100. The server 500 can transmit a mirroring-related application to the mobile terminal 600 when connected with the mobile terminal 600 (S625).

The controller 670 of the mobile terminal 600 can receive the mirroring-related application from the server 500 through the communication unit 610 (S626), and install the mirroring-related application. Then, the controller 170 can execute the mirroring-related application (S628). Thereby, the mirroring-related application can be easily installed on and executed by the mobile terminal 600.

Next, the controller 670 of the mobile terminal 600 can determine whether an application item for which mirroring is to be performed selected (S632). When the application item for which mirroring is to be performed is selected, the controller 670 can perform a control operation to transmit the selected application item to the image display apparatus 100 (S645). For example, the controller 670 of the mobile terminal 600 can select an application item for which mirroring is to be performed with the image display apparatus 100 among a plurality of applications installed in the mobile terminal 600, through the mirroring-related application.

At least one of application items may be selected, and the controller 670 of the mobile terminal 600 can transmit information about the selected application item to the image display apparatus 100. In particular, the controller 670 of the mobile terminal 600 can transmit name information, application image information, user information, and application version information about the selected application item to the image display apparatus 100.

Next, the controller 170 of the image display apparatus 100 can receive the selected mirroring application item from the mobile terminal 600 via the network interface unit 130 or 145 (S650). Then, the controller 170 of the image display apparatus 100 can install the received mirroring application item in the image display apparatus 100, and particularly, performs a control operation to display the received mirroring application item in a mirroring-related menu (S660). Thereby, the mirroring application item from the mobile terminal can be easily installed in and displayed on the image display apparatus 100.

Figure 13A:
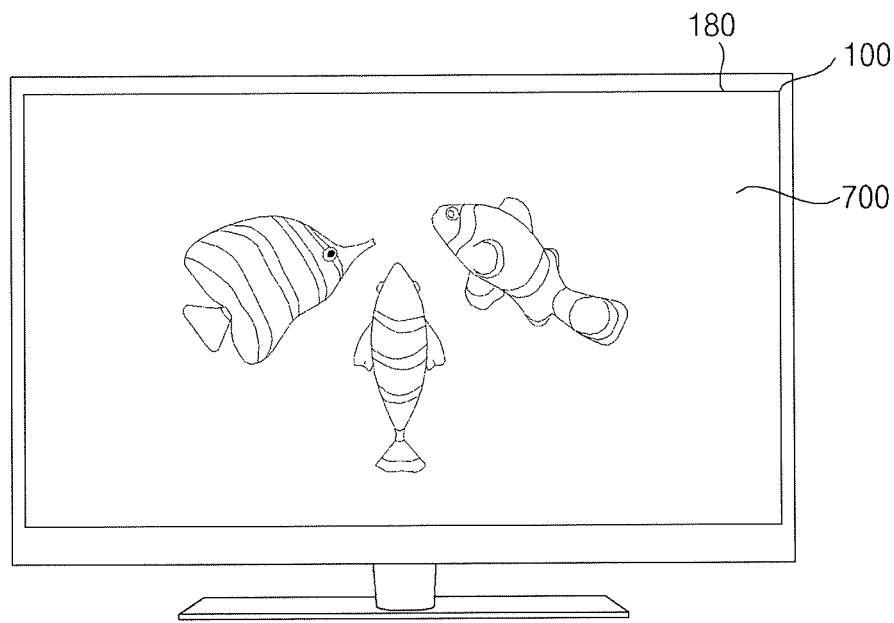
FIGS. 13A to 15T illustrate the operation method of FIG. 12.

Hereinafter, the operation method of FIG. 12 will be described with reference to FIGS. 13A to 15T. The controller 170 of the image display apparatus 100 can perform a control operation to display, on the display 180, a broadcast image 700 based on a broadcast signal received by a broadcast receiver 105, as shown in FIG. 13A.

Figure 13B:
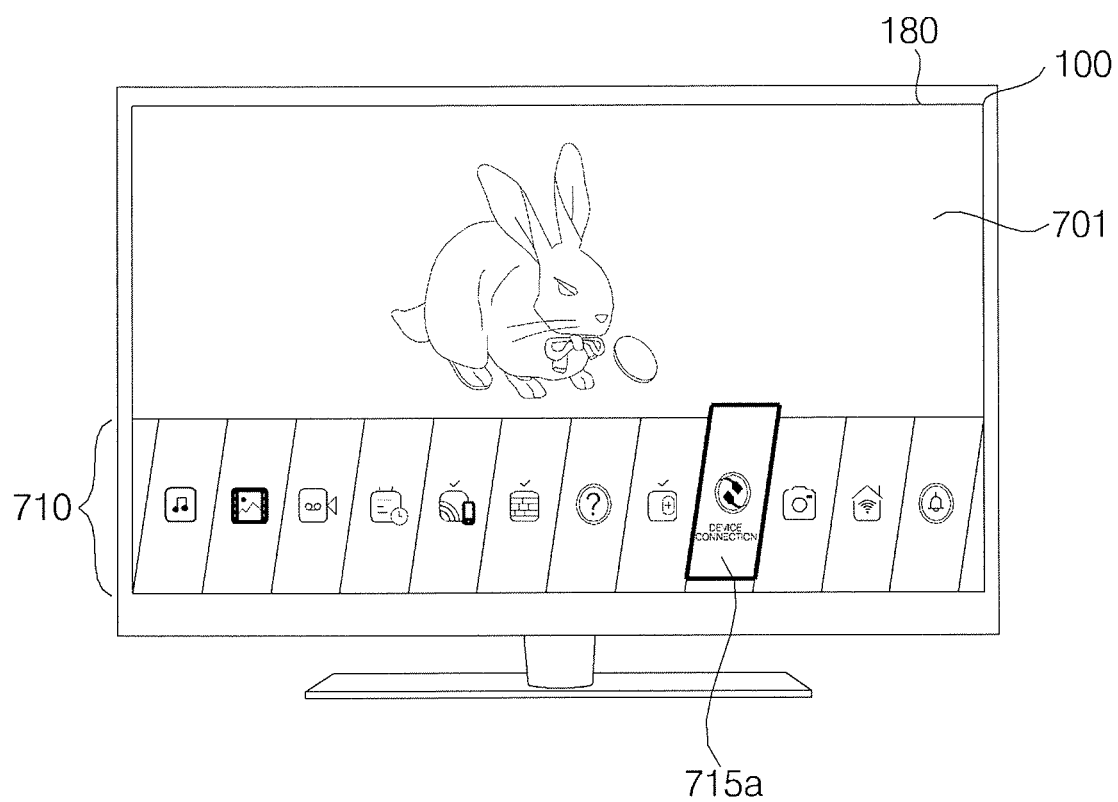

Herein, when an input is provided through of a specific key of the remote control device 200 or a predetermined item in a displayed menu is selected, the controller 170 of the image display apparatus 100 can perform a control operation to display a broadcast image 701 corresponding to a broadcast signal and an application list 710, as shown in FIG. 13B.

The controller 170 of the image display apparatus 100 can perform a control operation to display the application list 710 and the broadcast image 701 in an overlapping manner, as shown in FIG. 13B. The application list 710 may include various application items including a device connection application item 715a. Additionally, the application list 710 may include an additional view item for viewing an additional application.

The device connection application item 715a may be referred to as a mirroring application item. When the device connection application item 715a is focused on by the pointer of the remote control device 200, the controller 170 of the image display apparatus 100 can control the device connection application item 715a to be highlighted in contrast with the other items when the device connection application item 715a is displayed, as shown in FIG. 13B.

In this example, the size of the device connection application item 715a is increased over the other application items. If the device connection application item 715a is selected by the pointer of the remote control device 200, the controller 170 of the image display apparatus 100 can perform a control operation to display a device list screen window 711 including a plurality of device items for mirroring connection on the display 180, as shown in FIG. 13C.

Figure 13C:
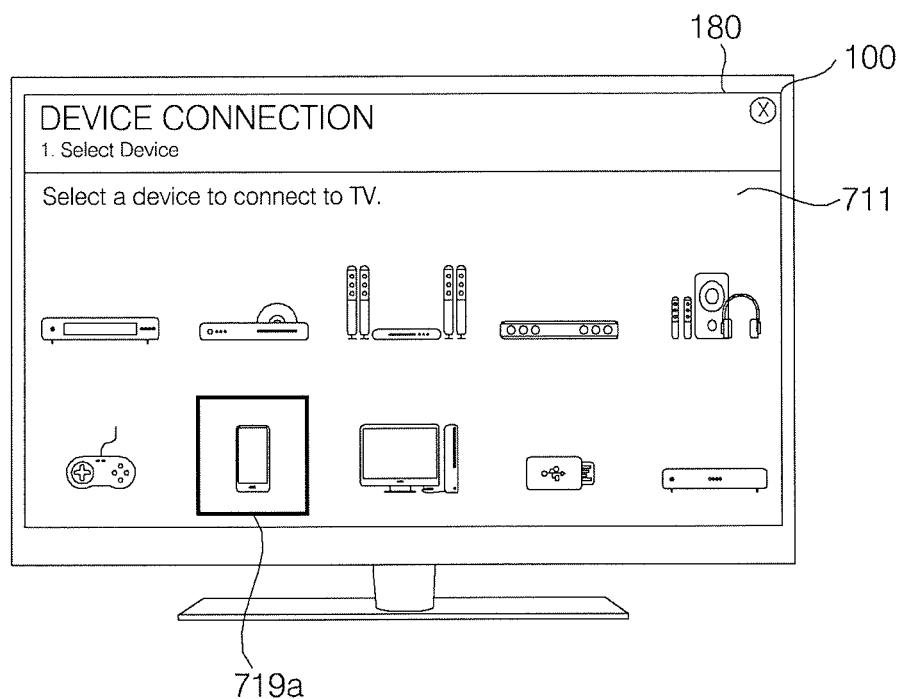
Figure 13D:
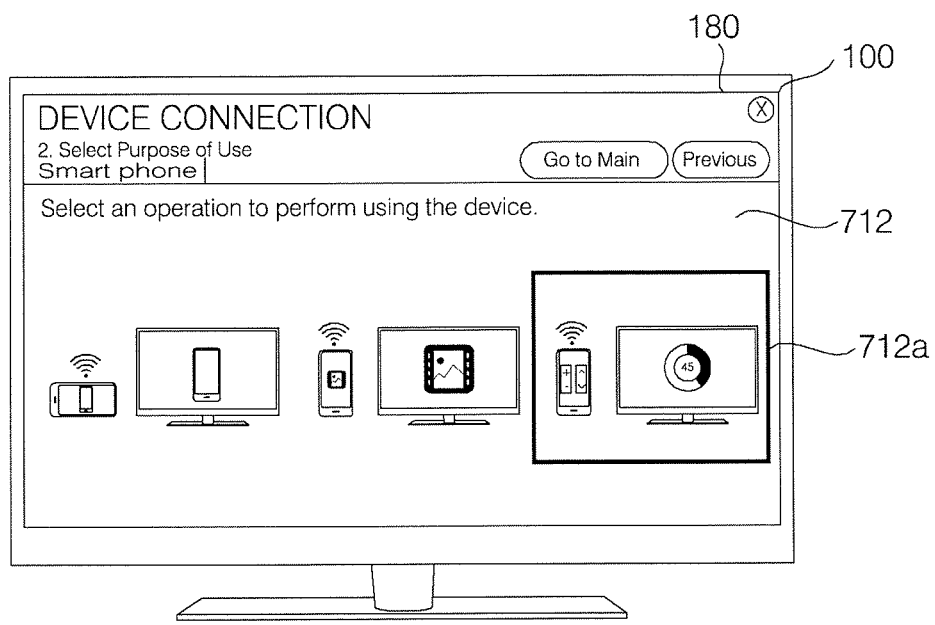

In the example of FIG. 13C, the displayed image 701 is caused to disappear, and the device list screen window 711 is displayed. Alternatively, the device list screen window 711 can be displayed on the displayed image 701 in an overlaying manner. The device list screen window 711 may include a set-top box item, a Blu-ray/DVD player item, a home theater item, a sound bar item, a speaker/headphone item, a game console item, a mobile terminal item, a computer item, an external storage device item such as a USB item, and other device items.

When the mobile terminal item 719a in the device list screen window 711 is selected by, for example, the pointer of the remote control device 200, the controller 170 of the image display apparatus 100 can perform a control operation to display, on the display 180, a device control list screen window 712 including a plurality of items to be controlled through the mobile terminal.

The device control list screen window 712 may include a remote control item from remotely controlling the image display apparatus 100 using the mobile terminal 600, a Share Content item for sharing content between the mobile terminal 600 and the image display apparatus 100, and a mirroring item for mirroring between the mobile terminal 600 and the image display apparatus 100.

Figure 13E:
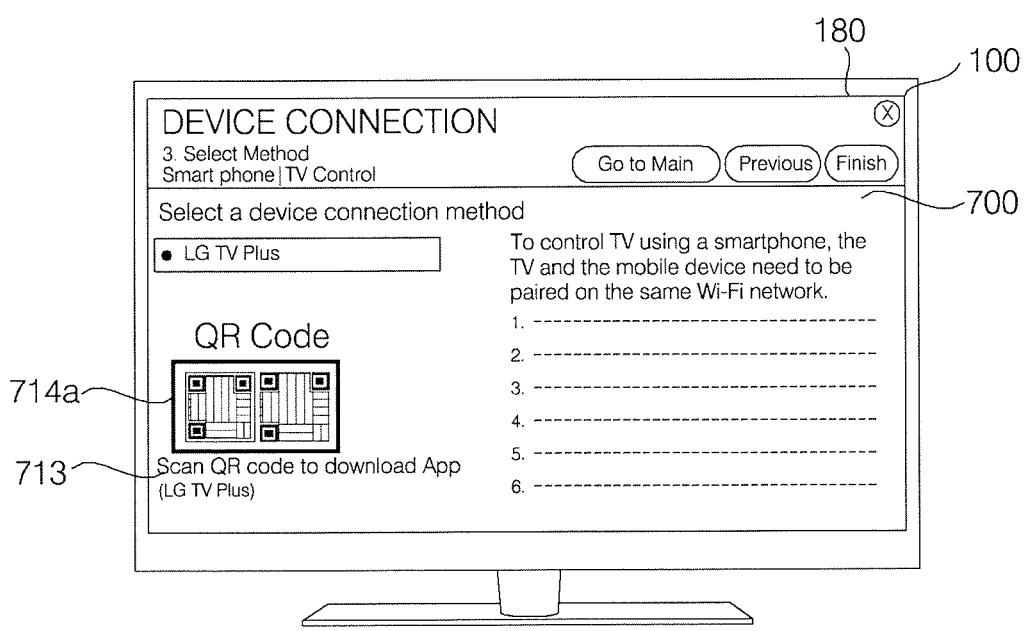

When a mirroring item 712a in the device control list screen window 712 is selected by, for example, the pointer of the remote control device 200, the controller 170 of the image display apparatus 100 can perform a control operation to display the device control list screen window 712 including a plurality of items to be controlled through the mobile terminal and a device connection method screen window 700 indicating a device connection method, as shown in FIG. 13E.

Figure 13F:
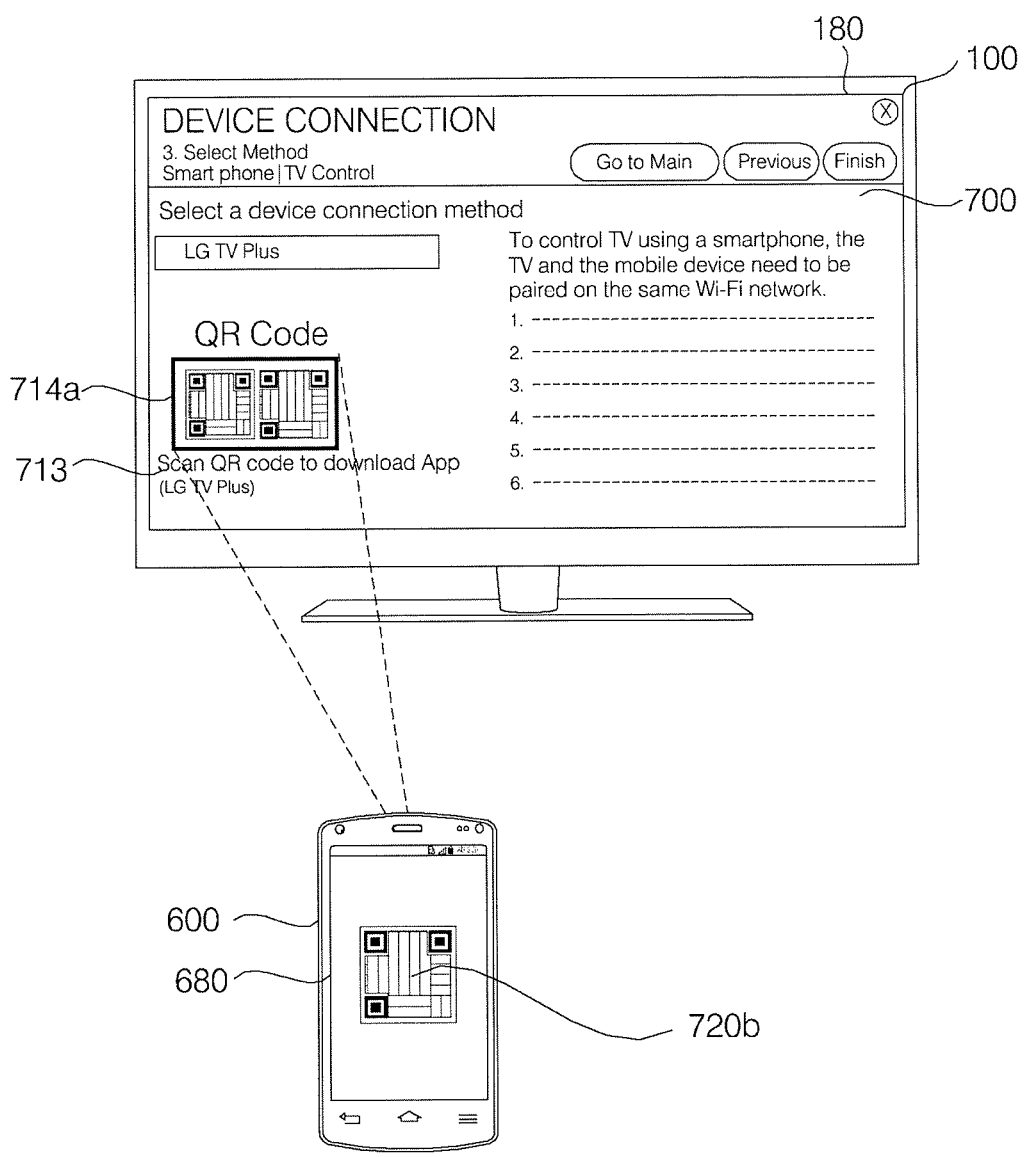

The device connection method screen window 700 may include a code image 714a including server information and relevant information 713. For example, the code image 714a including the server information may include a QR code image including the server information, as shown in FIG. 13G. While the code image 714a including the server information is displayed on the image display apparatus 100, the camera 621 of the mobile terminal 600 can capture the code image 714a including the server information, as shown in FIG. 13F.

Then, the controller 670 of the mobile terminal 600 can receive and recognize the captured image 720b. In this instance, the controller 670 of the mobile terminal 600 can perform a control operation to display the image 720b related to the captured server information on the display 180.

The controller 670 of the mobile terminal 600 can extract server information from the captured image 720b. Then, the controller 670 of the mobile terminal 600 can control connection to the server 500 based on the extracted server information. For example, the controller 670 of the mobile terminal 600 can transmit a connection request signal Sreg1 to the server 500 to connect to the server 500, and receive a connection response signal Sreg1 from the server 500, as shown in FIG. 13G.

Next, the controller 670 of the mobile terminal 600 can receive a mirroring-related application from the server 500, as shown in FIG. 13H. More specifically, the controller 670 of the mobile terminal 600 can perform a control operation to display a screen window 732 for downloading a mirroring application, as shown in FIG. 13H(a).

In this instance, when the download item 732 is selected by, for example, touch input from the user, the controller 670 of the mobile terminal 600 can download a mirroring application. When downloading is completed, the controller 670 of the mobile terminal 600 can perform a control operation to display a download complete screen window 734, as shown in FIG. 13H(b).

Next, the controller 670 of the mobile terminal 600 can install the downloaded mirroring setting application. In this instance, the controller 670 of the mobile terminal 600 can perform a control operation to display an installation screen window 736 as shown in FIG. 13H(c). When the installation is completed, the controller 670 of the mobile terminal 600 can perform a control operation to display an installation completed screen window 738 as shown in FIG. 13H(d).

Figure 14A:
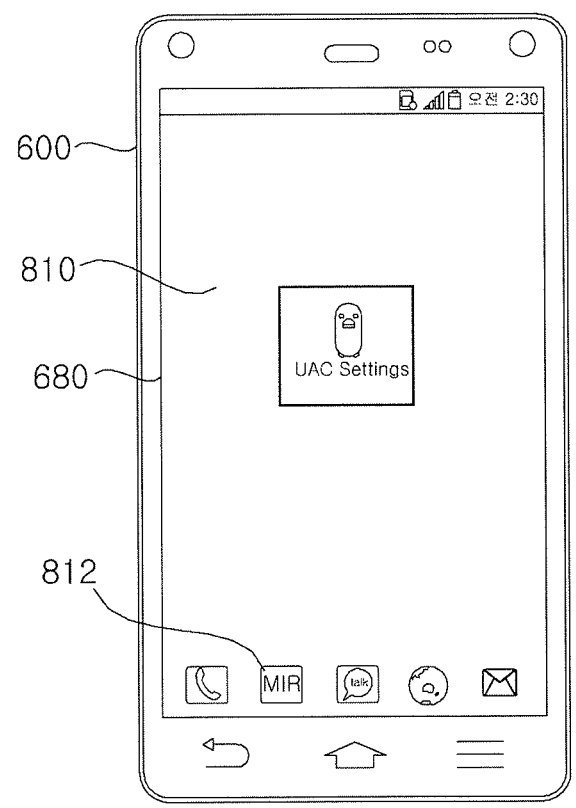

Next, the controller 670 of the mobile terminal 600 can execute the installed mirroring setting application. This operation will be described with reference to FIGS. 14A to 14K or FIGS. 15A to 15T. In particular, FIG. 14A illustrates an idle screen window 810 or home screen window 810 of the mobile terminal 600. The idle screen window 810 or the home screen window 810 can be displayed on the display 680. A plurality of application items can be displayed at the lower end of the screen window. In the figure, the mirroring application item 812 is displayed among a plurality of application items.

Figure 14B:
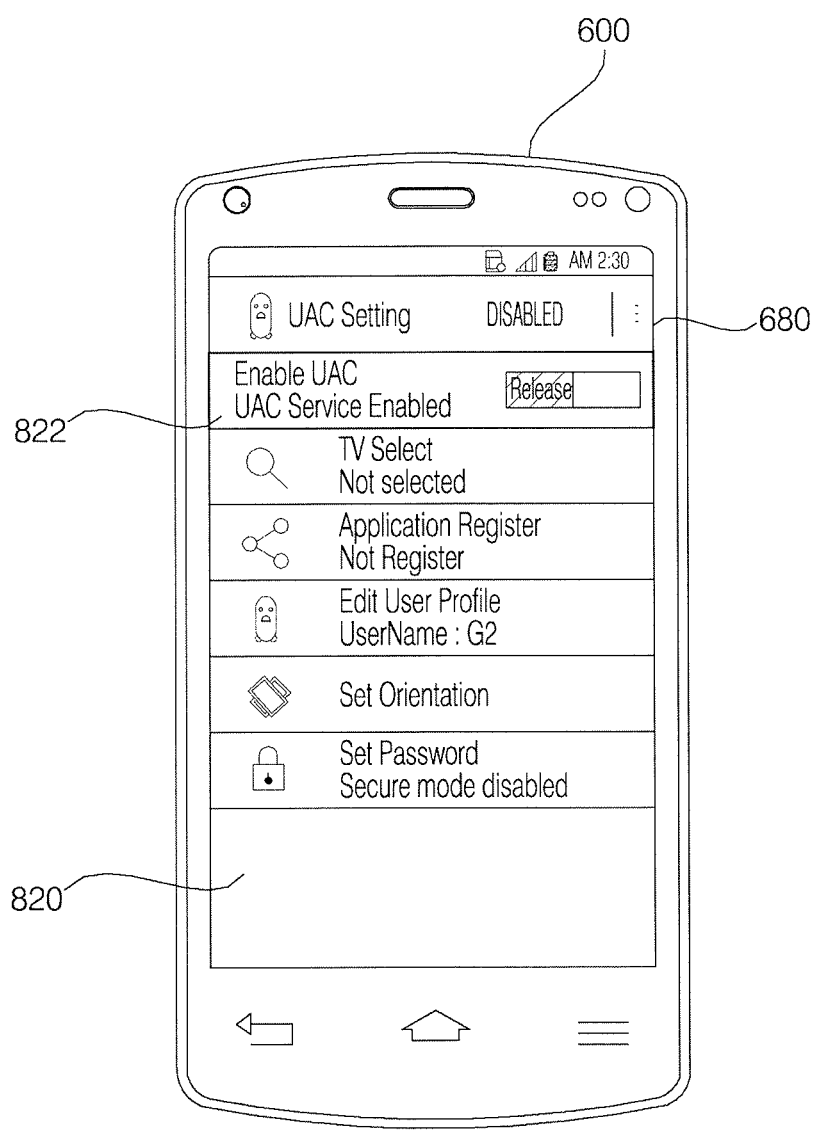

When the mirroring application item 812 is selected in the idle screen window 810 or home screen window 810 of the mobile terminal 600 of FIG. 14A, or downloading of the mirroring application of FIG. 13H is completed, the mirroring application can be automatically executed. In executing the mirroring application, the controller 670 of the mobile terminal 600 can perform a control operation to display a mirroring setting application screen window 820, as shown in FIG. 14B. The mirroring setting application screen window 820 may include an Enable item 822, a TV Select item 824, an Application Register item 826, an Edit User Profile item 823, a Set Orientation item 813, and a Set Password item 814 as shown in FIGS. 14B and 14C.

Figure 14C:
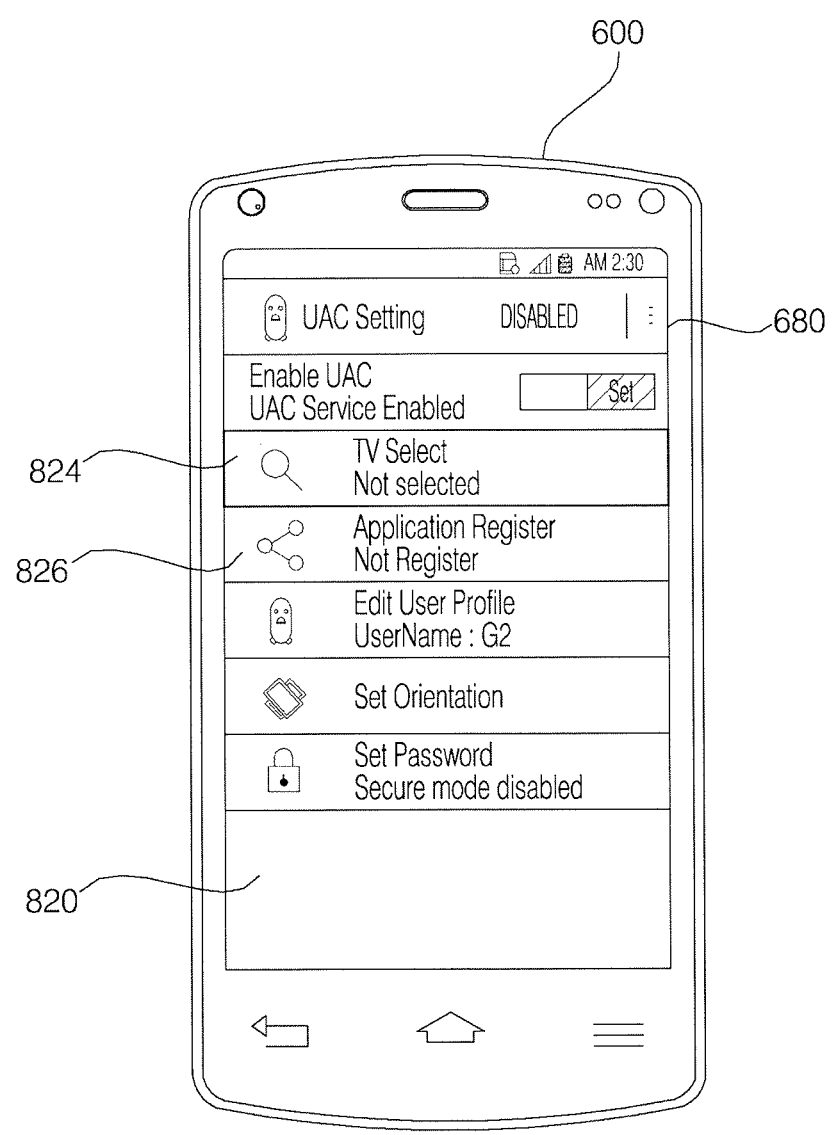

When the Enable item 822 is selected and activated, the controller 670 of the mobile terminal 600 can perform a control operation to activate and display the TV Select item 824, the Application Register item 826, the Edit User Profile item 823, the Set Orientation item 813, and the Set Password item 814, as shown in FIG. 14C. Thereby, various kinds of settings may be implemented.

Figure 14D:
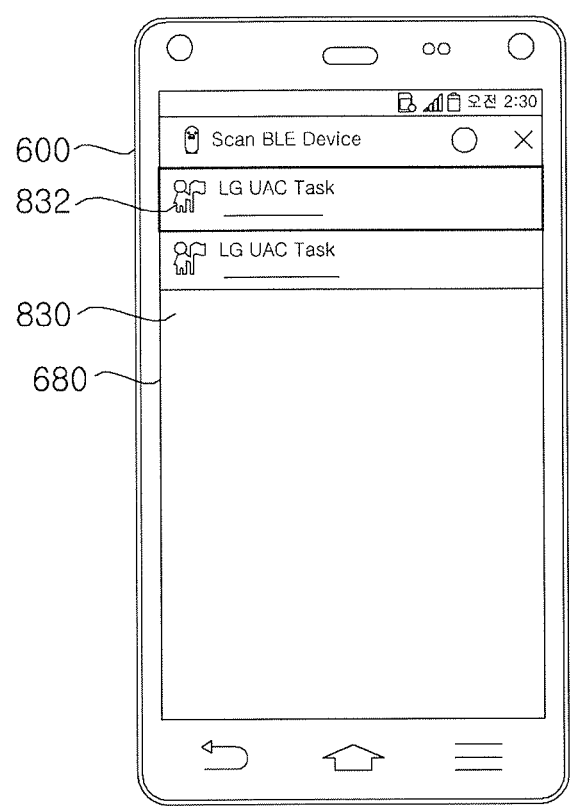

When the TV Select item 824 is selected, the controller 670 of the mobile terminal 600 can search for a TV around the mobile terminal 600. When the search is terminated, the controller 670 can perform a control operation to display a TV list screen window 830 including at least one TV item, as shown in FIG. 14D. In the illustrated example, two TV items are listed.

Figure 14E:
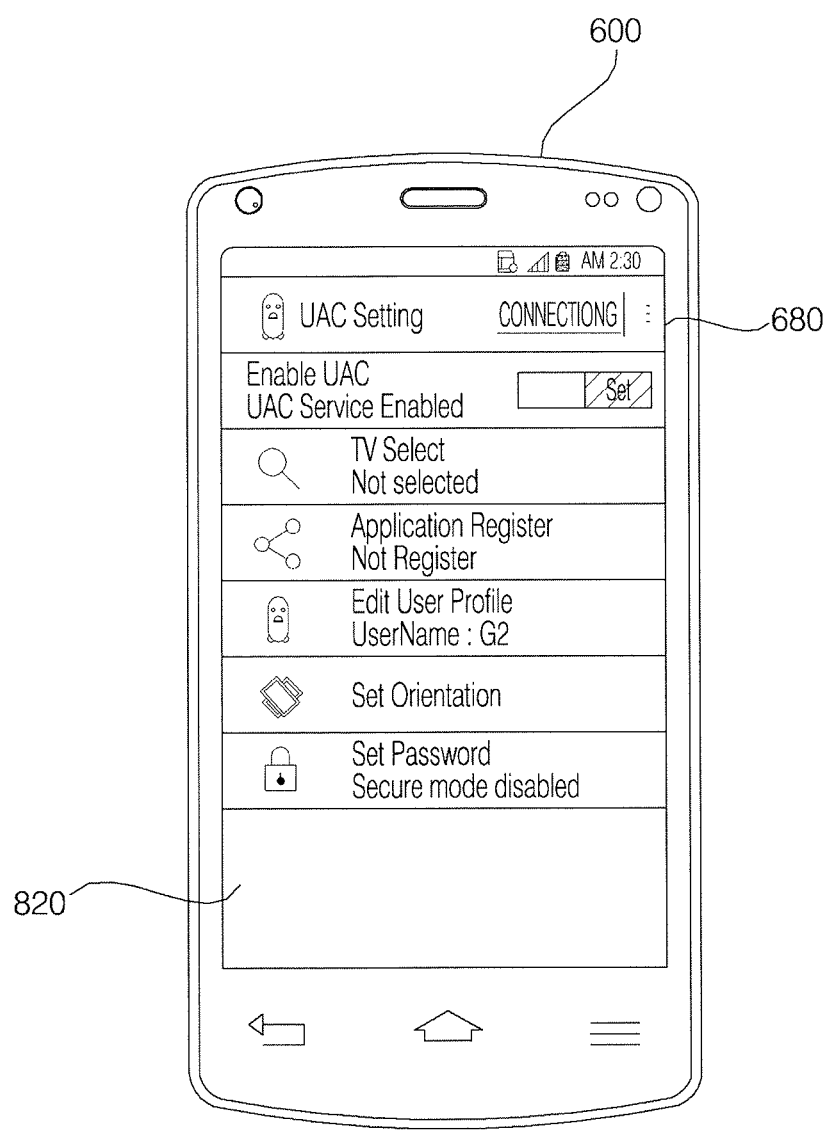

When a first TV item 832 of the two TV items is selected, the controller 670 of the mobile terminal 600 can complete setting for mirroring with the selected first TV item 832. After the setting is completed, the controller 670 of the mobile terminal 600 can perform a control operation to display the mirroring setting application screen window 820 again, as shown in FIG. 14E.

Figure 14F:
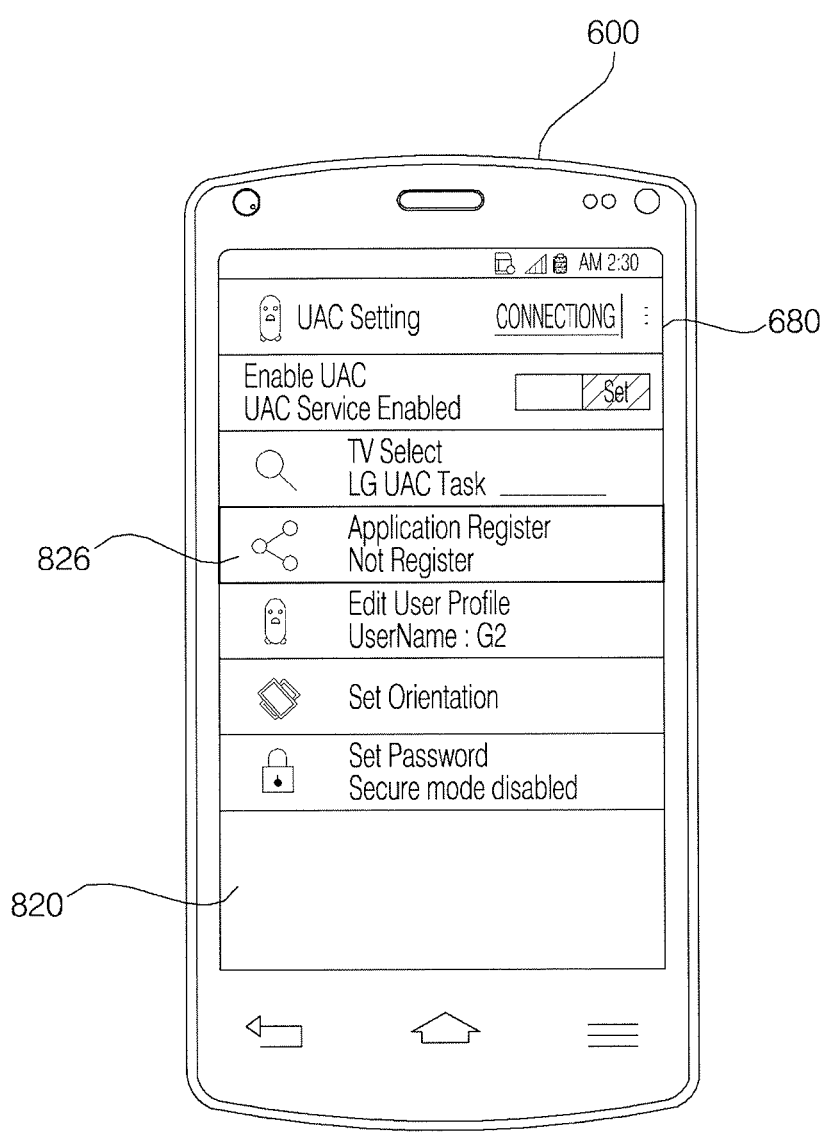
Figure 14G:
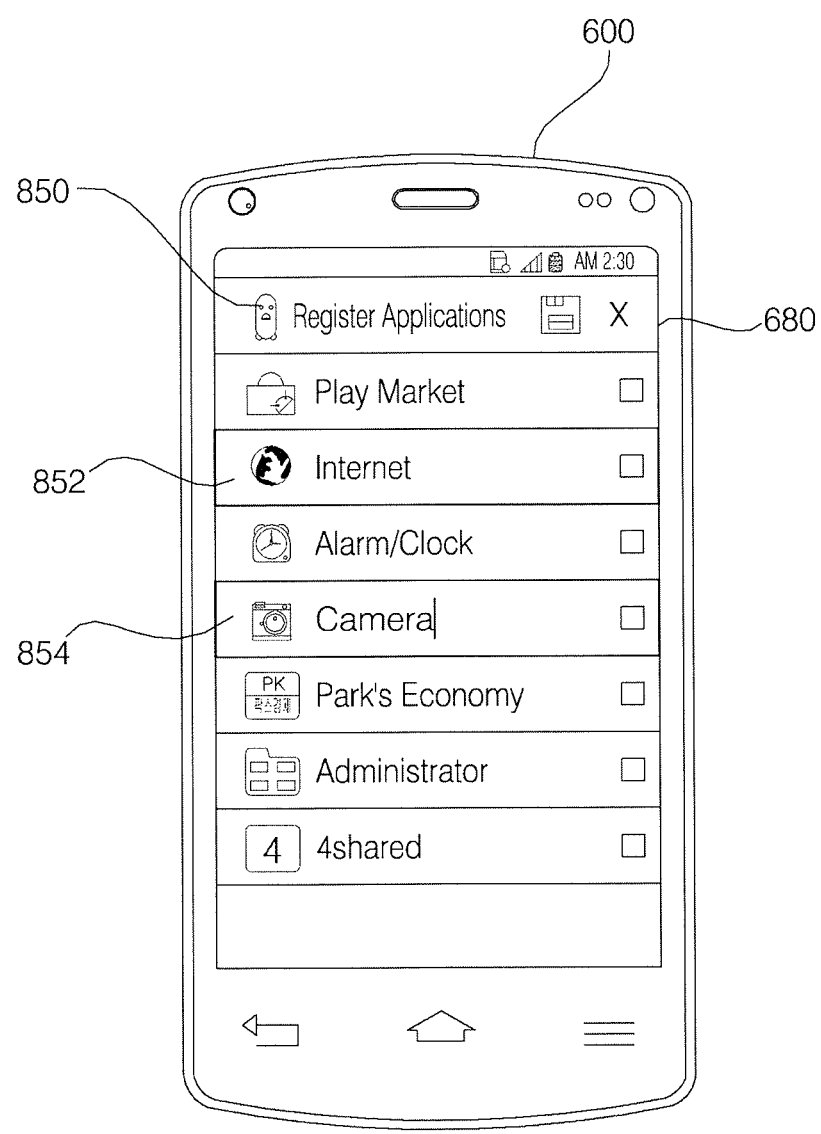
Figure 14H:
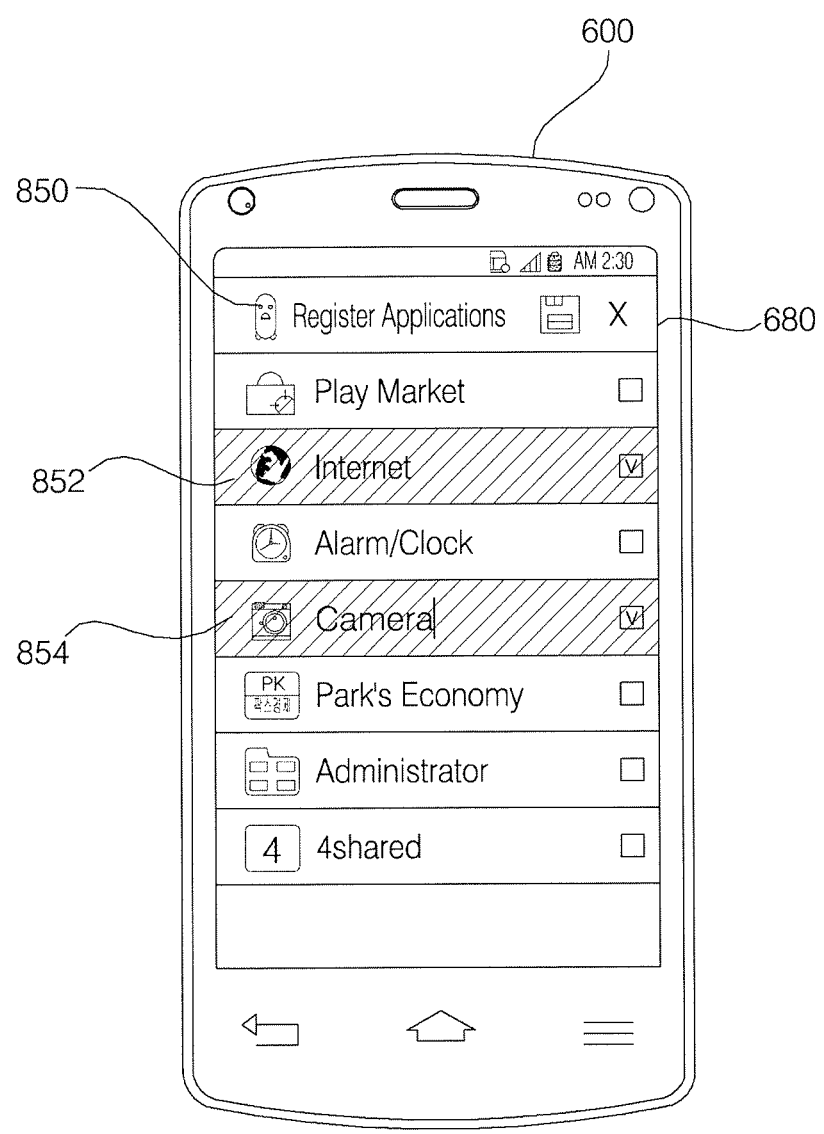

Next, when the Application Register item 826 is selected in the mirroring setting application screen window 820 displayed as shown in FIG. 14F, the controller 670 of the mobile terminal 600 can perform a control operation to display an application list 850 including application items installed in the mobile terminal 600, as shown in FIG. 14G.

For example, when an Internet application item 852 and a camera application item 854 are selected from among a plurality of application items in the application list 850, the controller 670 of the mobile terminal 600 can perform a control operation to highlight the Internet application item 852 and the camera application item 854.

Figure 14I:
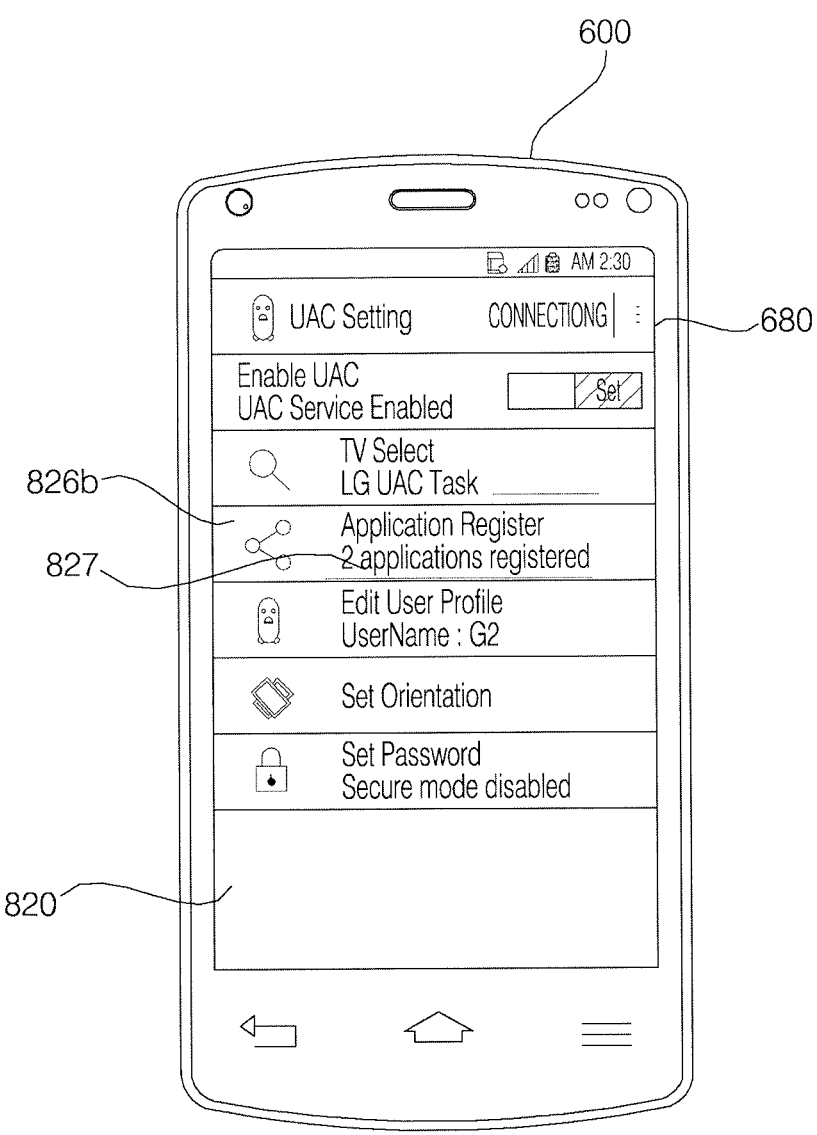

Then, when a Save item is selected, for example, the controller 670 of the mobile terminal 600 can perform a control operation to display the mirroring setting application screen window 820 again as shown in FIG. 14I. Herein, the Application Register item 826b may include information 827 related to the two selected applications.

Figure 14J:
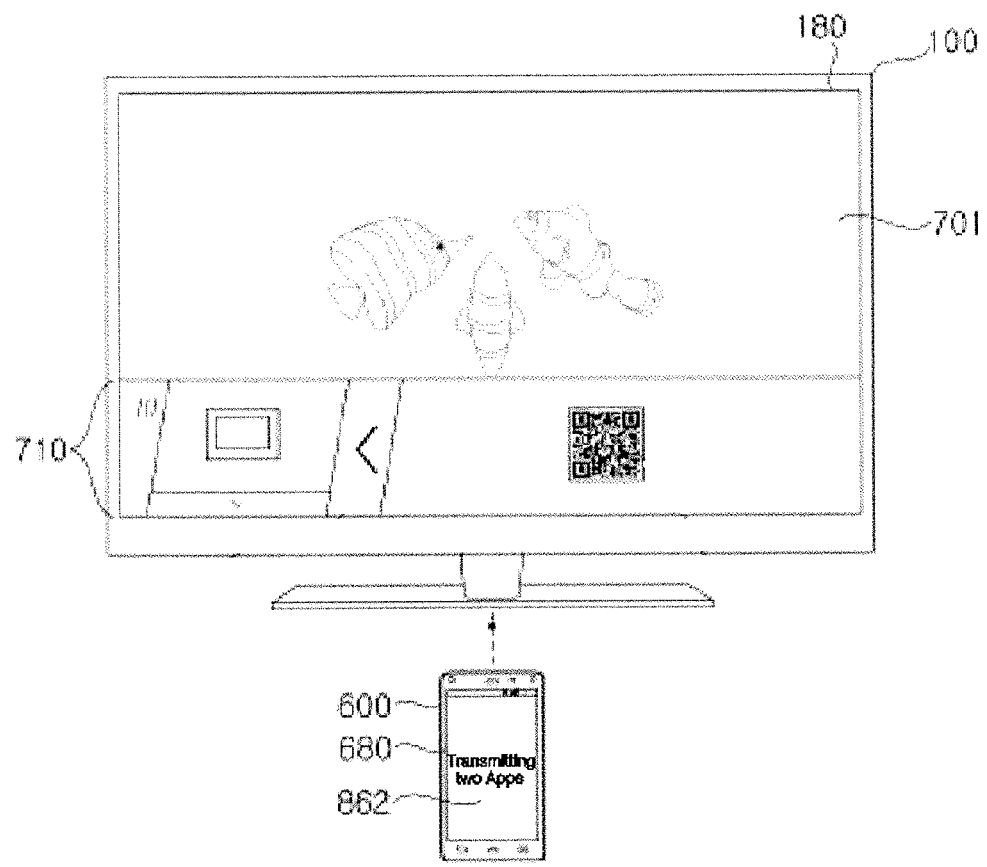

Next, the controller 670 of the mobile terminal 600 can perform a control operation to transmit information related to the two selected application items to the image display apparatus 100 as shown in FIG. 14J. In this instance, the controller 670 of the mobile terminal 600 can perform a control operation to display the transmitted information about the applications on the display 680.

Figure 14K:
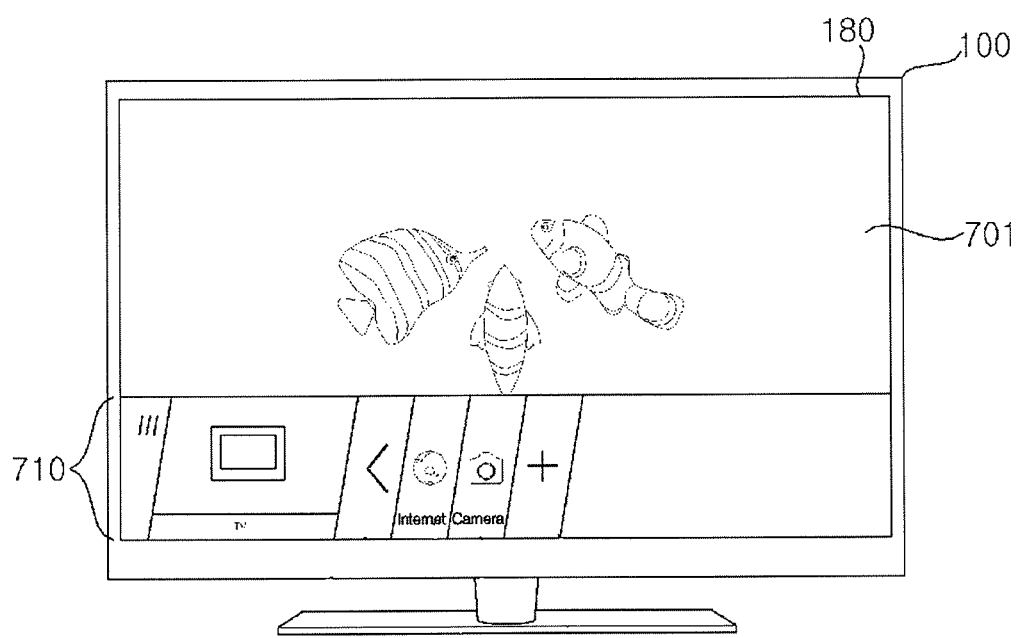

The image display apparatus 100 can receive, through the interface unit 130 or 135, the information related to the two applications for which mirroring is to be performed. The controller 170 of the image display apparatus 100 can perform a control operation to install the received mirroring application items on the image display apparatus 100. In particular, the controller 170 of the image display apparatus 100 can perform a control operation to display the mirroring application items in the mirroring-related menu 717 as shown in FIG. 14K.

The controller 170 of the image display apparatus 100 can select a first mirroring application item of the mirroring application items displayed in the mirroring-related menu 717. For example, the controller 170 can select the first mirroring application item using an arrow key and an OK key of the remote control device 200. As another example, a pointer can be displayed based on a pointing signal included in an RF signal of the remote control device 200, and the first mirroring application item can be selected by the pointer.

When the first mirroring application item is selected from among the mirroring application items displayed in the mirroring-related menu 717, the controller 170 of the image display apparatus 100 can perform a control operation to transmit, to the mobile terminal 600, pairing information or information for request for execution of the first mirroring application, to receive a first mirroring application execution image from the mobile terminal 600 through the network interface unit 130 or 135, and to display the received first mirroring application execution image on the display 180.

Figure 15A:
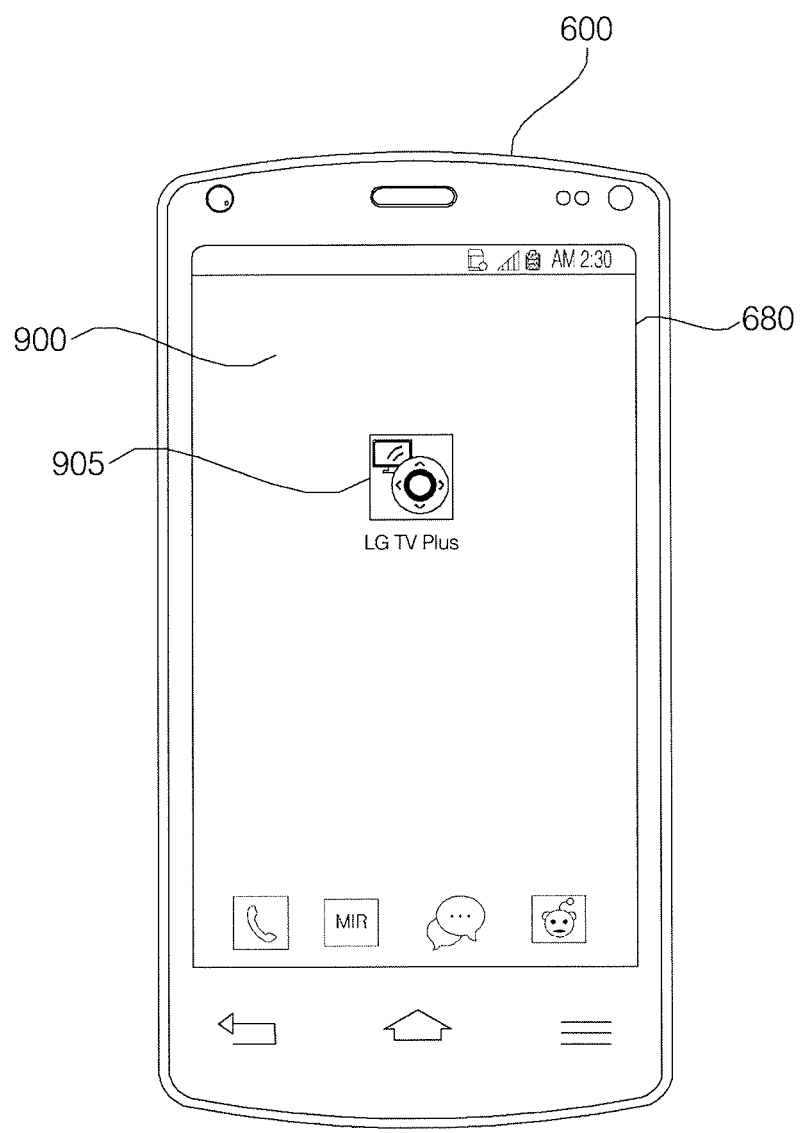
Figure 15B:
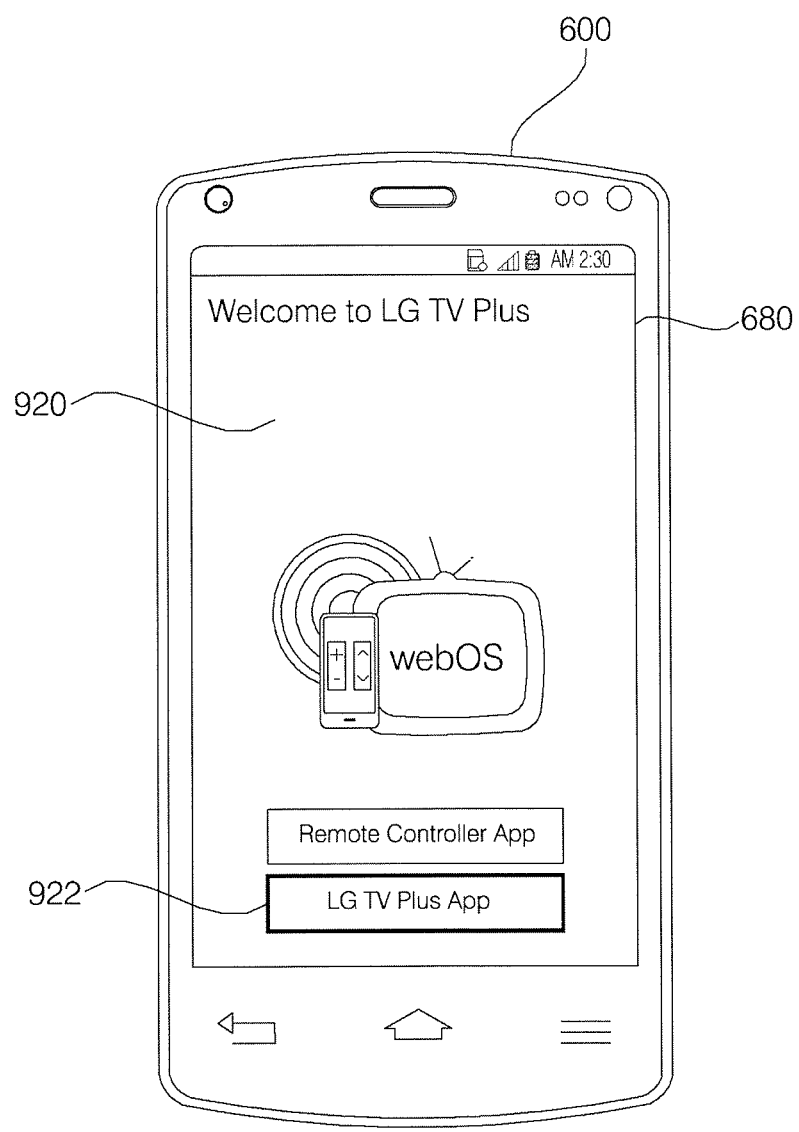
Figure 15C:
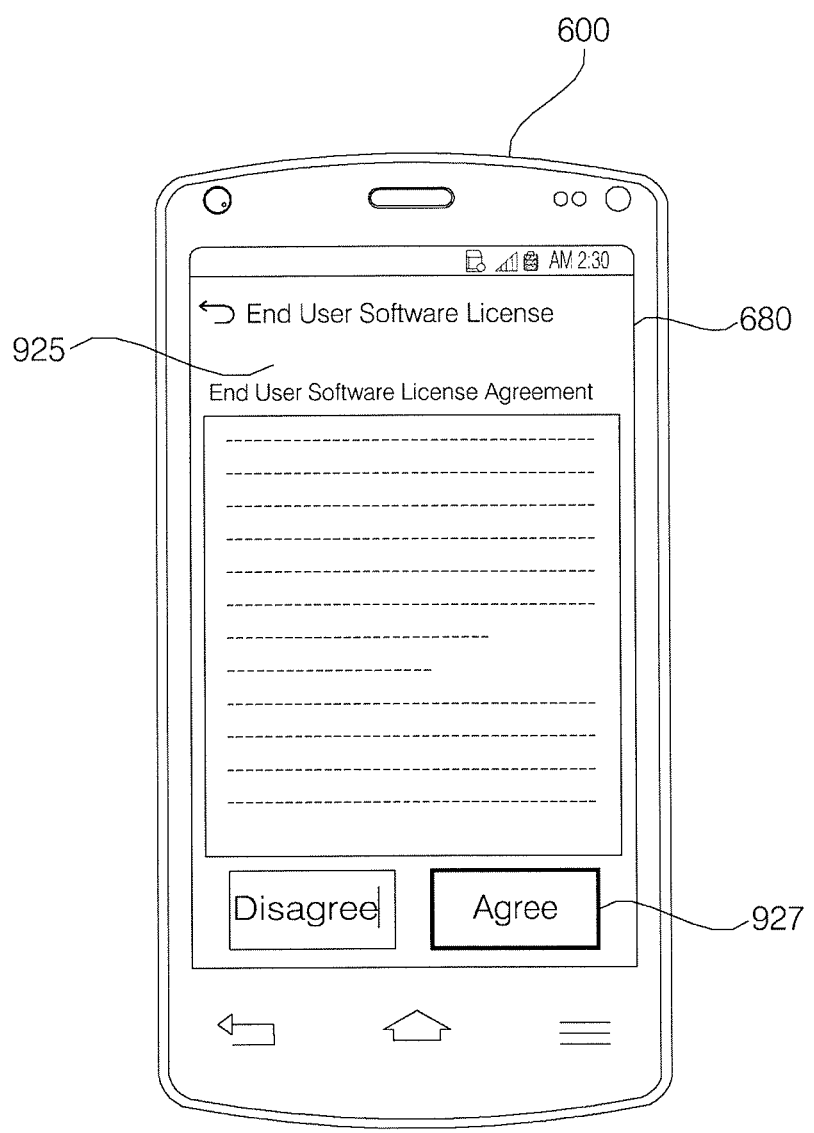
Figure 15D:
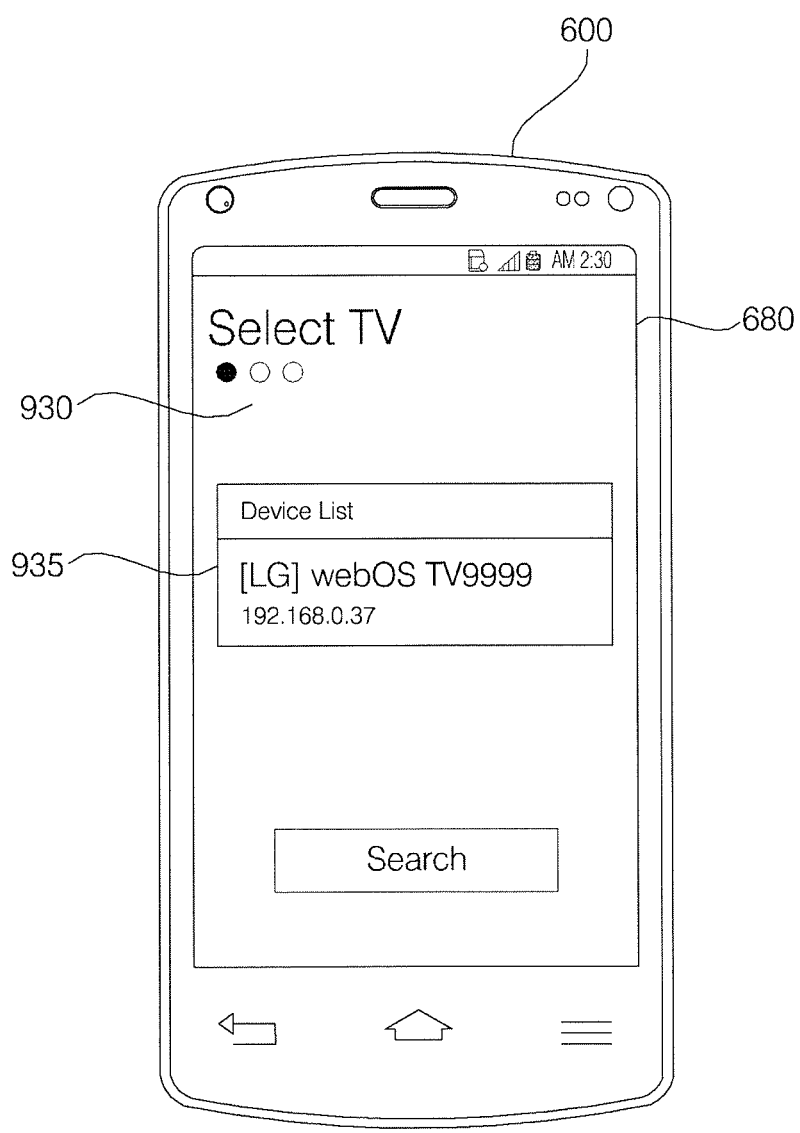
Figure 15E:
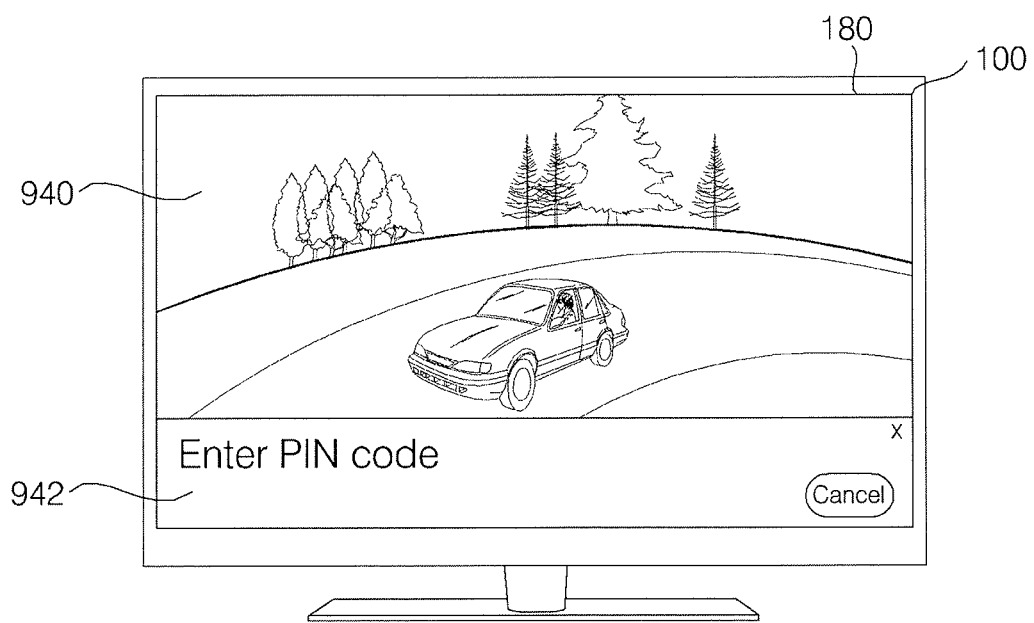
Figure 15F:
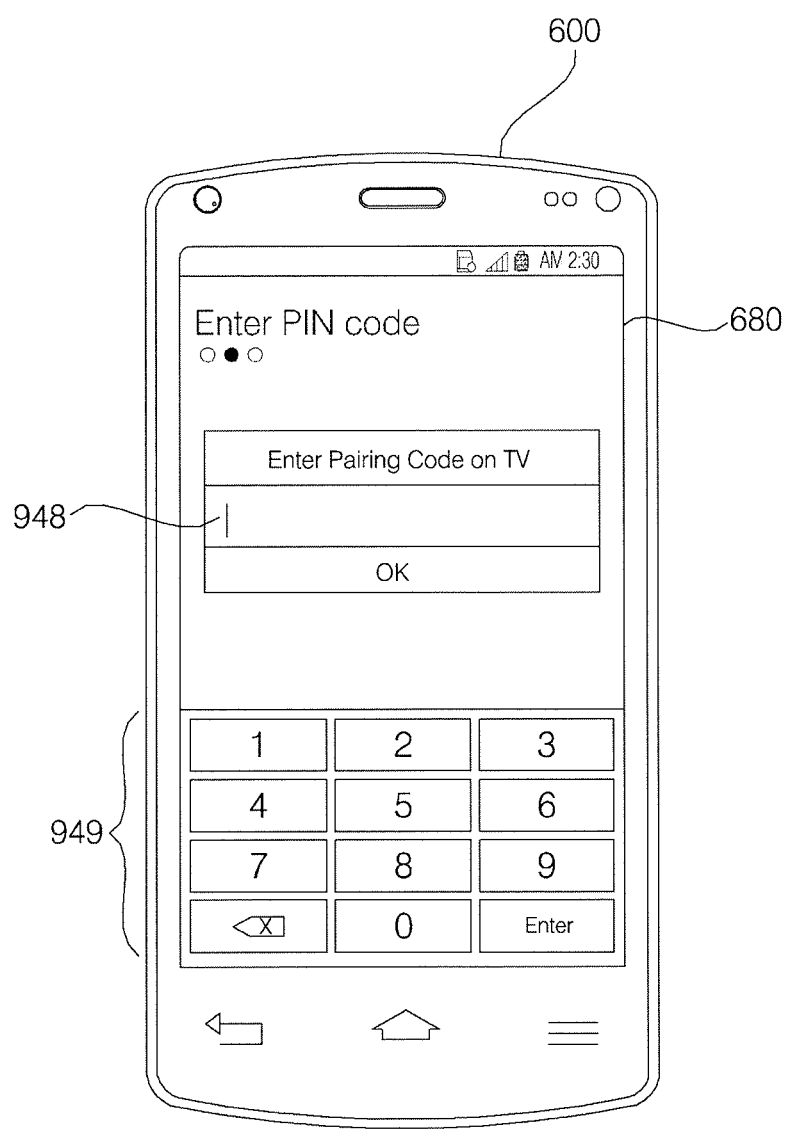
Figure 15G:
Figure 15H:
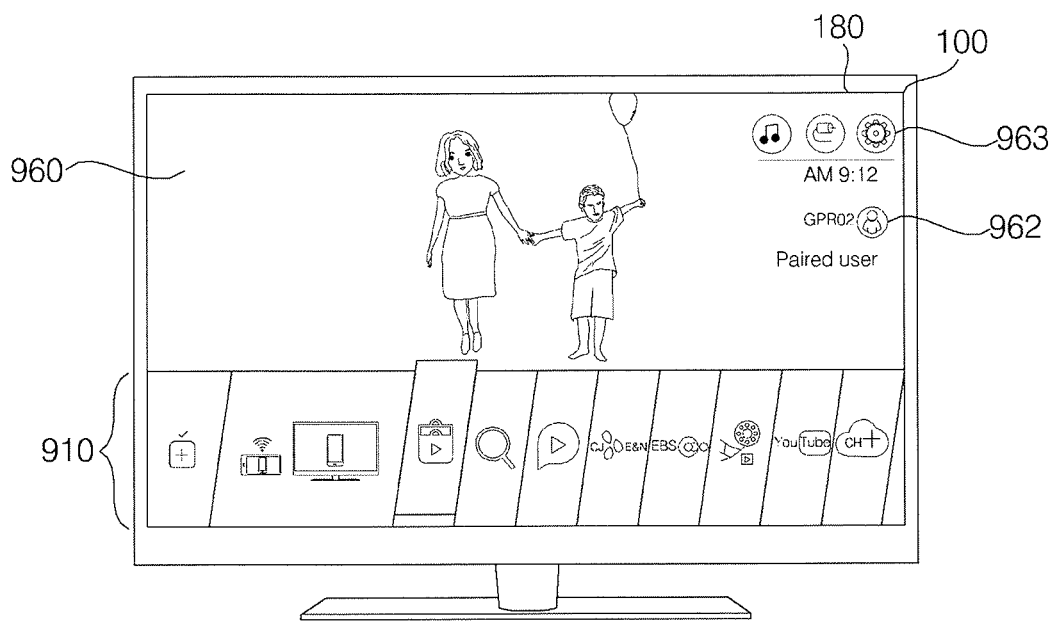
Figure 15I:
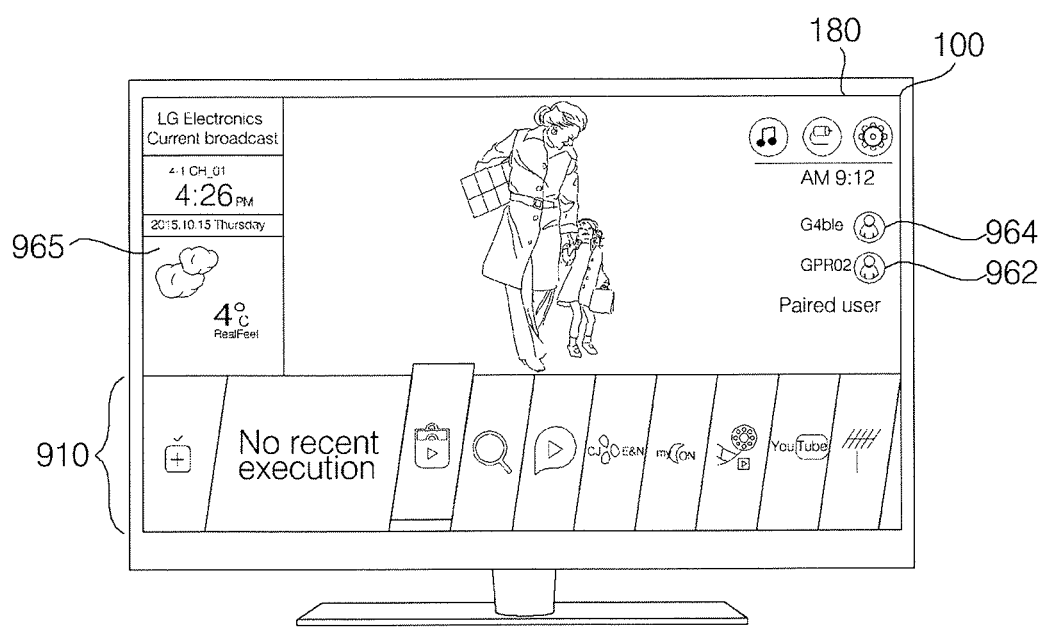
Figure 15J:
Figure 15K:
Figure 15L:
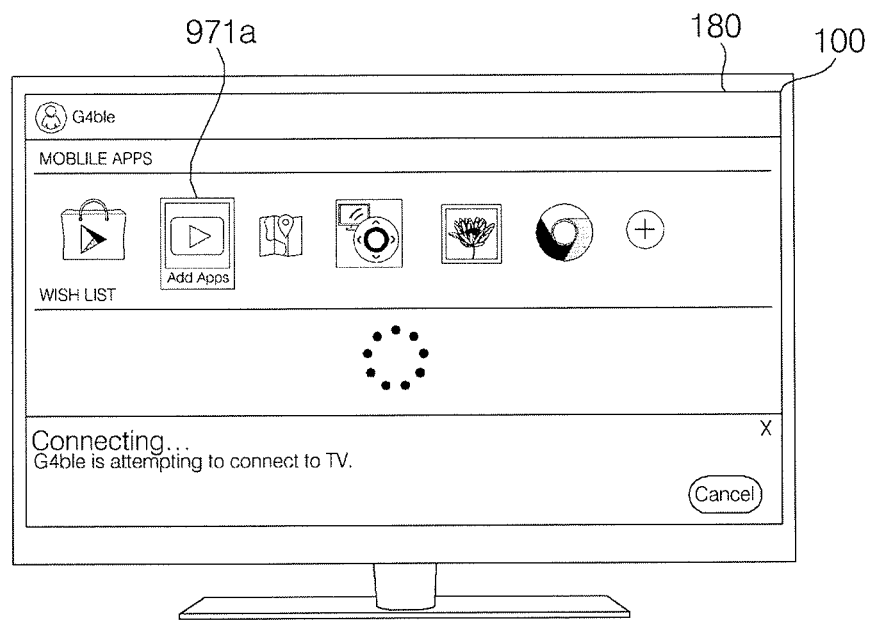
Figure 15M:
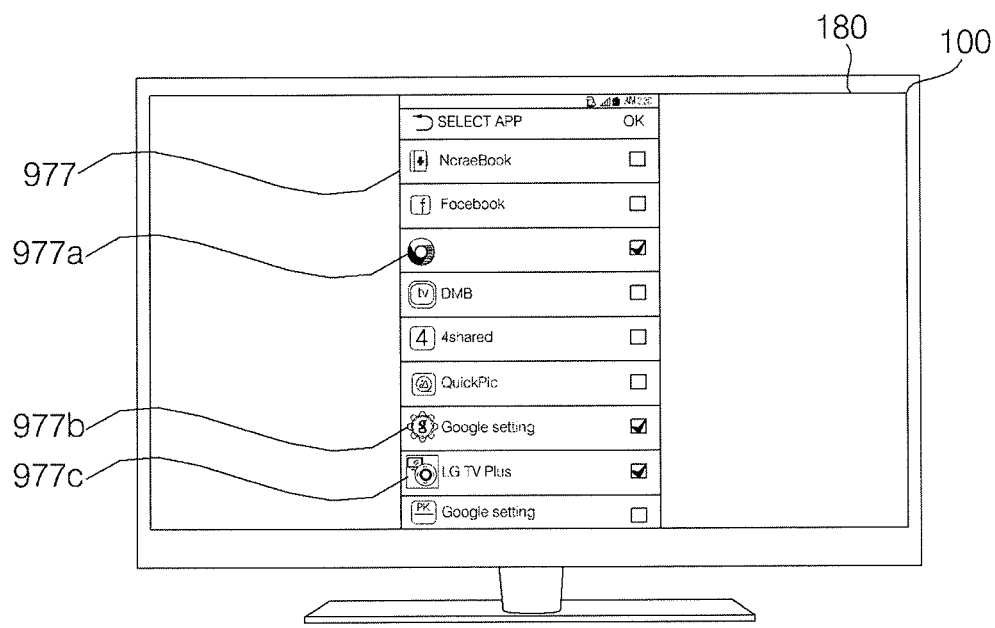
Figure 15N:
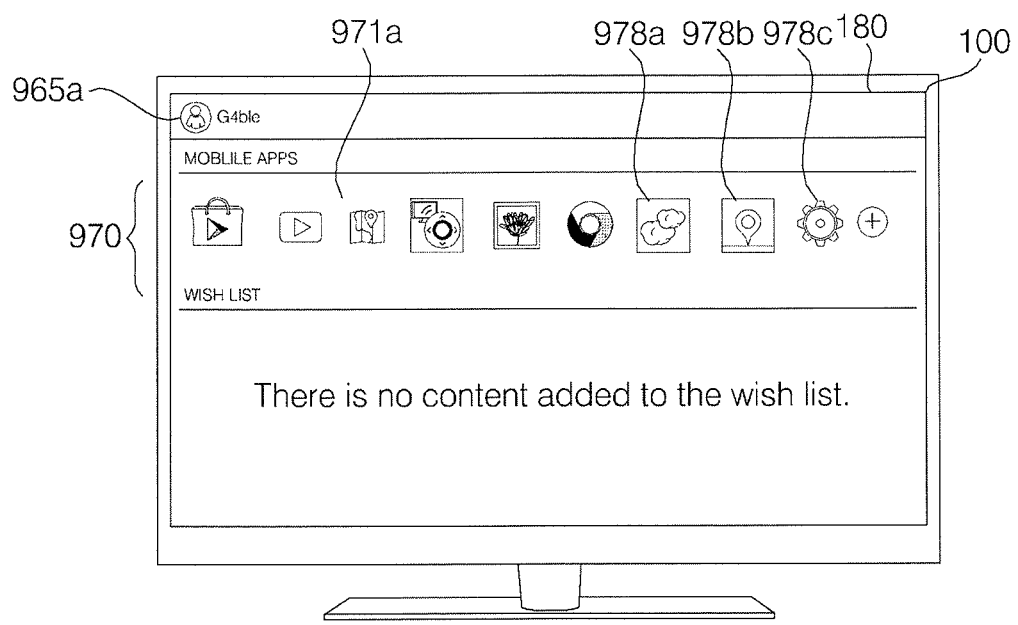
Figure 15O:
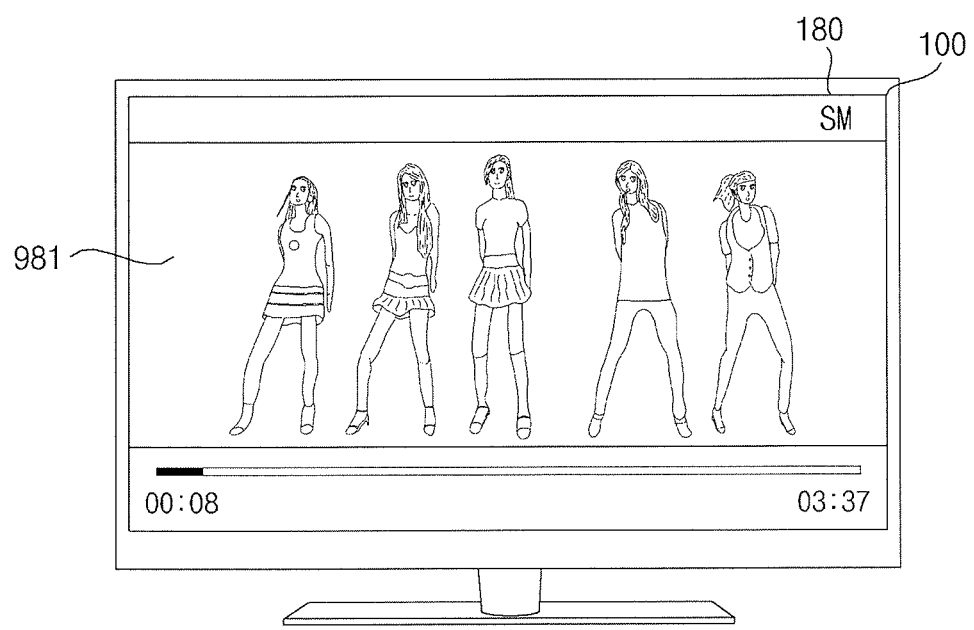
Figure 15P:
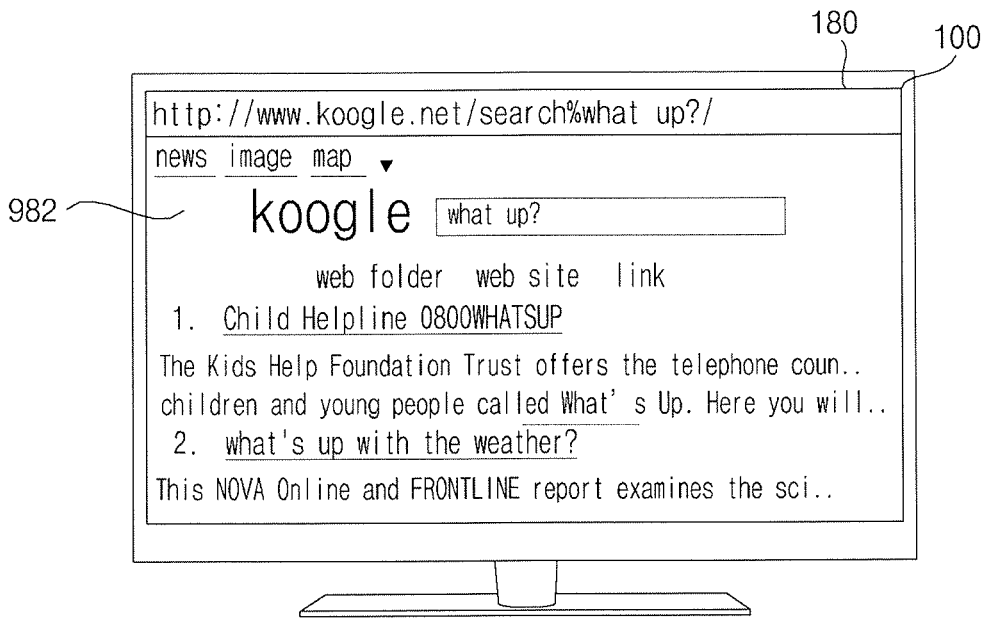
Figure 15Q:
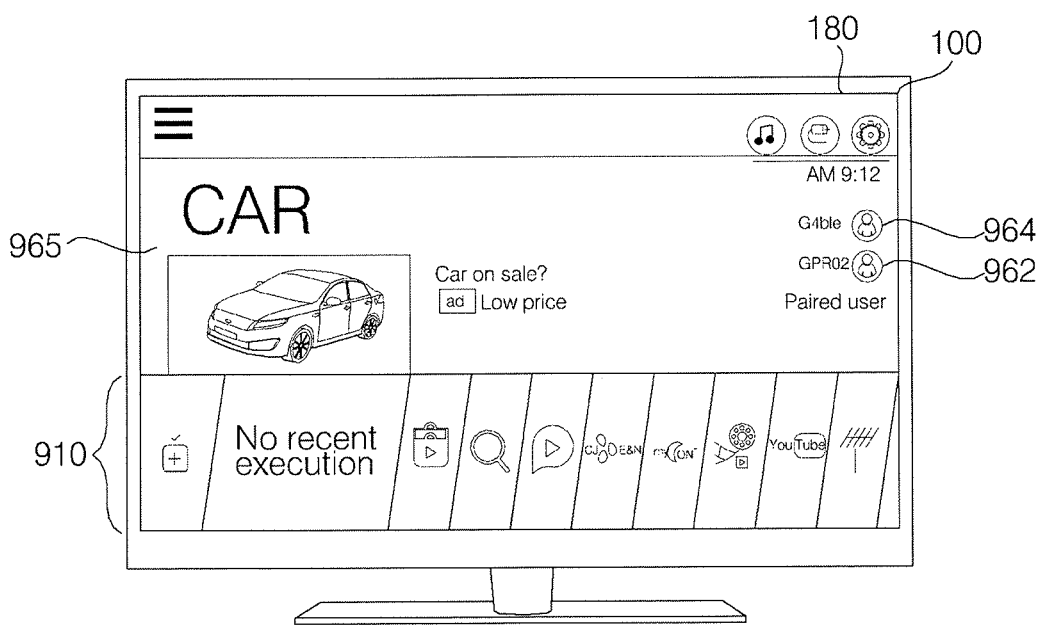
Figure 15R:
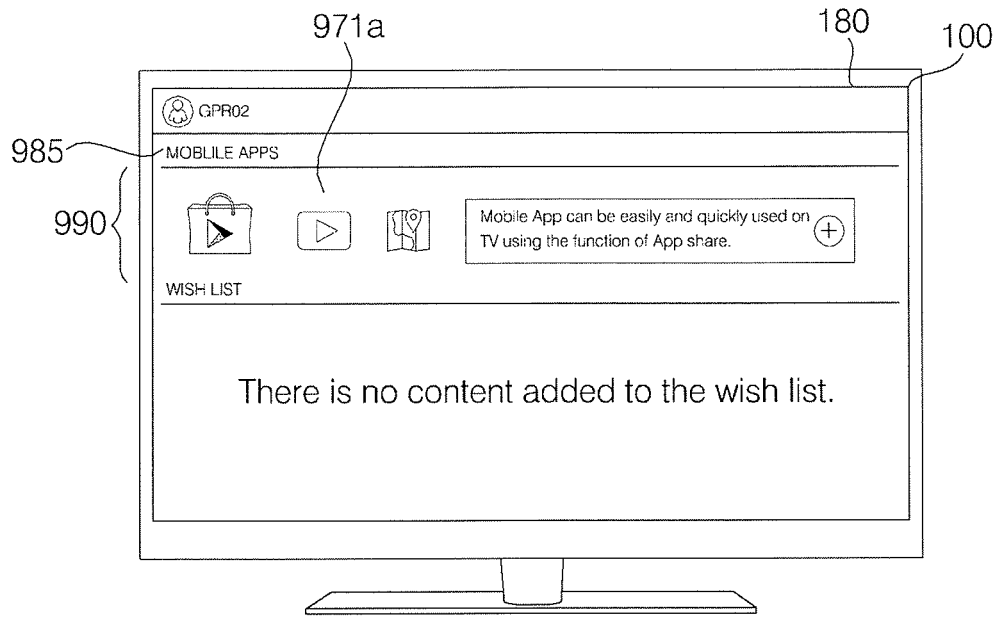
Figure 15S:
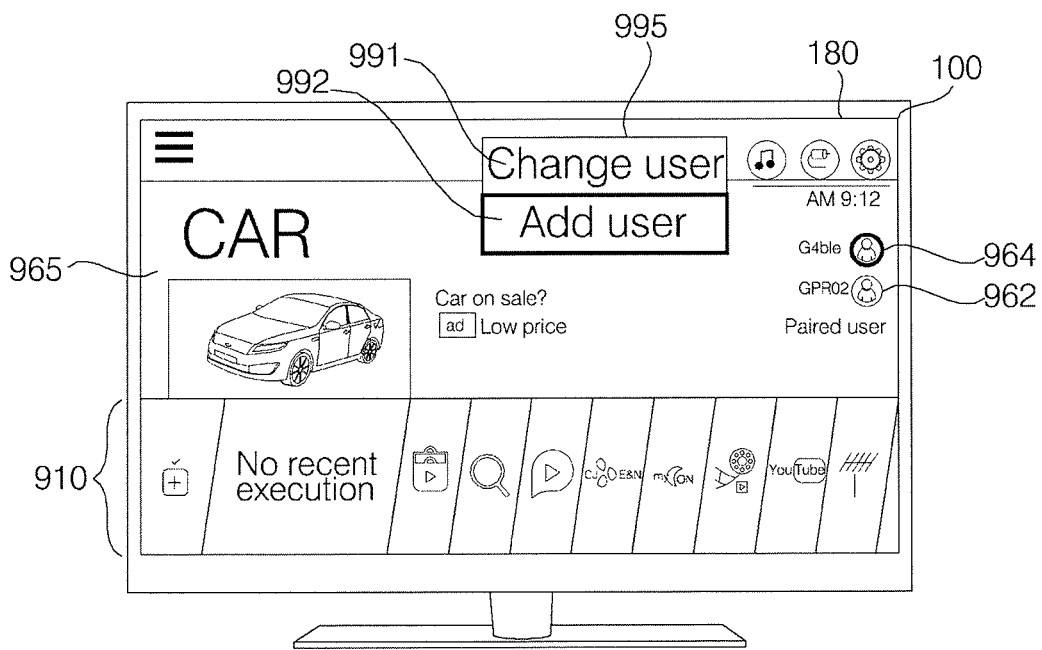
Figure 15T:
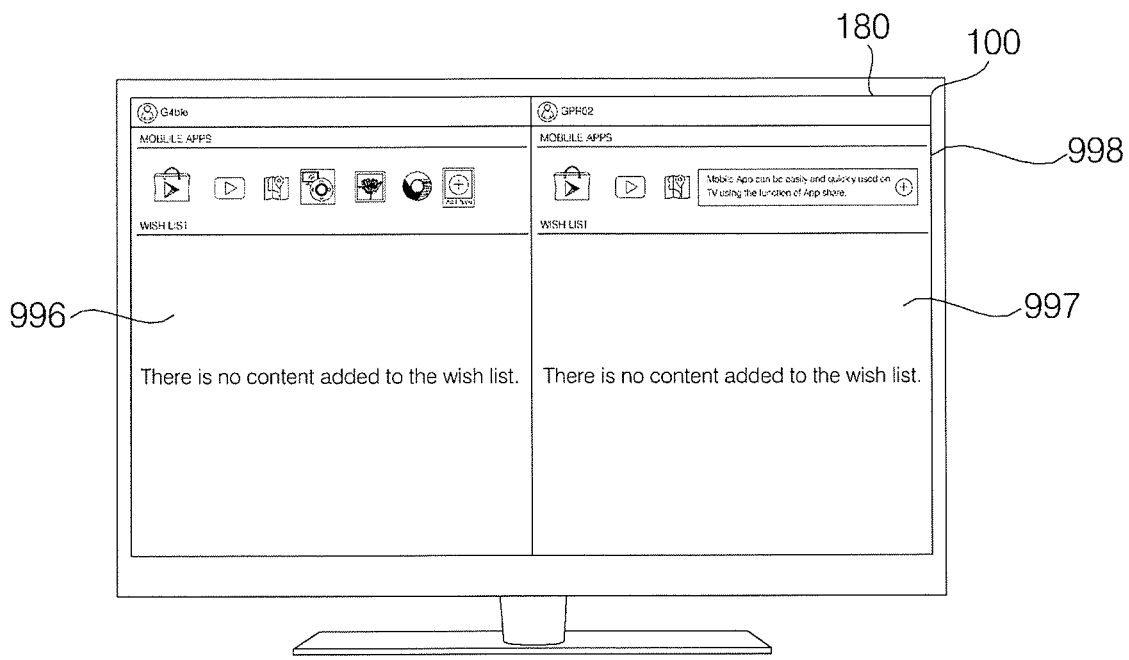

Next, FIGS. 15A to 15T illustrate a method for executing a mirroring application different from the mirroring applications of FIGS. 14A to 14K. In particular, FIG. 15A illustrates the idle screen window 900 or home screen window 900 of the mobile terminal 600. The idle screen window 900 or the home screen window 900 can be displayed on the display 680. A plurality of application items can be displayed at the lower end of the screen.

In FIG. 15A, a TV-related application item 905 is displayed in the home screen window 900 of the mobile terminal 600. The TV-related application may be referred to as an image display apparatus-related application. The TV-related application item 905 can be installed as illustrated in FIGS. 13A to 13H. The TV-related application can conceptually include a TV remote control application and a mirroring application.

When the TV-related application item 905 is executed for the first time, the controller 670 of the mobile terminal 600 can perform a control operation to display the TV-related application item 905 in an image or window 920 as shown in FIG. 15B. The TV-related application item may include a remote control item and a mirroring item 922.

When the mirroring item 922 is selected, the controller 670 of the mobile terminal 600 can perform a control operation to display a screen window 925 for installation of a mirroring application as shown in FIG. 15C. When the "Agree" item 927 in the screen window 925 for installation of the mirroring application is selected, the controller 670 of the mobile terminal 600 can connect to the server 500 to request transmission of the mirroring application, download the mirroring application from the server 500 and install the same.

If an execution input is provided automatically or separately after installation of the mirroring application is completed, the controller 670 of the mobile terminal 600 can perform a control operation to display a mirroring application setting screen window 930 as shown in FIG. 15D. In particular, the mirroring application setting screen window 930 may include a list 935 including an image display apparatus item for an image display apparatus which is in the same AP device or located around the mobile terminal 600.

While it is illustrated in the figure that only one image display apparatus item is displayed, it is also possible to display image display apparatus items for a plurality of image display apparatuses located around the mobile terminal. When an image display apparatus item in the list 935 is selected, the controller 670 of the mobile terminal 600 can perform a control operation to transmit a relevant signal for the selected image display apparatus. For example, the controller 670 of the mobile terminal 600 can perform a control operation to transmit a signal for display of code information related to the mirroring application.

The controller 170 of the image display apparatus 100 can receive, through the network interface unit 135, a signal for display of the code information related to the mirroring application, and perform a control operation to display the code information 942 in an image 940 on the display 180. The displayed code information may be a random code generated by the controller 170 of the image display apparatus 100.

In this instance, the controller 170 of the image display apparatus 100 can perform a control operation to display the code information 942 in addition to the displayed image 940, as shown in FIG. 15E. When an image display apparatus item in the list 935 is selected, the controller 670 of the mobile terminal 600 can perform a control operation to display, on the display 680 of the mobile terminal 600, an input window 948 for the code information displayed on the image display apparatus and a keyboard 949, as shown in FIG. 15F.

If a code corresponding to the code information displayed on the image display apparatus is input through the keyboard 949, the controller 670 of the mobile terminal 600 can perform a control operation to transmit the code information to the image display apparatus 100. Then, the controller 670 of the mobile terminal 600 can receive the authentication complete information from the image display apparatus 100.

After authentication is completed, the controller 670 of the mobile terminal 600 can perform a control operation to display an authentication complete screen window 950 as shown in FIG. 15G. Through the steps of FIG. 15A to 15G, setting for mirroring between the mobile terminal 600 and the image display apparatus 100 may be completed.

When setting for mirroring between the mobile terminal 600 and the image display apparatus 100 is completed in the mobile terminal 600 through the steps of FIG. 15A to 15G, information related to a server connected with the mobile terminal 600 can be transmitted to the image display apparatus 100, and thus a mirroring application can be received by and installed on the image display apparatus 100. Alternatively, the steps of FIG. 15A to 15G can be performed in the mobile terminal 600 with the mirroring application pre-installed on the image display apparatus 100.

Once setting for mirroring between the mobile terminal 600 and the image display apparatus 100 is completed through the steps of FIG. 15A to 15G, the mobile terminal 600 and the image display apparatus 100 will remain connected to each other. When the mobile terminal 600 and the image display apparatus 100 are wirelessly connected to each other, the controller 170 of the image display apparatus 100 can perform a control operation to display an object 962 indicating the paired mobile terminal on the display 180 as shown in FIG. 15H.

In particular, the controller 170 of the image display apparatus 100 can perform a control operation to display the object 962 indicating the paired mobile terminal on the displayed image 960. Thereby, while viewing the image 960 of the image display apparatus 100, the user of the mobile terminal or another user can recognize that the mobile terminal is paired and connected with the image display apparatus.

The object 962 indicating the paired mobile terminal may include name information and image information. The image information may be edited through user selection of the paired mobile terminal. The name information may also be edited through user selection of the paired mobile terminal.

FIG. 15H illustrates display of an application list 910 and a setting object 963 in addition to the image 960 and the object 962 indicating the paired mobile terminal. When a plurality of mobile terminals is paired and connected with the image display apparatus, the controller 170 of the image display apparatus 100 cancan perform a control operation to display objects 962 and 964 indicating the plurality of mobile terminals as shown in FIG. 15I.

FIG. 15I illustrates an object 962 indicating the paired mobile terminal and a second object 964 indicating a second paired mobile terminal on an image 965. If the number of displayed objects is greater than an allowed number of objects, the controller 170 of the display apparatus 100 can perform a control operation to delete objects from the oldest object and display objects corresponding to the most recently connected mobile terminals.

In FIG. 15H or 15I, when the object 962 indicating a paired mobile terminal is selected, the controller 170 of the display apparatus 100 can perform a control operation to display an application list 970 and a wish list 975 related to the paired mobile terminal, as shown in FIG. 15J. The application list 970 related to the paired mobile terminal may include an application item which can be subjected to mirroring between the mobile terminal 600 and the image display apparatus 100 and an Add item 966.

In the figure, an App Store item, a moving image playback item, a map item, an image viewer item and an Internet item are provided as examples of application items which can be subjected to mirroring. If the Add item 966 is selected in the application list 970 related to the paired mobile terminal as shown in FIG. 15K, the controller 170 of the image display apparatus 100 can perform a control operation to display a list 977 of applications to be added as shown in FIGS. 15L and 15M.

The list 977 of applications to be added may be a mirrored image identical to the image displayed on the mobile terminal 600. That is, when the Add item 966 is selected in the application list 970 related to the paired mobile terminal as shown in FIG. 15K, the controller 170 of the image display apparatus 100 can transmit an application list execution request to the mobile terminal 600. Then, the controller 170 of the image display apparatus 100 can perform a control operation to receive and display a list of applications which are being executed on the mobile terminal 600.

When predetermined items 977a, 977b and 977c are selected, by, for example, the remote control device 200, in the list 977 of applications to be added which is displayed in FIG. 15M, the controller 170 of the image display apparatus 100 can transmit information related to the selected items to the mobile terminal 600, receive applications related to the selected items from the mobile terminal 600 or the server 500, and install the same.

Thereby, the controller 170 of the image display apparatus 100 can perform a control operation to display a new application list 970 including the added application items 978a, 978b and 978c, as shown in FIG. 15N. When a moving image playback item 971a is selected in the application list 970 as shown in FIG. 15N, the controller 170 of the image display apparatus 100 can perform a control operation to display an object 971 indicating that connection to the mobile terminal is being executed, and attempt to connect to the mobile terminal 600.

That is, the controller 170 of the image display apparatus 100 can transmit, to the mobile terminal 600, an application execution request related to the moving image playback item. Then, when the application related to the moving image playback item of the mobile terminal 600 is executed, the controller 170 of the image display apparatus 100 can perform a control operation to implement mirroring.

Then, when mirroring connection is completed, the controller 170 of the image display apparatus 100 can perform a control operation to display, on the display 180, a screen window 981 of a moving image playback application which is being executed in the mobile terminal 600, as shown in FIG. 15O.

When the Internet item of FIG. 15N is selected, the controller 170 of the image display apparatus 100 can perform a control operation to display, on the display 180, an Internet screen window 982 displayed on the mobile terminal 600, as shown in FIG. 15P. When the second object 964 indicating the second paired mobile terminal is selected with the object 962 and the second object 964 displayed as shown in FIG. 15Q, the controller 170 of the image display apparatus 100 can perform a control operation to display an application list 990 related to the second paired mobile terminal as shown in FIG. 15R. Although FIGS. 15Q and 15R illustrate change of users, addition of a user can also be implemented using a screen division technique.

When the second object 964 indicating the second paired mobile terminal is selected by the back key after the controller 170 of the image display apparatus 100 displays the application list 970 related to the paired mobile terminal according to selection of the object 962 indicating the paired mobile terminal through the steps of FIGS. 15I and 15J, the controller 170 of the image display apparatus 100 can perform a control operation to display a Change User object 991 and an Add User object 992, as shown in FIG. 15S.

If the Change User object 991 is selected, the controller 170 of the image display apparatus 100 can perform a control operation to display an application list 990 related to the second paired mobile terminal as shown in FIG. 15R. When the Add User object 992 is selected, the controller 170 of the image display apparatus 100 can perform a control operation to display an application list 996 related to the paired mobile terminal and an application list 997 related to the second paired mobile terminal on the display 180, as shown in FIG. 15T.

That is, as shown in FIG. 15T, the screen may be divided to display the application list 996 related to the paired mobile terminal and the application list 997 related to the second paired mobile terminal together on the display 180. Thereby, mirroring may be implemented using a plurality of mobile terminals. The name information and image information about the object indicating the paired mobile terminal may be edited through the mobile terminal 600.

Figure 16:
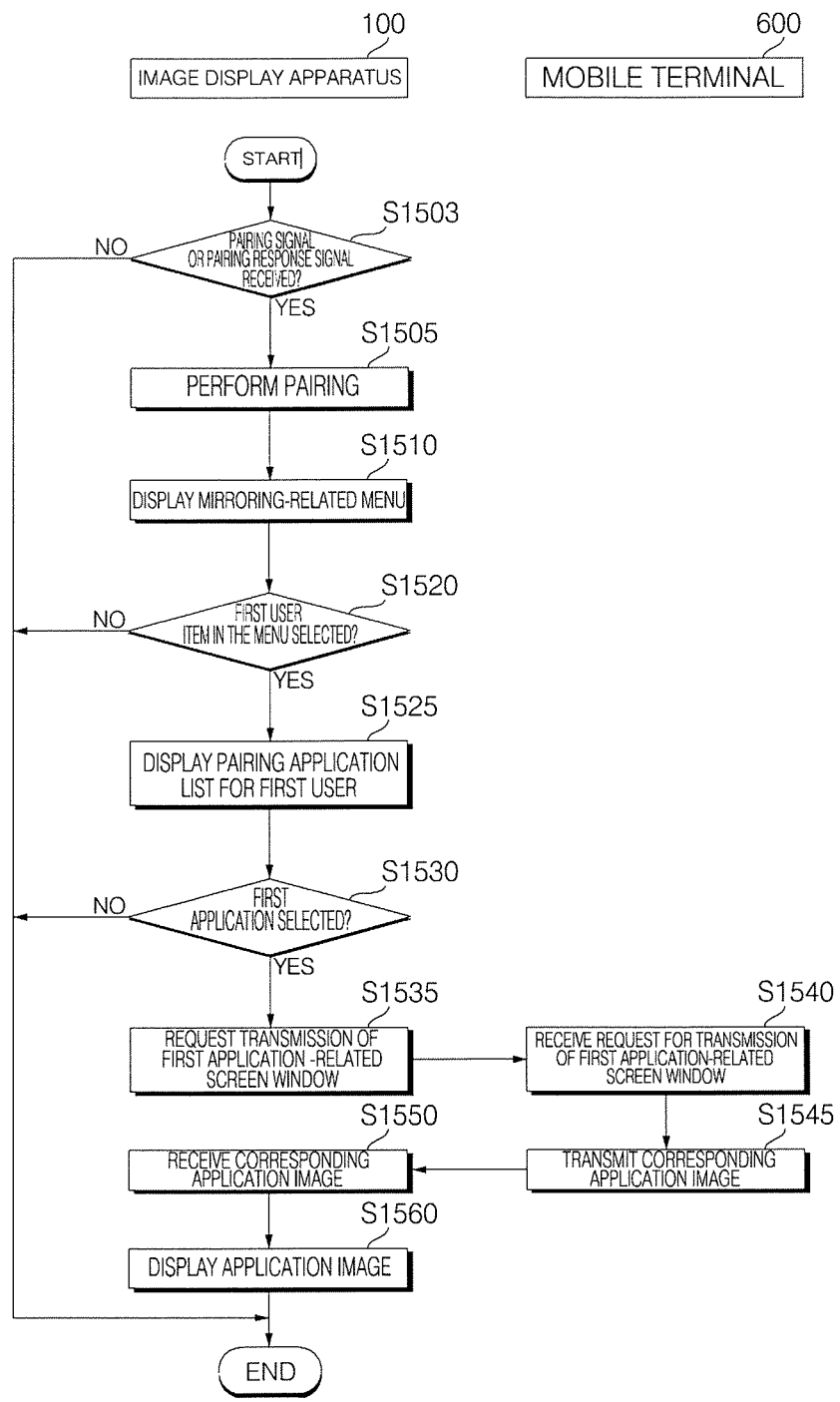
FIG. 16 is a flowchart illustrating operation of an image display apparatus and mobile terminal according to another embodiment of the present invention.

Next, FIG. 16 is a flowchart illustrating operation of an image display apparatus and mobile terminal according to another embodiment of the present invention, and FIGS. 17A to 17H illustrate the operation method of FIG. 16. Referring to FIG. 16, after being turned on, the controller 170 of the image display apparatus 100 can periodically transmit a pairing signal.

If the mobile terminal 600/600a approaches the image display apparatus 100 within a predetermined distance, the mobile terminal 600 can receive the pairing signal (S1503). Then, when the mobile terminal 600/600a is within the predetermined distance from the image display apparatus 100, the mobile terminal 600/600a can transmit a pairing response signal in response to reception of the pairing signal. Thereby, the image display apparatus 100 can receive the pairing response signal and perform pairing based on the pairing response signal (S1505).

The pairing signal may include device information about the image display apparatus 100, network information, and frequency channel information for wireless communication. The pairing response signal may include device information about the mobile terminal 600/600a, network information, and frequency channel information for wireless communication.

The controller 170 of the image display apparatus 100 can perform a control operation to display a mirroring-related menu when pairing with the mobile terminal 600/600a is completed (S1510). The mirroring-related menu may be the mirroring-related menu 717 as shown in FIG. 14K. In addition, the mirroring-related menu may be an object indicating the paired mobile terminal as shown in FIG. 15H. Hereinafter, description will be given focusing on the object 962 indicating the paired mobile terminal.

Figure 17A:
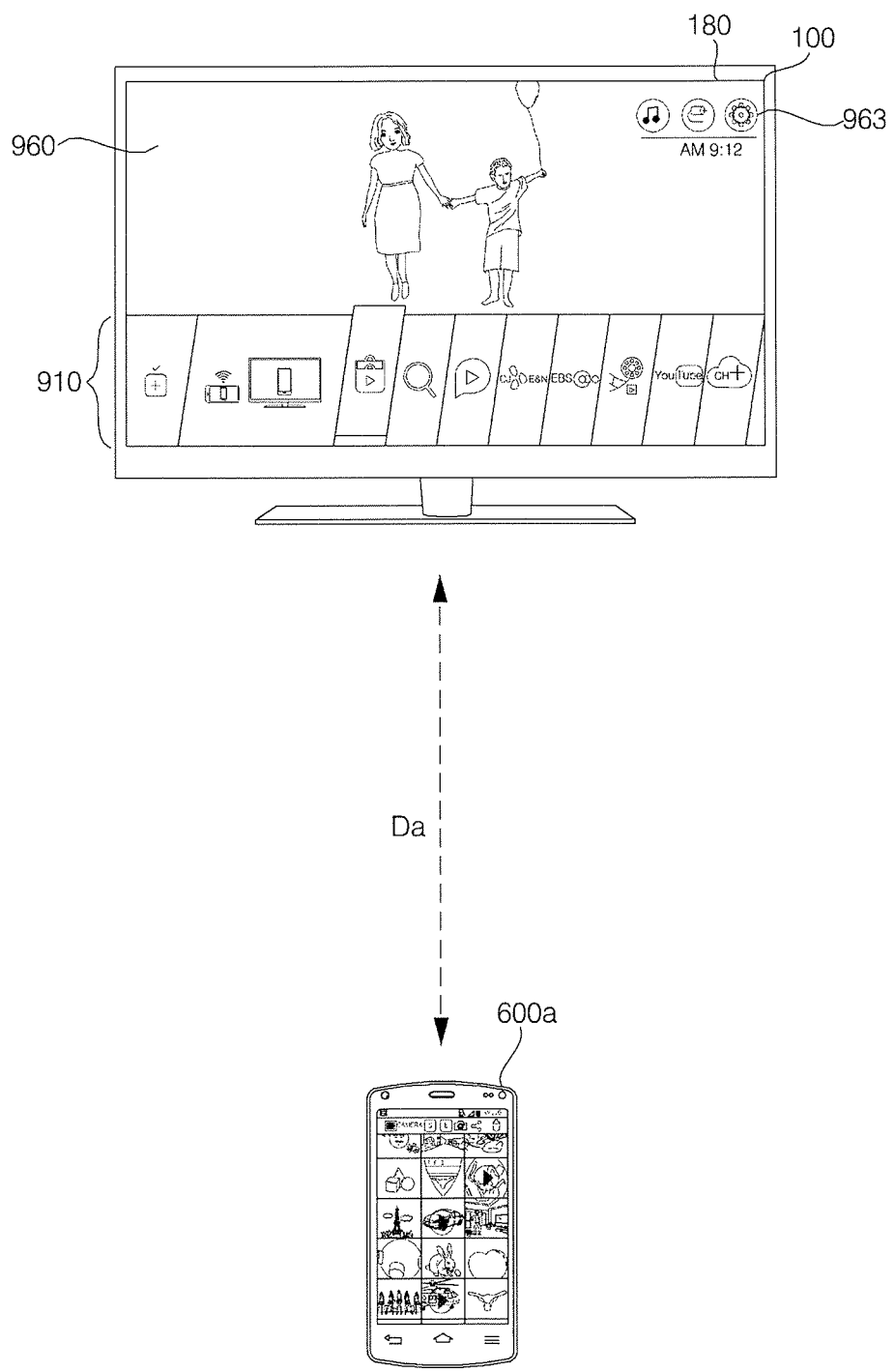

FIG. 17A illustrates when the distance between the image display apparatus 100 in the mobile terminal 600/600a is Da at which pairing cannot be performed. In this instance, the controller 170 of the image display apparatus 100 controls a menu related to the mobile terminal not to be displayed. In FIG. 17A, only the image 960 and the application list 910 are displayed.

Figure 17B:
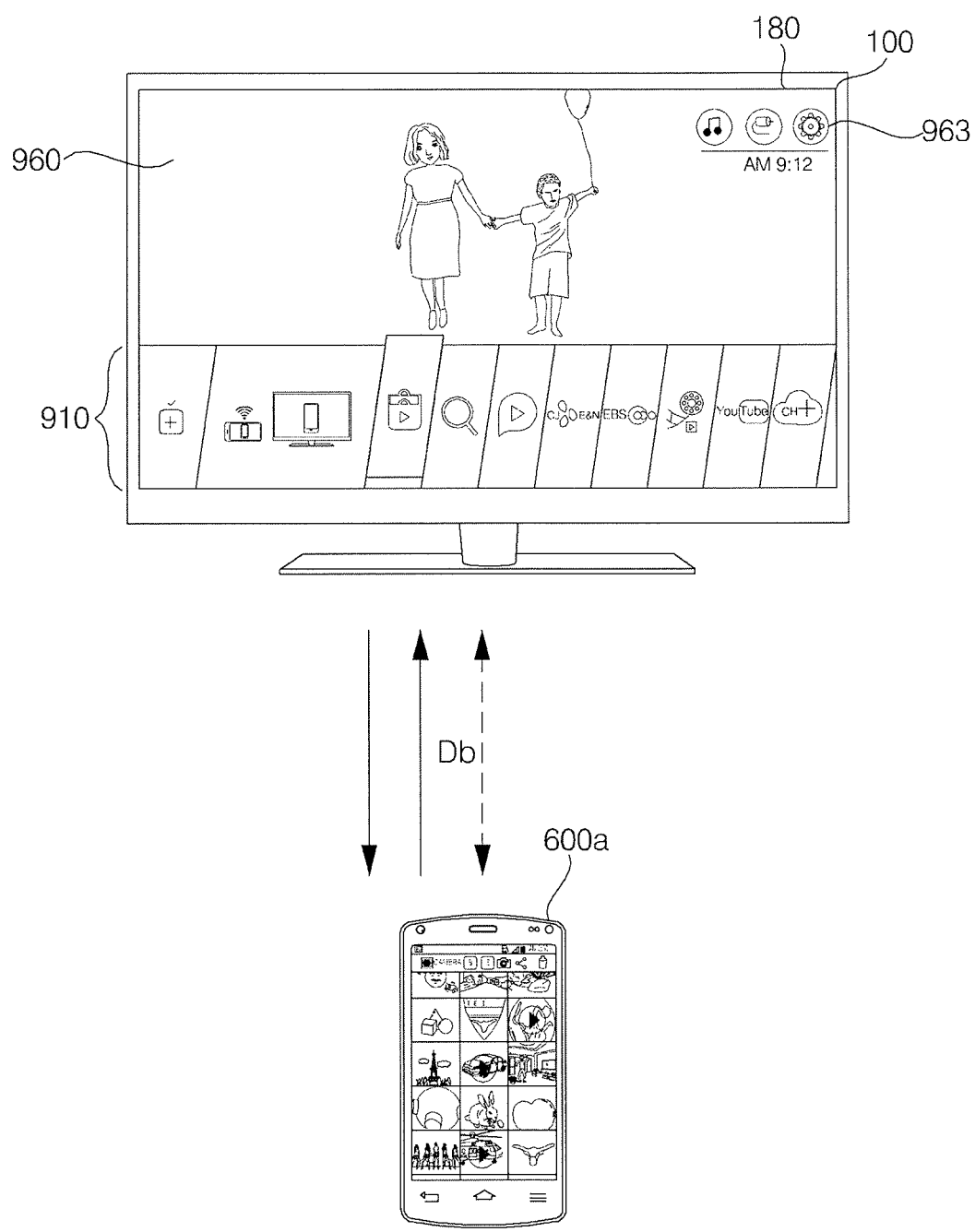

FIG. 17B illustrates when the distance between the image display apparatus 100 and the mobile terminal 600/600a is Db at which pairing can be performed. In this instance, the controller 170 of the image display apparatus 100 receives a pairing signal or a pairing response signal from the mobile terminal 600/600a as described above (S1503), and performs pairing based on the signal.

Figure 17C:
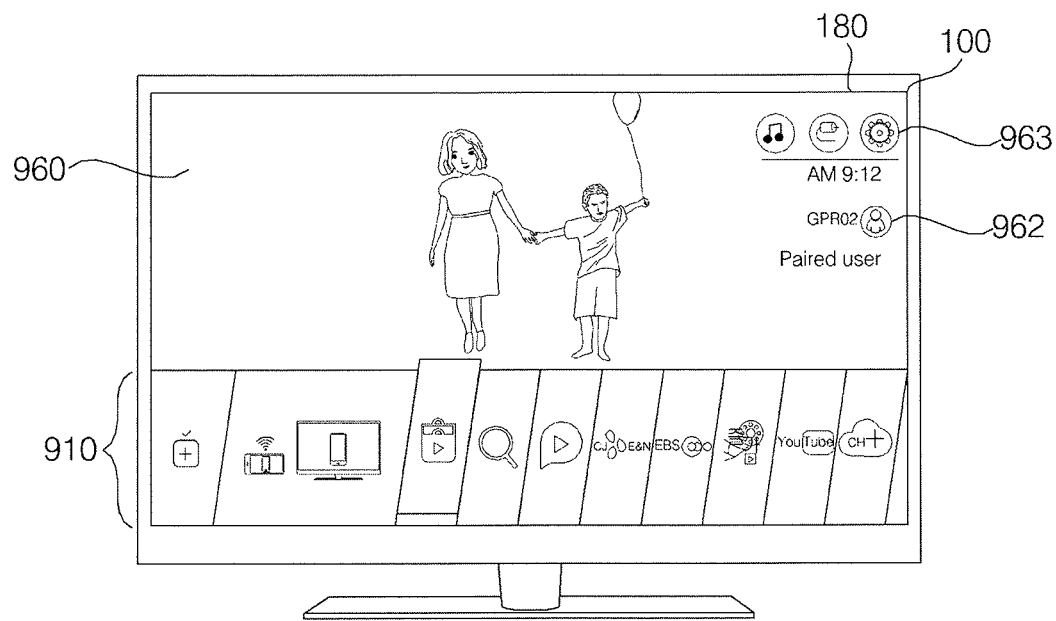

When pairing is completed, the controller 170 of the image display apparatus 100 can perform a control operation to display an object 962 indicating the paired mobile terminal in addition to the image 960 and the application list 910, as shown in FIG. 17C. Thereby, it may be recognized that connection is being performed as pairing with the mobile terminal is completed When a first user item is selected in the menu (S1520), namely when the object 962 indicating the paired mobile terminal is selected, the controller 170 of the image display apparatus 100 can perform a control operation to display an application list 970 related to the paired mobile terminal and a wish list 975 (S1525), as showing FIG. 17D.

Next, when a first application is selected in the application list 970 related to the paired mobile terminal (S1525), the controller 170 of the image display apparatus 100 can perform a control operation to transmit a request for transmission of a screen window related to the first application to the mobile terminal 600/600a (S1535).

Thereby, the controller 670 of the mobile terminal 600/600a can receive the request for transmission of a screen window related to the first application through a communication unit (S1540), and perform a control operation to execute and display the first application on the display 680 and to transmit the screen window of the first application to the image display apparatus 100 (S1545). The controller 170 of the image display apparatus 100 can receive the first application screen window via the network interface unit (S1550), and perform a control operation to display the same on the display 180 (S1560).

Figure 17D:
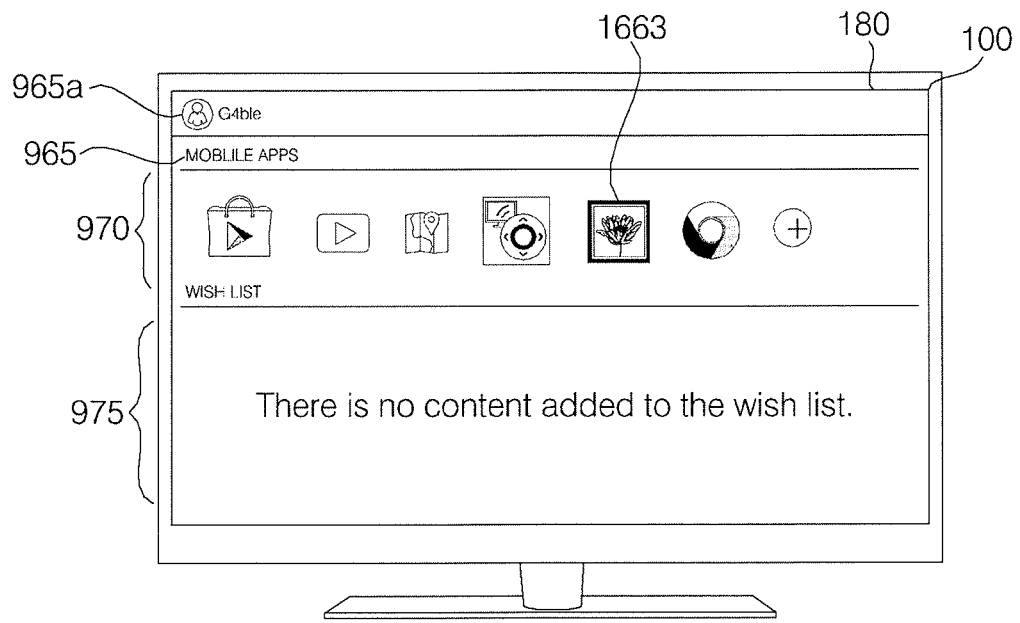

When the image viewer application is selected in the application list 970 related to the paired mobile terminal as shown in FIG. 17D, the controller 170 of the image display apparatus 100 can perform a control operation to receive the image of the image viewer application from the paired mobile terminal 600/600a and to display the image 701 of the image viewer application, as shown in FIG. 17E.

While it is illustrated in the figure that the image viewer application image 701 and the application list 710 are displayed together, the image viewer application image 701 can be displayed alone. If another mobile terminal approaches the image display apparatus 100 within a predetermined distance with the paired mobile terminal 600/600a located within the predetermined distance, the controller 170 of the image display apparatus 100 can perform a control operation to implement additional pairing.

Figure 17F:
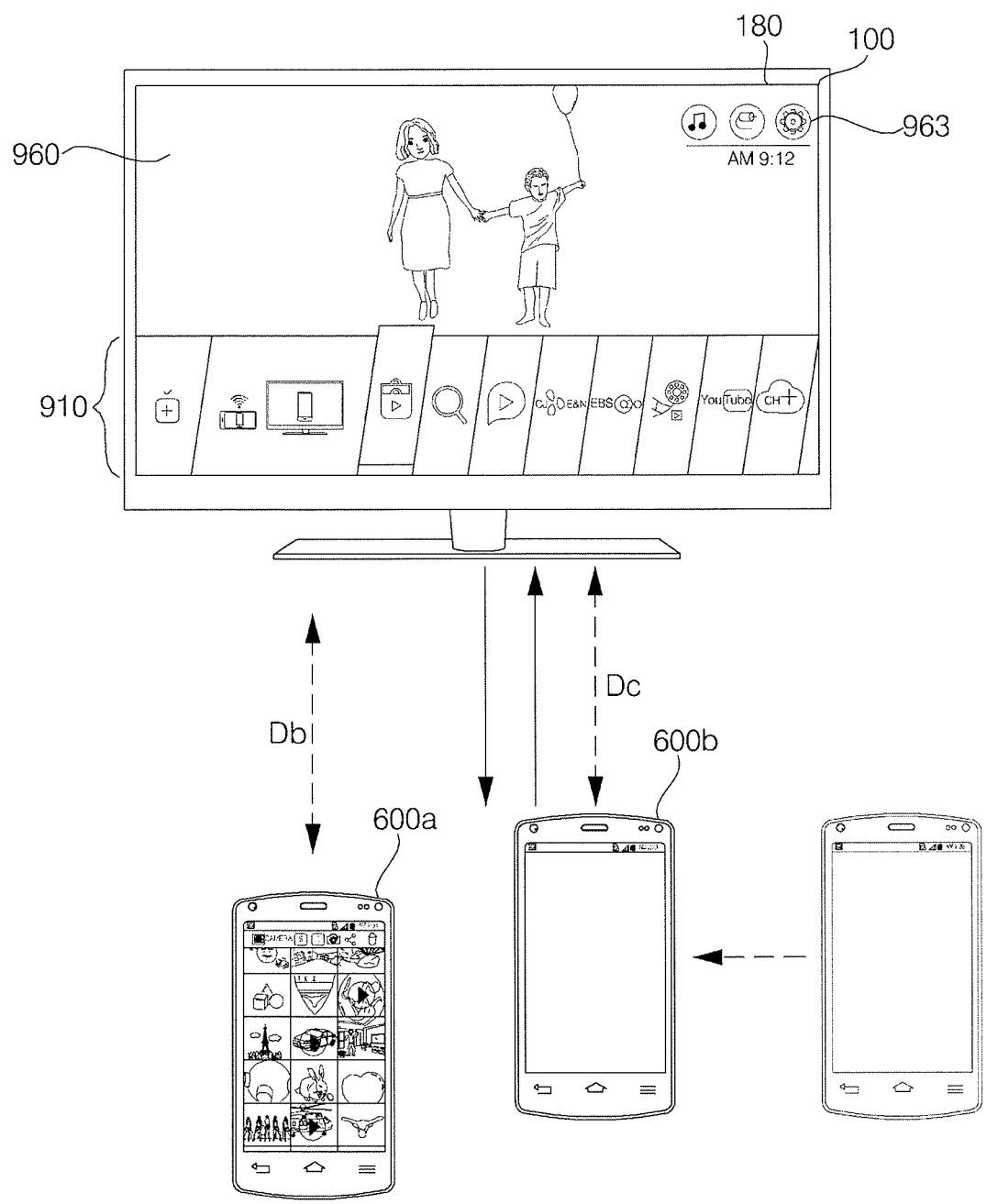

As shown in FIG. 17F, if a second mobile terminal 600b approaches the image display apparatus 100 within the predetermined distance and is located at distance Dc from the image display apparatus 100, the controller 170 of the image display apparatus 100 can perform a control operation to receive a pairing response signal from the second mobile terminal 600b and implement additional pairing. After the additional pairing is implemented, the controller 170 of the image display apparatus 100 can perform a control operation to display objects 962 and 964 indicating the plurality of mobile terminals as shown in FIG. 17G.

Figure 17G:
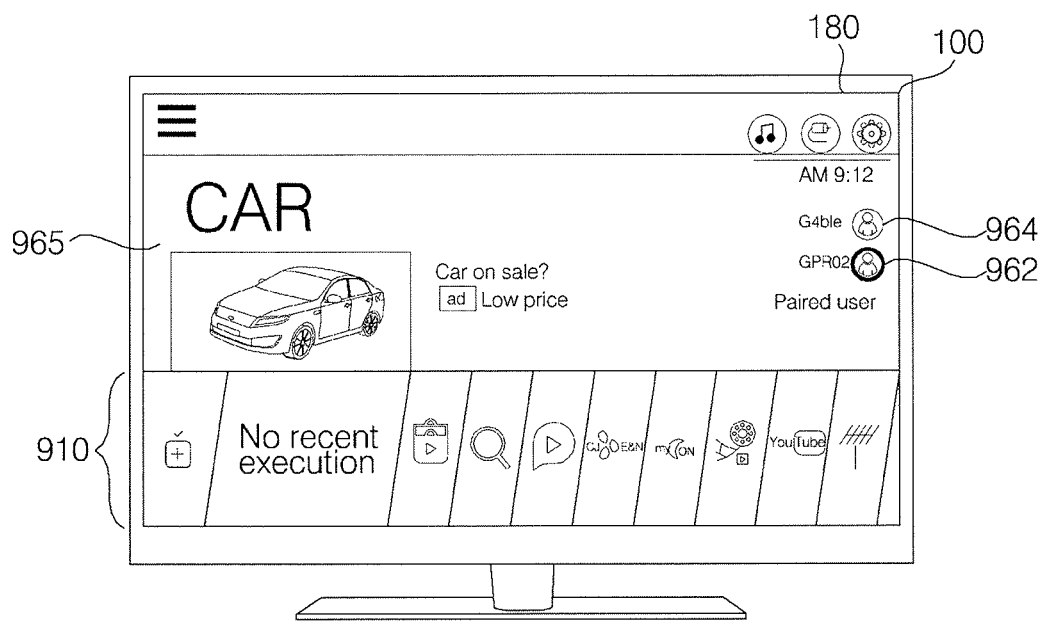
Figure 17H:
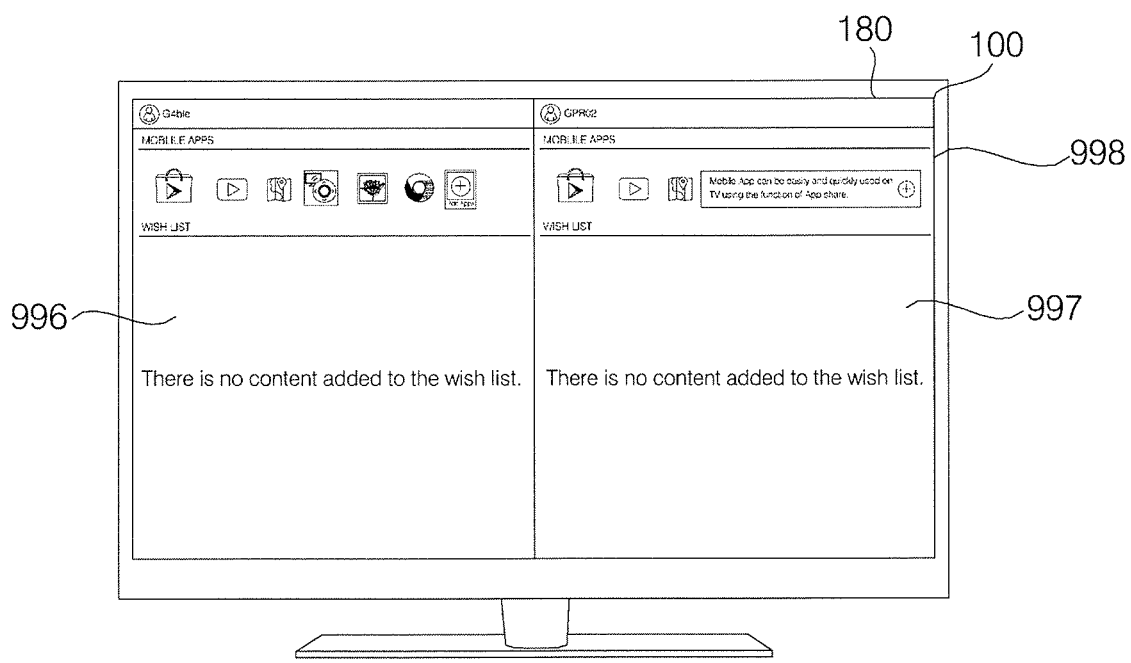

FIG. 17G illustrates when the object 962 indicating the paired mobile terminal and a second object 964 indicating a second paired mobile terminal are displayed on an image 965. When the second object 964 indicating the second paired mobile terminal is selected between the objects 962 and 964, the controller 170 of the image display apparatus 100 can perform a control operation to display an application list 996 related to the paired mobile terminal and an application list 997 related to the second mobile terminal on the display 180 together. Alternatively, the controller 170 of the image display apparatus 100 can perform a control operation to display only the application list related to the second paired mobile terminal.

An operation method for the image display apparatus or mobile terminal according to an embodiment of the present invention is implementable by code which can be read by the processor on a recording medium which can be read by a processor provided to autonomous driving apparatus or vehicle. The recording medium readable by the processor includes all kinds of recording devices for storing data which can be read by the processor. Examples of the recording medium readable by the processor include ROM, RAM, CD-ROM, magnetic tape, floppy disk, and optical data storage. The method is also implementable in the form of a carrier wave such as transmission over the Internet. In addition, the recording medium readable by the processor may be distributed to computer systems connected over a network, and code which can be read by the processor in a distributed manner can be stored in the recording medium and executed.

As is apparent from the above description, according to an embodiment of the present invention, an image display apparatus includes a display, an interface unit to exchange data with at least one external device, and a controller to perform a control operation to display a first mirroring image when the first mirroring image is received from a first external device and to display a second mirroring image when the second mirroring image is received from a second external device. Thereby, various mirroring images can be displayed between the image display apparatus and the external devices.

Further, when the first external device is located within a predetermined distance, the controller performs pairing with the first external device, and performs a control operation to display an object indicating the first paired external device when the pairing is completed. Thereby, the first paired external device can be easily checked.

When a first mirroring image is received from a first external device with a first image displayed, the first image and the first mirroring image are controlled to be displayed together. Thereby, the image which is being viewed and the mirroring image can be checked together. When a second mirroring image is received from a second external device with the first mirroring image displayed, the first mirroring image and the second mirroring image are controlled to be displayed together. Thereby, the first and second mirroring images can be checked together.

Further, when the second mirroring image is received from the second external device with the first mirroring image displayed, an object indicating whether or not to add or substitute the second mirroring image can be displayed. Thereby, a method to display the mirroring image can be selected, and accordingly user convenience is enhanced.

When the second mirroring image is received from the second external device with the first mirroring image displayed, a preview image for the second mirroring image can be displayed. Thereby, the preview image can be referenced in selecting a method to display the second mirroring image, and accordingly user convenience is enhanced.

Meanwhile, a pointer is controlled to be displayed on a display based on a pointing signal of a remote control device, a display location of the second mirroring image is determined based on the location of the pointer, and the second mirroring image is displayed at the determined display location. Thereby, the mirroring image can be disposed in an area desired by the user, and thus user convenience is enhanced.

According to another embodiment of the present invention, an image display apparatus includes a display, an interface unit to exchange data with at least one external device, and a controller to perform a control operation to display, when a second mirroring image is received from a second external device with a first mirroring image from a first external device displayed, an object indicating whether or not to add or substitute the second mirroring image. Thereby, a method to display the second mirroring image can be selected, and thus user convenience be enhanced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:
1. An image display apparatus comprising:
a display;
a first interface configured to exchange data with at least one external device;
a second interface configured to receive a signal from a remote device; and
a controller electrically connected to the display and the first interface,
wherein the controller is configured to:
when a distance between one of a first external device and the image display apparatus is a predetermined distance, through the first interface, perform pairing with the first external device,
when the pairing with the first external device is completed, control the display to display a first object indicating the first external device,
when the first object is selected, control the display to display an application list including at least one application corresponding to the paired first external device, and
when one of the at least one application included in the application list is selected, through the first interface, transmit a request for transmission of a first mirroring image corresponding to the first external device to the first external device,
control the display to display the first mirroring image received from the first external device,
when the image display apparatus is paired with a second external device with the first mirroring image displayed on the display, control the display to display a second object indicating whether or not to display a second mirroring image corresponding to the second external device with the first mirroring image or display the second mirroring image in place of the first mirroring image,
wherein the second object includes at least one preview image which is a static image corresponding to a predetermined arrangement in which the first mirroring image and the second mirroring image are displayed on the display,
when a first preview image in the object is selected, control the display to display the first mirroring image and the second mirroring image according to a first arrangement corresponding to the first preview image, and
when a second preview image in the object is selected, control the display to display the first mirroring image and the second mirroring image according to a second arrangement corresponding to the second preview image.

2. The image display apparatus according to claim 1, wherein the controller is configured to:
control the display to display a first image on the display, and
when the first mirroring image is received from the first external device with the first image displayed on the display, control the display to display the first image and the first mirroring image together.

3. The image display apparatus according to claim 1, wherein the second object includes an add item and a replace item, and
wherein the controller is configured to:
when the add item is selected and the second mirroring image is received from the second external device with the first mirroring image displayed, control the display to display the first mirroring image and the second mirroring image together.

4. The image display apparatus according to claim 1, wherein the controller is configured to:
when a third mirroring image is received from a third external device with the first mirroring image and the second mirroring image displayed together on the display, control the display to display the first to third mirroring images together.

5. The image display apparatus according to claim 3, wherein the controller is configured to:
when the replace item is selected and the second mirroring image is received from the second external device with the first mirroring image displayed on the display, control the display to display the second mirroring image on the display in place of the first mirroring image.

6. The image display apparatus according to claim 1, wherein when the second mirroring image is received from the second external device with the first mirroring image displayed on the display, control the display to display a preview image corresponding to the second mirroring image.

7. The image display apparatus according to claim 1, wherein a size of the first mirroring image and the second mirroring image is changed based on a drag input of the pointer.

8. The image display apparatus according to claim 1, wherein the controller is configured to:
control the display to display a first image on the display, and
when the first mirroring image is received from the first external device with the first image displayed, control the display to display the first mirroring image on the first image in an overlaying manner.

9. The image display apparatus according to claim 1, wherein the controller is configured to:
when the second mirroring image is received from the second external device with the first mirroring image displayed, control the display to display the second mirroring image on the first mirroring image in an overlaying manner.

10. The image display apparatus according to claim 1, wherein the controller is configured to:
determine a location of a pointer displayed on the display based on a pointing signal of the remote control device, and
control the display to display the second mirroring image at a display location corresponding to the location of the pointer.

11. The image display apparatus according to claim 1, wherein the controller is configured to receive the first mirroring image corresponding to an image of an application performed on the first external device corresponding to the first selected application.

12. The image display apparatus according to claim 1, wherein the application list includes an add item,
wherein the controller is configured to:
when the add item is selected in the application list, through the first interface, receive a list of applications which are being executed on the first external device or information regarding the list of applications and display the list of applications, and
when a specific item is selected in the received list of applications to be added, through the first interface, transmit information related to the selected item to the first external device, receive an application related to the selected item from the first external device or a server, and install the received application.

* * * * *